US011262742B2

(12) United States Patent
Srinivasamurthy et al.

(10) Patent No.: US 11,262,742 B2
(45) Date of Patent: *Mar. 1, 2022

(54) ANOMALOUS DATA DETECTION IN COMPUTER BASED REASONING AND ARTIFICIAL INTELLIGENCE SYSTEMS

(71) Applicant: Diveplane Corporation, Raleigh, NC (US)

(72) Inventors: Ravisutha Sakrepatna Srinivasamurthy, Raleigh, NC (US); Christopher James Hazard, Raleigh, NC (US); Michael Resnick, Raleigh, NC (US); Ju Hyun Kim, Raleigh, NC (US); Yamac Alican Isik, Durham, NC (US)

(73) Assignee: Diveplane Corporation, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,842

(22) Filed: Aug. 13, 2020

(65) Prior Publication Data

US 2020/0371512 A1 Nov. 26, 2020

Related U.S. Application Data

(63) Continuation-in-part of application No. 16/376,509, filed on Apr. 5, 2019, now Pat. No. 10,817,750,
(Continued)

(51) Int. Cl.
*G06N 20/00* (2019.01)
*G05B 23/02* (2006.01)
*G06K 9/62* (2006.01)

(52) U.S. Cl.
CPC ....... *G05B 23/0281* (2013.01); *G06K 9/6215* (2013.01); *G06K 9/6256* (2013.01); *G06N 20/00* (2019.01)

(58) Field of Classification Search
CPC ........ G06N 20/00; G06N 5/025; G06N 7/005; G06K 9/6256; G06K 9/6269
(Continued)

(56) References Cited

U.S. PATENT DOCUMENTS 9,858,496 B2 1/2018 Sun et al.
9,922,286 B1 3/2018 Hazard
(Continued)

FOREIGN PATENT DOCUMENTS

WO WO2017189859 11/2017

OTHER PUBLICATIONS

Esener et al.—"A New Feature Ensemble with a Multistage Classification Scheme for Breast Cancer Diagnosis"—2017—https://www.hindawi.com/journals/jhe/2017/3895164/ (Year: 2017).*
(Continued)

*Primary Examiner* — Viker A Lamardo
(74) *Attorney, Agent, or Firm* — Dority & Manning, P.A.

(57) ABSTRACT

Techniques are provided herein for creating well-balanced computer-based reasoning systems and using those to control systems. The techniques include receiving a request to determine whether to use one or more particular data elements, features, cases, etc. in a computer-based reasoning model (e.g., as data elements, cases or features are being added, or as part of pruning existing features or cases). Conviction measures are determined and inclusivity conditions are tested. The result of comparing the conviction measure can be used to determine whether to include or exclude the feature, case, etc. in the model and/or whether there are anomalies in the model. A controllable system may then be controlled using the computer-based reasoning model. Examples controllable systems include self-driving cars, image labeling systems, manufacturing and assembly controls, federated systems, smart voice controls, automated
(Continued)

control of experiments, energy transfer systems, health care systems, cybersecurity systems, and the like.

20 Claims, 8 Drawing Sheets

Related U.S. Application Data which is a continuation-in-part of application No. 16/220,986, filed on Dec. 14, 2018, now Pat. No. 10,816,980, which is a continuation-in-part of application No. 15/948,805, filed on Apr. 9, 2018.

(60) Provisional application No. 63/038,335, filed on Jun. 12, 2020.

(58) Field of Classification Search
USPC ......................................................... 706/12
See application file for complete search history.

(56) References Cited

U.S. PATENT DOCUMENTS

| | | | | | |
|---|---|---|---|---|---|
| 10,816,980 | B2* | 10/2020 | Hazard | ................... | G06N 20/00 |
| 10,816,981 | B2* | 10/2020 | Hazard | ................... | G06N 20/00 |
| 10,817,750 | B2* | 10/2020 | Hazard | ................... | G06N 5/04 |
| 2017/0161640 | A1* | 6/2017 | Shamir | ................... | G06N 20/00 |
| 2018/0018590 | A1* | 1/2018 | Szeto | ................... | G06F 21/6254 |
| 2019/0147331 | A1* | 5/2019 | Arditi | ................... | G05D 1/0274 706/20 |
| 2020/0371512 | A1* | 11/2020 | Srinivasamurthy | .. | G06K 9/6271 |

OTHER PUBLICATIONS

Rosenberg et al.—"Semi-Supervised Self-Training of Object Detection Models"—2005—http://citeseerx.ist.psu.edu/viewdoc/download?doi=10.1.1.457.3102&rep=rep 1 &type=pdf (Year: 2005).*

Abramson, "The Expected-Outcome Model of Two-Player Games". PhD Thesis, Columbia University, New York, New York, 1987, 125 pages.

Abuelaish et al., "Analysis and Modelling of Groundwater Salinity Dynamics in the Gaza Strip", Cuadernos Geograficos, vol. 57, Issue 2, pp. 72-91.

Agarwal et al., "Nearest-Neighbor Searching Under Uncertainty II", ACM Transactions on Algorithms, vol. 13, Issue 1, Article 3, 2016, 25 pages.

Aggarwal et al., "On the Susprising Behavior of Distance Metrics in High Dimensional Space", International Conference on Database Theory, London, United Kingdom, Jan. 4-6, 2001, pp. 420-434.

Akaike, "Information Theory and an Extension of the Maximum Likelihood Principle", Proceedings of the $2^{nd}$ International Symposium on Information Theory, Sep. 2-8, 1971, Tsahkadsor, Armenia, pp. 267-281.

Alpaydin, "Machine Learning: The New AI", MIT Press, Cambridge, Massachusetts, 2016, 225 pages.

Alpaydin, "Voting Over Multiple Condensed Nearest Neighbor", Artificial Intelligence Review, vol. 11, 1997, pp. 115-132.

Altman, "An Introduction to Kernel and Nearest-Neighbor Nonparametric Regression", The American Statistician, vol. 46, Issue 3, 1992, pp. 175-185.

Archer et al., "Empirical Characterization of Random Forest Variable Importance Measures", Computational Statistics & Data Analysis, vol. 52, 2008, pp. 2249-2260.

Bever et al., "When is 'Nearest Neighbor' Meaningful?" International Conference on Database Theory, Springer, Jan. 10-12, 1999, Jerusalem, Israel, pp. 217-235.

Cano et al., "Evolutionary Stratified Training Set Selection for Extracting Classification Rules with Tradeoff Precision-Interpretability" Data and Knowledge Engineering, vol. 60, 2007, pp. 90-108.

Chomboon et al., An Empirical Study of Distance Metrics for k-Nearest Neighbor Algorithm, $3^{rd}$ International Conference on Industrial Application Engineering, Kitakyushu, Japan, Mar. 28-31, 2015, pp. 280-285.

Dwork et al., "The Algorithmic Foundations of Differential Privacy", Foundations and Trends in Theoretical Computer Science, vol. 9, Nos. 3-4, 2014, pp. 211-407.

Efros et al., "Texture Synthesis by Non-Parametric Sampling", International Conference on Computer Vision, Sep. 20-25, 1999, Corfu, Greece, 6 pages.

Ganegedara et al.—"Self organising map based region of interest labelling for automated defect identification in large sewer pipe image collections"—2012—https://ieeexplore.ieee.org/stamp/stamp.jsp?tp=&arnumber=6252482 (Year: 2012).

Gao et al., "Efficient Estimation of Mutual Information for Strongly Dependent Variables", $18^{18}$ International Conference on Artificial Intelligence and Statistics, San Diego, California, May 9-12, 2015, pp. 277-286.

Gehr et al., "$AI^2$: Safety and Robustness Certification of Neural Networks with Abstract Interpretation", $39^{th}$ IEEE Symposium on Security and Privacy, San Francisco, California, May 21-23, 2018, 16 pages.

Gemmeke et al., "Using Sparse Representations for Missing Data Imputation in Noise Robust Speech Recognition", European Signal Processing Conference, Lausanne, Switzerland, Aug. 25-29, 2008, 5 pages.

Gholamreza Anbarjafar—"Face recognition using color local binary pattern from mutually independent color channels"—2013—https://rd.springer.com/article/10.1186/1687-5281-2013-6 (Year: 2013).

Goodfellow et al., "Deep Learning", 2016, 800 pages.

Google AI Blog, "The What-If Tool: Code-Free Probing of Machine Learning Models", Sep. 11, 2018, https://pair-code,github.io/what-if-tool, retrieved on Mar. 14, 2019, 5 pages.

Gottlieb et al., "Near-Optimal Sample Compression for Nearest Neighbors", Advances in Neural Information Processing Systems, Montreal, Canada, Dec. 8-13, 2014, 9 pages.

Hastie et al., "The Elements of Statistical Learning", 2001, 764 pages.

Hazard et al, "Natively Interpretable Machine Learning and Artificial Intelligence: Preliminary Results and Future Directions", arXiv:1901v1, Jan. 2, 2019, 15 pages.

Hinneburg et al., "What is the Nearest Neighbor in High Dimensional Spaces?", $26^{th}$ International Conference on Very Large Databases, Cairo, Egypt, Sep. 10-14, 2000, pp. 506-515.

Hmeidi et al., "Performance of KNN and SVM Classifiers on Full Word Arabic Articles", Advanced Engineering Informatics, vol. 22, Issue 1, 2008, pp. 106-111.

Houle et al., "Can Shared-Neighbor Distances Defeat the Curse of Dimensionality?", International Conference on Scientific and Statistical Database Management, Heidelberg, Germany, Jun. 31-Jul. 2, 2010, 18 pages.

Indyk et al., "Approximate Nearest Neighbors: Towards Removing the Curse of Dimensionality", Procedures of the $30^{th}$ ACM Symposium on Theory of Computing, Dallas, Texas, May 23-26, 1998, pp. 604-613.

International Search Report and Written Opinion for PCT/US2019/026502, dated Jul. 24, 2019, 16 pages.

Kittler, "Feature Selection and Extraction", Handbook of Pattern Recognition and Image Processing, Jan. 1986, Chapter 3, pp. 115-132.

Kohavi et al., "Wrappers for Feature Subset Selection", Artificial Intelligence, vol. 97, Issues 1-2, Dec. 1997, pp. 273-323.

Kontorovich et al., "Nearest-Neighbor Sample Compression: Efficiency, Consistency, Infinite Dimensions", Advances in Neural Information Processing Systems, 2017, pp. 1573-1583.

Kulkarni et al., "Hierarchical Deep Reinforcement Learning: Integrating Temporal Abstraction and Intrinsic Motivation", arXiv:1604.06057v2, May 31, 2016, 14 pages.

Kuramochi et al., "Gene Classification using Expression Profiles: A Feasibility Study", Technical Report TR 01-029, Department of Computer Science and Engineering, University of Minnesota, Jul. 23, 2001, 18 pages.

(56) References Cited

OTHER PUBLICATIONS

Leinster et al., "Maximizing Diversity in Biology and Beyond", Entropy, vol. 18, Issue 3, 2016, 23 pages.
Liao et al., "Similarity Measures for Retrieval in Case-Based Reasoning Systems", Applied Artificial Intelligence, vol. 12, 1998, pp. 267-288.
Lin et al., "Why Does Deep and Cheap Learning Work So Well?" Journal of Statistical Physics, vol. 168, 2017, pp. 1223-1247.
Lukaszyk, "A New Concept of Probability Metric and its Applications in Approximation of Scattered Data Sets", Computational Mechanics, vol. 33, 2004, pp. 299-304.
Lukaszyk, "Probability Metric, Examples of Approximation Applications in Experimental Mechanics", PhD Thesis, Cracow University of Technology, 2003, 149 pages.
Maitre et al.—"Wavelet-Based Joint Estimation and Encoding of Depth-Image-Based Representations for Free-Viewpoint Rendering"—2008—https://ieeexplore.ieee.org/abstract/document/4497873 (Year: 2008).
Mann et al., "On a Test of Whether One or Two Random Variables is Stochastically Larger than the Other", The Annals of Mathematical Statistics, 1947, pp. 50-60.
Martino et al., "A Fast Universal Self-Tuned Sampler within Gibbs Sampling", Digital Signal Processing, vol. 47, 2015, pp. 68-83.
Mohri et al., Foundations of Machine Learning, 2012, 427 pages—uploaded as Part 1 and Part 2.
Olson et al., "PMLB: A Large Benchmark Suite for Machine Learning Evaluation and Comparison", arXiv:1703.00512v1, Mar. 1, 2017, 14 pages.
Pedregosa et al., "Machine Learning in Python", Journal of Machine Learning Research, vol. 12, 2011, pp. 2825-2830.
Phan et al., "Adaptive Laplace Mechanism: Differential Privacy Preservation in Deep Learning" 2017 IEEE International Conference on Data Mining, New Orleans, Louisiana, Nov. 18-21, 2017, 10 pages.
Poerner et al., "Evaluating Neural Network Explanation Methods Using Hybrid Documents and Morphosyntactic Agreement", Proceedings of the $56^{th}$ Annual Meeting of the Association for Computational Linguistics (Long Papers), Melbourne, Australia, Jul. 15-20, 2018, pp. 340-350.
Raikwal et al., "Performance Evaluation of SVM and K-Nearest Neighbor Algorithm Over Medical Data Set", International Journal of Computer Applications, Vol. 50, No. 14, Jul. 2012, pp. 975-985.
Rao et al., "Cumulative Residual Entropy: A New Measure of Information", IEEE Transactions on Information Theory, vol. 50, Issue 6, 2004, pp. 1220-1228.
Ribeiro et al., "'Why Should I Trust You': Explaining the Predictions of Any Classifier", arXiv:1602.04938v3, Aug. 9, 2016, 10 pages.
Rosenberg, "Semi-Supervised Self-Training of Object Detection Models", 2005—http://citeseerx.ist.psu.edu/viewdoc/ download?doi=10.1.1.457.3102&rep=rep1&type=pdf (Year: 2005).
Schaul et al., "Universal Value Function Approximators", International Conference on Machine Learning, Lille, France, Jul. 6-11, 2015, 9 pages.
Schuh et al., "Improving the Performance of High-Dimensional KNN Retrieval Through Localized Dataspace Segmentation and Hybrid Indexing", Proceedings of the $17^{th}$ East European Conference, Advances in Databases and Information Services, Genoa, Italy, Sep. 2013, pp. 344-357.
Schuh et al., "Mitigating the Curse of Dimensionality for Exact KNN Retrieval", Proceedings of the $26^{th}$ International Florida Artificial Intelligence Research Society Conference, St. Pete Beach, Florida, May 22-24, 2014, pp. 363-368.
Schwarz et al., "Estimating the Dimension of a Model", The Annals of Statistics, vol. 6, Issue 2, Mar. 1978, pp. 461-464.
Shradhananda Beura—"Development of Features and Feature Reduction Techniques for Mammogram Classification"—2016—https://pdfs.semanticscholar.org/b046/bdd97715dfcd7eeaadb709fe081d4d72d8a3.pdf (Year: 2016).
Silver et al., "Mastering the Game of Go Without Human Knowledge", Nature, vol. 550, Oct. 19, 2017, pp. 354-359.
Skapura, "Building Neural Networks", 1996, p. 63.
Stephenson et al, "A Continuous Information Gain Measure to Find the Most Discriminatory Problems for AI Benchmarking", arXiv:1809v2, Sep. 11, 2018, 8 pages.
Stoppiglia et al., "Ranking a Random Feature for Variable and Feature Selection" Journal of Machine Learning Research, vol. 3, 2003, pp. 1399-1414.
Surya et al., "Distance and Similarity Measures Effect on the Performance of K-Nearest Neighbor Classifier", arXiv:1708.04321v1, Aug. 14, 2017, 50 pages.
Tan et al., "Incomplete Multi-View Weak-Label Learning", $27^{th}$ International Joint Conference on Artificial Intelligence, 2018, pp. 2703-2709.
Tao et al., "Quality and Efficiency in High Dimensional Nearest Neighbor Search", Proceedings of the 2009 ACM SIGMOD International Conference on Management of Data, Providence, Rhode Island, Jun. 29-Jul. 2, 2009, pp. 563-576.
Tishby et al., "Deep Learning and the Information Bottleneck Principle", arXiv:1503.02406v1, Mar. 9, 2015, 5 pages.
Tockar, "Differential Privacy: The Basics", Sep. 8, 2014, https://research.neustar.biz/2014/09/08/differential-privacy-the-basics/ retrieved on Apr. 1, 2019, 3 pages.
Tomasev et al., "Hubness-aware Shared Neighbor Distances for High-Dimensional k-Nearest Neighbor Classification", $7^{th}$ international Conference on Hybrid Artificial Intelligent Systems, Salamanca, Spain, Mar. 28-30, 2012, 38 pages.
Trautmann et al., "On the Distribution of the Desirability Index using Harrington's Desirability Function", Metrika, vol. 63, Issue 2, Apr. 2006, pp. 207-213.
Triguero et al., "Self-Labeled Techniques for Semi-Supervised Learning: Taxonomy, Software and Empirical Study", Knowledge and Information Systems, vol. 42, Issue 2, 2015, pp. 245-284.
Tuomisto, "A Consistent Terminology for Quantifying Species Diversity? Yes, It Does Exist" Oecologia, vol. 164, 2010, pp. 853-860.
Vacek et al., "Using Case-Based Reasoning for Autonomous Vehicle Guidance", International Conference on Intelligent Robots and Systems, San Diego, California, Oct. 29-Nov. 2, 2007, 5 pages.
Verleysen et al., "The Curse of Dimensionality in Data Mining and Time Series Prediction" International Work-Conference on Artificial Neural Networks, Barcelona, Spain, Jun. 8-10, 2005, pp. 758-770.
Wachter et al., "Counterfactual Explanations Without Opening the Black Box: Automated Decisions and the GDPR", Harvard Journal of Law and Technology, vol. 31. No. 2, Spring 2018, 47 pages.
Wang et al., "Falling Rule Lists" $18^{th}$ International Conference on Artificial Intelligence and Statistics, San Diego, California, May 9-12, 2015, 10 pages.
Xu et al., "An Algorithm for Remote Sensing Image Classification Based on Artificial Immune B-Cell Network", The International Archives of the Photogrammetry, Remote Sensing and Spatial Information Sciences, vol. XXXVII, Part 86b, Beijing China, Jul. 3-11, 2008, 6 pages.
Zhao et al., "Semi-Supervised Multi-Label Learning with Incomplete Labels", $24^{th}$ International Joint Conference on Artificial Intelligence, Buenos Aires, Argentina, Jul. 25-31, 2015, pp. 4062-4068.

\* cited by examiner

ANOMALOUS DATA DETECTION IN COMPUTER BASED REASONING AND ARTIFICIAL INTELLIGENCE SYSTEMS

BENEFIT CLAIM

This patent application is a continuation in part of U.S. patent application Ser. No. 16/376,509, filed Apr. 5, 2019, which is in turn a continuation-in-part of U.S. patent application Ser. No. 16/220,986, filed Dec. 14, 2018, which is in turn a continuation-in-part of U.S. patent application Ser. No. 15/948,805, filed Apr. 9, 2018. This patent application also claims priority to U.S. Provisional Patent Application No. 63/038,335, filed Jun. 12, 2020. Each of the applications identified above is hereby incorporated by reference in its entirety.

FIELD OF THE INVENTION

The present invention relates to computer-based optimization and artificial intelligence techniques and in particular to improving computer-based reasoning systems, which can be used to cause control of controllable systems, such as self-driving cars.

BACKGROUND

One of the hardest parts of using computer-based reasoning systems is simultaneously obtaining sufficient breadth of training data while reducing model size, as those two goals are often at odds. Data elements, possibly including context data paired with action data (e.g., a set of one or more contexts and/or a set of one or more actions), which may include or be called 'cases' or 'instances' in various embodiments, including for case-based reasoning, can be collected for many points in time and for many decisions made and actions taken in many contexts. For example, if a trainer is driving a vehicle to train a self-driving vehicle, context-action pairs may be collected every second or even multiple times a second, and those context-action pairs may represent, for example, driving actions taken (e.g., change lanes, turn, etc.) in particular contexts (e.g., vehicle speed, weight, location, proximity to other objects, etc.). Further, sets of context-action pairs may be collected multiple times per trainer (e.g., a single trainer driving a vehicle multiple times) and there may be many trainers (e.g., different drivers contributing training data). In total, the training data elements may number in the millions, billions, or even higher. This, in turn, increases the size of the computer-based reasoning model. While a larger computer-based reasoning model is useful for coverage, the larger the model is, the more computing resources are used to control a system with the model. So, although good breadth in the model is useful, the increasing size of the computer-based reasoning model can be a detriment in terms of computational and memory resources needed. Further, a computer-based reasoning model may have more features (e.g., data elements used in the context of a context-action pair) than necessary or efficient and may not use proper parameters (e.g., feature weights, etc.). Each of these issues can cause inefficiencies in the model and its use.

The techniques herein address these issues by using entropy-based techniques to balance the need for smaller computer-based reasoning models with the usefulness of broad coverage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims may serve as a summary of the invention.

DETAILED DESCRIPTION

Figure 1:
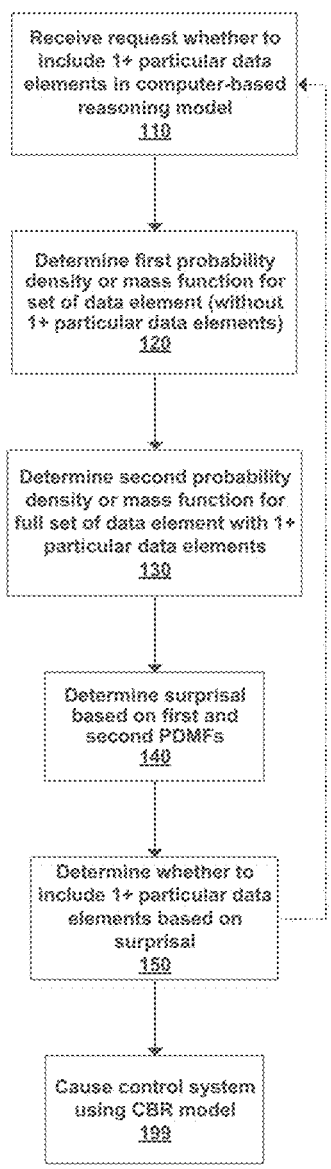
FIG. 1 depicts a process for creation of well-balanced computer-based reasoning systems.

In the following description, for the purposes of explanation, numerous specific details are set forth in order to provide a thorough understanding of the present invention. It will be apparent, however, that the present invention may be practiced without these specific details. In other instances, some structures and devices are shown in block diagram form in order to avoid unnecessarily obscuring the present invention.

General Overview

As noted above, one of the hardest parts of using computer-based reasoning systems is simultaneously obtaining sufficient breadth of training data while reducing model size, as those two goals are often at odds. The need for broad coverage pushes the size of sets of data elements higher. Stated another way, a training set needs to have good coverage in order for it to be useful later in a computer-based reasoning system. As such, trainers need to cover a wide range of contexts in order to ensure that the needed coverage is obtained. Collecting data for this broad coverage causes the size of the sets of data elements to increase.

Having such large amounts of data can be useful for providing choice of actions to take in many contexts, but it has downsides. Large sets of data elements take significant memory to store and incur significant processing costs when later finding matching context-action pairs. As such, it is important to do one or both of: 1) reducing the number of data elements during or after collection and 2) directing training so that when a contextual area is already well covered, training can be directed to areas where training data will provide a greater difference in the amount of information contained in the model or set of data elements.

Techniques herein address these issues, including obtaining broad coverage while still controlling the size of the set of data elements for a computer-based reasoning model while still providing broad coverage in the model.

Various embodiments herein look at the amount of new information that each data element provides to the overall set of data elements in order to determine whether to include (or keep) that data element. In some ways, looking at the information contributed may be considered looking at whether the new data is "useful" to the new set of data elements, or whether the new data is "surprising" or informative based on the set of data elements. Various embodiments herein use a measure of information entropy to determine the additional surprisal (or surprise) that a data point provides to a set of data. Information entropy is the expected value of surprisal. Example measures of surprisal are described elsewhere herein.

Information gain can be applied across the spectrum of machine learning applications for computer-based reasoning models including "supervised learning" and "unsupervised learning". In supervised learning, a computer-based reasoning model may contain a number of training cases with a set of inputs, sometimes called a feature vector or context, and a set of outputs, sometimes called labels, decisions, or actions. The feature vectors are the inputs observed and the labels are the presumably correct decisions for the given inputs as given by the trainer. In many implementations, the feature vectors and labels are each comprised of a set of numbers, but in other implementations, the feature vector and labels may each include enumerations, alphanumeric strings, or other data. In unsupervised learning, a computer-based reasoning model contains no outputs, labels, or actions in the training cases, and it is up to the machine learning system and the model to determine how to label the cases. However, a model, available training data, and other experimental, live, validated, unvalidated, test, or other available data may contain a combination of labeled and unlabeled data, as well as data that contains different feature vectors and different kinds of actions or labels. As long as some function is defined that can relate two particular data elements or cases that may include feature vectors or labels, all of the techniques herein may be applied to any set of feature vectors and labels for supervised or unsupervised learning.

The use of information entropy can be used to help reduce the number of data elements in a set after it has been collected, while maintaining most of the overall breadth or usefulness of that set of data elements. For example, a set of data elements related to vehicle operation (e.g., from multiple training runs by multiple trainers) can be large and cumbersome. Some embodiments herein calculate the conviction (a ratio of expected surprisal to surprisal), contribution (a conditioned ratio of expected surprisal to surprisal), expected surprisal, or information gain, of each of the data elements in the set of data elements and remove those that contribute little to the overall informational value of the set of data (e.g., those with low surprisal—beyond a lower threshold). Some embodiments calculate the information gain of each data element in the set of data elements and only keep those with the highest surprisal (e.g., the top N surprisal data elements and/or those with an information gain value over a certain threshold). Some embodiments may calculate the information gain of each data element in the set of data elements and only keep those with the lowest surprisal, identifying and reporting those with the highest surprisal as anomalous results.

As noted above, surprisal and other conviction measures, can be used to reduce the size of sets of data elements as they are collected, while controlling the total size of the set of data elements. As used herein, the term conviction measure encompasses, but is not necessarily limited to surprisal, prediction conviction, feature prediction contribution, and familiarity conviction, each of which may be determined in a targeted or untargeted manner. Each of these conviction measures is described in detail herein. In some embodiments, training data collected during training runs is analyzed in real time or near real time and is only stored to a set of data elements if it adds significantly to the information for that set of data elements. The surprisal of each data element may be determined, and when the surprisal is beyond (e.g., above) a certain (lower limit) threshold (or "within bounds" of that lower limit threshold), it may be added to the set of training data. For example, using the self-driving car example, a data element related to driving straight on a highway at a constant speed might have a low surprisal value (beyond a lower threshold) due to plentiful relevant training data, and therefore not be added to the set of data elements. Data elements related to driving in traffic in the rain, however, may have high (e.g., beyond a threshold) surprisal value due to less relevant training data, and therefore be added to the set of data elements. Also discussed herein are other ways to use various measures of conviction to decide whether to keep or exclude features and/or cases in a computer-based reasoning model.

Determination of various conviction measures, such as familiarity conviction and prediction conviction, is discussed below. Familiarity conviction is sometimes called simply "conviction" herein. Prediction conviction is also sometimes referred to as simply "conviction" herein. In each instance where conviction is used as the term herein, any of the conviction measures may be used. Further, when familiarity conviction or prediction conviction terms are used, those measure are appropriate, as may be the other conviction measures discussed herein.

In some embodiments, surprisal and/or prediction or familiarity conviction or other conviction measures are used to help direct training. Data elements with high surprisal (e.g., beyond a threshold) or high distance contribution are flagged and trainers may be directed to train more around those areas. Trainers may also be signaled when surprisal is low (e.g., beyond a lower threshold) or distance contribution is low, indicating that more training is not needed in that area. As training is occurring, the contribution of new data elements can be calculated in real time or near real time, and if the surprisal value is high (e.g., beyond a certain threshold), the trainer may be notified that additional training data in this context may be needed. If the surprisal is low (e.g., beyond a lower threshold), then the driver may be signaled that the current context is not providing much information, indicating that the trainer should move on to a different context or to demonstrate any unusual actions that may result from similar contexts. For example, using the self-driving car example, if training in a current context (e.g., driving at a constant speed on a highway) does not provide much additional information to the set of data elements (e.g., the new data elements have low surprisal—e.g., beyond a lower threshold), the driver may be given information that the current context is not providing much information and a different context (e.g., side street driving is needed). If the data elements in the current context are providing much additional information (e.g., have high surprisal), the trainer may be signaled to continue to provide training data in this context. For example, if, in a set of data elements related to vehicle operation there is only a single data element related to traversing a railroad track, that data element may have a very high surprisal value and may therefore be flagged so that trainers may know to provide more training data related to railroad tracks.

When errors or anomalies are detected in a set of data elements, the "offending" data element(s) may be flagged, removed and or corrected. This can be especially important when the data element had low surprisal or high conviction (which may be interpreted as a high confidence answer). As such, in some embodiments, when there are errors or anomalies detected with data elements that have low surprisal (e.g., beyond a lower threshold), those elements may be removed and/or more elements may be added related to the offending data element. An anomalous case with high surprisal (e.g., beyond a threshold) may also be removed upon detection. When a data element with high surprisal produces an anomalous result, it is less extraordinary than when a data element with low surprisal (e.g., beyond a lower threshold) produces an anomalous result. Nevertheless, taking corrective action when a data element with high surprisal produces an anomalous result may also benefit the model.

In some embodiments, when anomalous results are detected, they are flagged for human review (for example, an alert may be sent to a system or account used by the human reviewer). As a more particular example, in a banking context, one or more anomalous transactions may be flagged (e.g., an alert may be sent) for human review if they meet one or more anomalousness conditions. This may allow for those transactions to be reviewed by a person, such as an investigator. That person may conduct further review and/or deny or approve those transactions. In some embodiments, anomalous results may be flagged for review by another system. For example, an alert may be sent to another system, which may perform additional review on the anomalous data. As a more specific example, when manufacturing equipment data cases meeting one or more anomalousness conditions, an alert may be sent to a system that will perform additional assessment for the manufacturing equipment. A first system flagging data for review by a second system may be useful when performing the secondary analysis is more expensive (in terms of time, computing resources, money, etc.) than performing the first analysis for the anomalous data.

In some embodiments, determining whether data is anomalous may include determining one or more conviction scores, such as distance contribution and familiarity conviction. In some embodiments, the anomalousness condition is met when these two measures are beyond particular threshold(s). In some embodiments, cases meeting the anomalousness conditions may be called "anomalous inliers." Anomalous inliers may have a first conviction measure with a value that indicates that the data points are in the interior of a statistical distribution as well as a second conviction measure with a value that indicates that even though the data points are in the interior, their distributional pattern is not familiar with respect to the cases in the model. As a particular example, anomalous inlier may have lower distance contributions and lower familiarity convictions values relative to other cases in a model. In some embodiments, the thresholds for lower distance contribution and familiarity contribution values may be determined using a mixture of the two different distributions. For example, if a dataset includes anomalous inliers, the distribution of the familiarity conviction values may be a mixture of two different distribution. The non-anomalous inliers may belong to the distribution with higher means of familiarity conviction and the anomalous inliers may belong to the distribution with lower means. In some embodiments, the techniques set the threshold between two groups of distributions using the minimum point between the two peaks of the estimated probability density function using the nonparametric kernel density estimation.

Because information gain measures the surprisal of one distribution to another, information gain can be used to assist in the process of feature selection. Other conviction measures, such as feature prediction contribution or conviction measures can also be used for feature selection. Feature selection is the process of determining which features, contexts, data values, etc. should be considered in order to arrive at an appropriate label or decision. Feature selection is an important problem in machine learning and data science because too many features or presence of irrelevant features can result in problems including slower training, increased memory usage, decrease accuracy, and decreased performance, but often it is hard to know which features are important. The information gain may be computed for each feature from the associated probability density function of the model without a feature relative to the model with the feature. By assessing the information gain of each feature, features with the least information gain can be removed with the least negative impact to the performance of the model because they have the least effect on the structure of the data set and the results returned. Conversely, features with the highest information gain can be evaluated to see if they are improving or diminishing accuracy by comparing the results of the model with and without those high entropy (e.g., beyond a threshold) features.

In some embodiments, conviction, contribution, and/or other information gain measures can be used to tune parameters to a computer-based reasoning system. Parameters may include proximity, similarity, topology, feature weights, data transformations, function selection, etc. Given a base configuration of model parameters, other parameter choices or combinations of choices may be evaluated with regard to information gain relative to the base configuration (e.g., by calculating a PDMF using each candidate configuration). Those parameterizations with higher information gain will expose more complexity of the domain of the feature vector. This configuration with higher information gain may yield better performance, and it may indicate or reveal problems with the features or the selection of features.

In some embodiments, information gain can be used to compare two different training models to determine which model has more or less predictable complex behavior relative to the other one.

Information gain measures can be computed as a rate based on new training data that is being put into the computer-based reasoning model. As the model becomes more trained in the domain, the information gain of new training data is expected to drop, and each new piece of training data will yield less. However, an increased rate of information gain means that the model is learning new things; a significant or sustained high rate of information gain may be used to trigger a model optimization to remove data that may now be less informative.

In some embodiments, as described elsewhere herein, relative surprisal is calculated using $\log 2(P/Q)$, where $P$ is the posterior probability of an event occurring after it has occurred divided by the prior probability, $Q$, of that same event occurring before it has occurred.

In some embodiments, different measures that are correlated with, related to, or share similar characteristics of information entropy may be used. Although the accuracy, performance, precision, domains, and ranges may be applicable or invalid in different circumstances, other functions may include variance, Gini coefficient, mean absolute difference, median absolute deviation, variance-to-mean ratio, other dispersion methods, and other techniques for finding differences between probability density or probability mass functions.

In some embodiments, the surprisal is calculated from the probability density or mass functions (PDMFs) on the hypervolumes of the contexts represented by the multidimensional space of the set of data elements and performing analytical or numerical methods of Bayesian inferences using the PDMFs. Further, the embodiments may use appropriate PDMF estimation techniques on the data elements, such as multivariate normal, gaussian, Laplace, radial quadratic, logistic, sigmoid, cosine, tricubic, quartic, parabolic, maximal entropy, other parametric or nonparametric distributions, or different kernel density estimation or approximation techniques for each data element or subset of data elements in the set of data elements before the data element or data elements are added (Q) and then again after they are added (P).

In some embodiments, the surprisal of a data element with respect to a set of data elements can be calculated based on the probability that each element will be within the kth nearest elements to a given point, where the probability of being among the kth nearest elements is calculated using a set of distance measures on a generalized spanning tree that represents the topology of the set of data elements based on their k nearest neighbors. The surprisal of a data element with respect to a set of data elements may be calculated using three probability density or mass functions. For example, consider the three PDMFs (in this case probability mass functions):

$P(i)$=DistContrib(particular data element
$i$)/ΣDistContrib(each particular data element in the set of data elements)

Qknown($i$)=DistContrib(particular data element
$i$)/ΣDistContrib(each particular data element in the set of data elements & expected value of elements previously unknown), Qunknown($i$)=Average(DistContrib(each data element in the set of data elements))/ΣDistContrib (each particular data element & set of data elements), and if each data element is weighted identically, $Q_{unknown}$ may be 1/N, where N is the number of data elements. $Q_{known}$ refers to data elements that were known prior to their inclusion in P, and $Q_{known}$ refers to the data elements that were unknown and assumed as expectation prior to their inclusion in P. The shorthand (or function) DistContrib(X) may be a measure, premetric, or other function of the nearest neighbors to X. An example calculation is:

DistContrib($X$)=$C_i$ Distance(nearest_neighbor$_j$),
where $C_i$ is a coefficient and nearest_neighbor$_j$
is the $i^{th}$ nearest neighbor of data element $X$,
and $i=1 \ldots N$ for a DistContrib calculation of the $N$ nearest neighbors.

The nearest neighbors and the distance calculation may be determined using any appropriate distance measurement or other premetric, including Euclidean distance, Minkowski distance, Damerau-Levenshtein distance, Kullback-Leibler divergence, 1−Kronecker delta, and/or any other distance measure, metric, pseudometric, premetric, index, and the like. The list of coefficients may be any appropriate list, such as a decreasing series including the harmonic series (1/i) and other series like (1/(i+1)), (N−i+1), ($N^2-i^2+1$), ($1/i^2$), etc., a constant number (e.g., $C_i$=1), an increasing series (e.g., $C_i$=i), or a non-monotonic series (e.g., $C_i$=sin(i*pi/7)).

The techniques discussed herein, in some embodiments, can be used to compare two or more models or parts of two or more models. This comparison can be useful for summarizing differences between the models and for determining whether models are good candidates for combining and/or using evolutionary programming techniques. Further, the techniques herein are useful to case-based reasoning systems (one type of computer-based reasoning), but are also useful for data and model reduction for machine learning and artificial intelligence systems (also types of computer-based reasoning systems). For those system, training data can become excessive, and training and retraining the neural network can be time and computationally intensive. Reducing the size of the training sets can be beneficial for reducing training data (among other benefits) while minimizing the loss of information in the training.

Overview of Surprisal, Entropy, and Divergence

Below is a brief summary of some concepts discussed herein. It will be appreciated that there are numerous ways to compute the concepts below, and that other, similar mathematical concepts can be used with the techniques discussed herein.

Entropy ("H(x)") is a measure of the average expected value of information from an event and is often calculated as the sum over observations of the probability of each observation multiple by the negative log of the probability of the observation.

$$H(x)=-\Sigma_i p(x_i)*\log p(x_i)$$

Entropy is generally considered a measure of disorder. Therefore, higher values of entropy represent less regularly ordered information, with random noise having high entropy (e.g., beyond a threshold), and lower values of entropy represent more ordered information, with a long sequence of zeros having low entropy (e.g., beyond a lower threshold). If log 2 is used, then entropy may be seen as representing the theoretical lower bound on the number of bits needed to represent the information in a set of observations. Entropy can also be seen as how much a new observation distorts a combined probability density or mass function of the observed space. Consider, for example, a universe of observations where there is a certain probability that each of A, B, or C occurs, and a probability that something other than A, B, or C occurs.

Surprisal ("I(x)") is a measure of how much information is provided by a new event $x_i$.

$$I(x_i)=-\log p(x_i)$$

Surprisal is generally a measure of surprise (or new information) generated by an event. The smaller the probability of $X_i$, the higher the surprisal.

Kullback-Leibler Divergence ("KL divergence" or "$Div_{KL}(x)$") is a measure of difference in information between two sets of observation. It is often represented as $$Div_{KL}(x)=\Sigma_i p(x_i)*(\log p(x_i)-\log q(x_i)), \text{ where } p(x_i) \text{ is the probability of } x_i \text{ after } x_i \text{ has occurred, and } q(x_i) \text{ is the probability of } x_i \text{ before } x_i \text{ has occurred.}$$

Familiarity Conviction Examples

Conviction and contribution measures may be used with the techniques herein. In some embodiments, conviction measures may be related in various ways to surprisal, including conviction measures being related to the ratio of observed surprisal to expected surprisal. Various of the conviction and contribution measures are discussed herein, including familiarity conviction discussed next.

In some embodiments, it may be useful to employ conviction as measure of how much information the point distorts the model. To do so, one may define a feature information (or conviction) measure, such as familiarity conviction, such that a point's weighted distance contribution affects other points' distance contribution and compared to the expected distance contribution of adding any new point.

Definition 1. Given a point $x \in X$ and the set K of its k nearest neighbors, a distance function d: $R^z \times Z \to R$, and a distance exponent α, the distance contribution of x may be the harmonic mean $$\phi(x) = \left( \frac{1}{|K|} \sum_{k \in K} \frac{1}{d(x,k)^\alpha} \right)^{-1}. \quad (3)$$

Definition 2. Given a set of points $X \subset R^z$ for every $x \in X$ and an integer $1 \le k < |X|$ one may define the distance contribution probability distribution, C of X to be the set $$C = \left\{ \frac{\phi(x_1)}{\sum_{i=1}^{n} \phi(x_i)}, \frac{\phi(x_2)}{\sum_{i=1}^{n} \phi(x_i)}, \ldots, \frac{\phi(x_n)}{\sum_{i=1}^{n} \phi(x_i)} \right\} \quad (4)$$

for a function $\varphi: X \to R$ that returns the distance contribution.

Note that if $\varphi(0)=\infty$, special consideration may be given to multiple identical points, such as splitting the distance contribution among those points.

Remark 1. C may be a valid probability distribution. In some embodiments, this fact is used to compute the amount of information in C.

Definition 3. The point probability of a point $x_i$, i=1, 2, . . . , n may be $$l(i) = \frac{\phi(x_i)}{\sum_i \phi(x_i)} \quad (5)$$

where the index i is assigned the probability of the indexed point's distance contribution. One may denote this random variable L.

Remark 2. When points are selected uniformly at random, one may assume L is uniform when the distance probabilities have no trend or correlation.

Definition 4. The conviction of a point $x_i \in X$ may be $$\pi_f(x_i) = \frac{\frac{1}{|K|} \sum_i \mathbb{KL}(L \| L - \{i\} \cup \mathbb{E}l(i))}{\mathbb{KL}(L \| L - \{x_i\} \cup \mathbb{E}l(i))} \quad (6)$$

where KL is the Kullback-Leibler divergence. In some embodiments, when one assumes L is uniform, one may have that the expected probability $$\mathbb{E}l(i) = \frac{1}{n}.$$

Prediction Conviction Examples

In some embodiments, it is useful to employ conviction as a proxy for accuracy of a prediction. To do so, one may define another type of conviction such that a point's weighted distance to other points is of primary importance and can be expressed as the information required to describe the position of the point in question relative to existing points.

Definition 5. Let be the number of features in a model and n the number of observations. One may define the residual function of the training data X:

$$r: X \to R^\xi$$

$$r(x) = J_1(k,p), J_2(k,p), \ldots, J_\xi(k,p) \quad (7)$$

Where $J_i$ may be the residual of the model on feature i parameterized by the hyperparameters k and p evaluated on points near x. In some embodiments, one may refer to the residual function evaluated on all of the model data as $r_M$. In some embodiments, the feature residuals may be calculated as mean absolute error or standard deviation.

In some embodiments, one can quantify the information needed to express a distance contribution $\varphi(x)$ by moving to a probability. In some embodiments, the exponential distribution may be selected to describe the distribution of residuals, as it may be the maximum entropy distribution constrained by the first moment. In some embodiments, a different distribution may be used for the residuals, such as the Laplace, lognormal distribution, Gaussian distribution, normal distribution, etc.

The exponential distribution may be represented or expressed as:

$$\frac{1}{\lambda} = \|r(x)\|_p \quad (8)$$

We can directly compare the distance contribution and p-normed magnitude of the residual. This is because the distance contribution is a locally weighted expected value of the distance from one point to its nearest neighbors, and the residual is an expected distance between a point and the nearest neighbors that are part of the model. Given the entropy maximizing assumption of the exponential distribution of the distances, we can then determine the probability that a distance contribution is greater than or equal to the magnitude of the residual $\|r(x)\|_p$ as:

$$P(\varphi(x) \ge \|r(x)\|_p) = e^{-\frac{1}{\|r(x)\|_p} \cdot \varphi(x)}. \quad (9)$$

We then convert the probability to self-information as:

$$I(x) = -\ln P(\varphi(x) \ge \|r(x)\|_p), \quad (10)$$

which simplifies to:

$$I(x) = \frac{\varphi(x)}{\|r(x)\|_p}. \quad (11)$$

As the distance contribution decreases, or as the residual vector magnitude increases, the less information may be needed to represent this point. One can then compare this to the expected value a regular conviction form, yielding a prediction conviction of:

$$\pi_p = \frac{EI}{I(x)}, \quad (12)$$

where I is the self-information calculated for each point in the model.

Feature Prediction Contribution Examples

In some embodiments, another feature information (or conviction) measure, Feature Prediction Contribution, may be related Mean Decrease in Accuracy (MDA). In MDA scores are established for models with all the features M and models with each feature held out $M_{-fi}$, i=1 . . . ξ. The difference $|M-M_{-fi}|$ is the importance of each feature, where the result's sign is altered depending on whether the goal is to maximize or minimize score.

In some embodiments, prediction information $\pi_c$ is correlated with accuracy and thus may be used as a surrogate. The expected self-information required to express a feature is given by:

$$EI(M) = \frac{1}{\xi}\sum_{i}^{\xi} I(x_i),$$

and the expected self-information to express a feature without feature i is $$EI(M_{-i}) = \frac{1}{\xi}\sum_{j=0}^{\xi} I_{-i}(x_j).$$

One can now make two definitions:

Definition 6. The prediction contribution $\pi_c$ of feature i is $$\pi_c(i) = \frac{M - M_{-f_i}}{M}.$$

Definition 7. The prediction conviction, pip, of feature i is $$\pi_p(i) = \frac{\frac{1}{\xi}\sum_{i=0}^{\xi} M_{-f_i}}{M_{-f_i}}.$$

In some embodiments, a set of action features or targets predicted with feature(s) removed may be labeled and then appended to the model as additional set of features. The prediction conviction or contribution may be additionally measured by comparing the original value (e.g., the observed target ($j_M$)) with the full-model predicted target ($j'_M$) and/or the predicted value given that feature i was removed ($j'_{M-fi}$) and re-added ($j'_M$) (in either direction). In some embodiments, the prediction conviction or contribution may be measured by comparing the full-model predicted target ($j'_M$) with the predicted value given that feature i was removed ($j'_{M-fi}$) (in either direction). The directionality of the comparison may be important when the measure being used is not symmetric.

Targeted and Untargeted Techniques for Determining Conviction and Other Measures In some embodiments, any of the information measures, conviction or contribution measures (e.g., surprisal, prediction conviction, familiarity conviction, and/or feature prediction contribution and/or feature prediction conviction) may be determined using an "untargeted" and/or a "targeted" approach. In the untargeted approach, the measure (e.g., a conviction measure) is determined by holding out the item in question and then measuring information gain associated with putting the item back into the model. Various examples of this are discussed herein. For example, to measure the untargeted conviction of a case (or feature), the conviction is measured in part based on taking the case (or feature) out of the model, and then measuring the information associated with adding the case (or feature) back into the model.

In order to determine a targeted measure, such as surprisal, conviction, or contribution of a data element (e.g., a case or a feature), in contrast to untargeted measures, everything is dropped from the model except the features or cases being analyzed (the "analyzed data element(s)") and the target features or cases ("target data element(s)"). Then the measure is calculated by measure the conviction, information gain, contribution, etc. based on how well the analyzed data element(s) predict the target data element(s) in the absence of the rest of the model.

In each instance that a measure, such as a surprisal, conviction, contribution, etc. measure, is discussed herein, the measure may be determined using either a targeted approach or an untargeted approach. For example, when the term "conviction" is used, it may refer to targeted or untargeted prediction conviction, targeted or untargeted familiarity conviction, and/or targeted or untargeted feature prediction conviction. Similarly, when surprisal, information, and/or contribution measures are discussed without reference to either targeted or untargeted calculation techniques, then reference may be being made to either a targeted or untargeted calculation for the measure.

Synthetic Data Generation Examples

In some embodiments, prediction conviction may express how surprising an observation is. As such, one may, effectively, reverse the math and use conviction to generate a new sample of data for a given amount of surprisal. In some embodiments, generally, the techniques may randomly select or predict a feature of a case from the training data and then resample it.

Given that some embodiments include calculating conditioned local residuals for a part of the model, as discussed elsewhere herein, the techniques may use this value to parameterize the random number distribution to generate a new value for a given feature. In order to understand this resampling method, it may be useful to discuss the approach used by the Mann-Whitney test, a powerful and widely used nonparametric test to determine whether two sets of samples were drawn from the same distribution. In the Mann-Whitney test, samples are randomly checked against one another to see which is greater, and if both sets of samples were drawn from the same distribution then the expectation is that both sets of samples should have an equal chance of having a higher value when randomly chosen samples are compared against each other.

In some embodiments, the techniques herein include resampling a point by randomly choosing whether the new sample is greater or less than the other point and then draw a sample from the distribution using the feature's residual as the expected value. In some embodiments, using the exponential distribution yields the double-sided exponential distribution (also known as the Laplace distribution), though lognormal and other distributions may be used as well.

If a feature is not continuous but rather nominal, then the local residuals can populate a confusion matrix, and an appropriate sample can be drawn based on the probabilities for drawing a new sample given the previous value.

As an example, the techniques may be used to generate a random value of feature i from the model with, for example, no other conditions on it. Because the observations within the model are representative of the observations made so far, a random instance is chosen from the observations using the uniform distribution over all observations. Then the value for feature i of this observation is resampled via the methods discussed elsewhere herein.

As another example, the techniques may be used to generate feature j of a data element or case, given that, in that data element or case, features $i \in \Xi$ have corresponding values $x_i$. The model labels feature j conditioned by all $x_i$ to find some value t. This new value t becomes the expected value for the resampling process described elsewhere herein, and the local residual (or confusion matrix) becomes the appropriate parameter or parameters for the expected deviation.

In some embodiments, the techniques include filling in the features for an instance by beginning with no feature values (or a subset of all the feature values) specified as conditions for the data to generate. The remaining features may be ordered randomly or may be ordered via a feature conviction value (or in any other manner described herein). When a new value is generated for the current feature, then the process restarts with the newly-set feature value as an additional condition on that feature.

In some embodiments, the techniques may include synthetic data generation performed before, after, or during any of the other techniques described herein. Similarly, the synthetic data generation may be performed for any technology area, such as those discussed herein, including but not limited to self-driving vehicles data, image labeling data, manufacturing data, smart home data, and the like.

In some embodiments, the techniques herein include receiving a request for synthetic training data. For example, a system or system operator may request additional or different training data in order to train a computer-based reasoning system that will be used to control a controllable system. In some cases, the controllable system or operator may request anonymous data that is similar to a current training data set (or different from, but still anonymized). In other cases, the system or operator may require more data than is in the current training data set, and therefore may request additional data to augment the current training data set. In some cases, synthetic data may be requested to direct sampling via a reinforcement learning process. The synthesized data (perhaps combined with original training data or by itself) may be used as part of a computer-based reasoning system to cause control of a system. Many controllable systems can be controlled with the techniques herein, such as controllable machinery, autonomous vehicles, lab equipment, etc. In some embodiments, the request for synthetic data may include a target surprisal for the target data. In some embodiments, if low target surprisal is requested, then the synthetic data may be close to and not differ much from existing data. If high target surprisal is requested, then the generated synthetic data may differ much from the existing data. In some embodiments, optionally, the received request for synthetic data may also include one or more conditions for the synthetic data. These conditions may be restrictions on the generated synthetic data. For example, if the synthetic data being generated is for a checkers game, a condition on the data may be that includes only moves that are part of a winning strategy, that survive for at least S moves without losing, and/or win within W moves. Another set of conditions on the synthetic training data may be a particular board layout (e.g., the starting checkers game state, the current checkers game state), etc.

When the received request includes one or more conditions for the synthetic data, the closest cases to the conditions may be determined as focal cases. In some embodiments, the closest cases to the conditions may be determined as the K nearest neighbors (KNN) for the conditions (e.g., the K cases that are "closest" to meeting the conditions). For example, if there are two features that have conditions, A and B, and the conditions are A=3 and B=5, then the KNN for the conditions would be those cases that are closest to meeting the conditions of A=3 and B=5. In some instances, if there are more than K cases that fully meet the condition (e.g., there are more than K cases that have feature values of A=3 and B=5, which scenario will be more common if the conditions are on features which are nominal or categorical), then K cases may be selected from those cases meeting the condition. These K cases may be selected from among those that fully meet the conditions can be done randomly, or using any appropriate technique, such as by looking at the surprisal and/or conviction of those cases and choosing the K with the highest (or lowest) surprisal, or all of the K cases may be used. In order to determine what K cases are "closest" any distance measurements discussed herein may be used, including Euclidean distance, Minkowski distance, Damerau-Levenshtein distance, Kullback-Leibler divergence, 1−Kronecker delta, and/or any other distance measure, metric, pseudometric, premetric, index, etc.

The conditions may be any appropriate single, multiple, and/or combination of conditions. For example, individual values may be given for features (e.g., A=5 and B=3); ranges may be given (e.g., A>=5 and B<4); multiple values may be given (e.g., E="cat", "dog", or "horse"); one or more combination can be given (e.g., [(A>1 and B<99) or (A=7 and E="horse")]).

The values for the conditioned features of the synthesized case may be set or determined based on the corresponding values for the features in the focal cases (e.g., determined as the KNN of the conditions, as described above). For example, for each conditioned feature, the mean, mode, an interpolated or extrapolated value, most-often occurring value of the corresponding feature from among the focal cases may be chosen as the value for the feature in the synthetic data case. In some embodiments, the distribution of the values of the conditioned features in the focal cases may be calculated and a value may be chosen based on that distribution, which may include the maximum likelihood value, selection via random sampling, inverse distance weighting, kernel functions, or other function or learned metric. In some embodiments, the values for conditioned features are set to (or based on) the condition values (vs. the values for the conditioned feature in the focal cases as described above). For example, if the conditions are A=5 and B=3, then feature A may be set to the value 5 and feature B may be set to the value 3 regardless of the values of that feature in the focal cases.

When there are no conditions received with the request for synthetic data, a random case may be selected as a focal case or a set of random cases may be selected as the set of focal cases. When there are no conditions, then, in some embodiments, the techniques begin by selecting a random case, selecting the first feature, or a random feature, or the next feature prioritized by some metric, importance, conviction, or ranking, and select the value from the selected case as the value of the feature in the synthetic data value. Then, the techniques may proceed as described. For example, in some embodiments, the value for a first feature (e.g., A=12) is chosen from the chosen case and then the KNN are determined. The KNN may be the K cases that are closest to having that value (e.g., A=12) are chosen as the focal cases.

After the focal cases for the synthetic data have been determined (whether or not based on received conditions), then a first undetermined feature is selected. When there are no conditions, selecting the first undetermined feature comprises selecting one of the features from the randomly-selected case that was not previously determined. When there are conditions on the synthetic data, then the conditioned features are first set based on the conditions and the focal cases that are KNN of the condition (as described elsewhere herein). After the first feature(s) have been determined (whether or not there are conditions), then the next (undetermined) feature may be selected. Selecting which undetermined feature to determine next can be done in any appropriate manner, such as selecting randomly among the remaining undetermined features, choosing the feature with the highest or lowest conviction, etc.

The distribution of values for the undetermined feature is then determined. For example, the distribution may be assumed to be log normal, Laplace, Gaussian, normal, or any other appropriate distribution, and be centered, e.g., on the computed undetermined feature value or on the median or mode of the values for the undetermined feature in the set of focal cases (or in the training data). The distribution for the feature can also be determined by parameterizing it via surprisal using the distribution's entropy. For example, if a distribution has an error, a, with the error modeled as a Gaussian distribution, and we know that the entropy of a sample from Gaussian distribution is $\frac{1}{2} \log(2 \pi e \sigma^2)$, we can adjust the error parameter to match a specified level of surprisal for that feature when taking a sample of the feature as the synthesized value. Alternatively, surprisal may also be determined by measuring other types of information, such as Kullback-Leibler Divergence ("KL divergence" or "$Div_{KL}(x)$") or cross entropy, and a desired surprisal can be attained by adjusting the corresponding parameters for the distribution. Methods describing distance from a point as a probability can be used to map the surprisal to distance, and may include any relevant distribution. When synthesizing data for multiple features, each feature can be set to the same surprisal, or alternatively each feature can "use up" the surprisal for the synthetic data parameterizing each feature's distribution with its own amount of surprisal, treating total surprisal of the synthesized data as a budget or goal for all of the features together. Some features may be accorded more surprisal than others, and therefore may "use up" more of the surprisal budget. In cases where higher surprisal is desired, distributions will typically be wider. In situations where lower surprisal is desired, distributions will typically be narrower. The relative surprisal accorded each feature may be set or determined in any appropriate manner, including assigning the relative amount of surprisal randomly, having the relative amounts set by a human operator, and/or setting them based on a particular measure or metric, such as having the features with the lowest (or highest) surprisal in the training data being accorded more of the surprisal budget. Extensive additional discussion of these techniques is presented elsewhere herein.

The value of for the undetermined feature for the synthetic case may then be determined based on the determined distribution. Determining the value based on the determined distribution comprises selecting a value (or sampling) randomly based on a random number and the determined distribution. In some embodiments, this is performed via inverse transform sampling. In some embodiments, the distribution does not have a closed form solution to translate a uniformly chosen random number to a random number from the parameterized distribution, and techniques to generate the required random number include rejection sampling, the Box-Muller transform, and the Ziggurat algorithm. In some embodiments, the techniques may continue to determine values for features until there are no more undetermined features. In order to determine values for each subsequent undetermined feature in the synthetic data case, the already-determined feature values are used to determine the K nearest neighbors (a new set of focal cases) to that set of already-determined values (e.g., all of the feature values set to that point). For example, if values A=3, B=5, and C=9.7 have already been set for the synthetic data case, either via conditioning or based on synthetic data generation (and value D is next to be determined), then the K nearest neighbors to the values for A, B, and C will be the new set of focal cases. Then the distribution (e.g., DistD) for that subsequent undetermined feature (e.g., feature D) is determined for the new set of focal cases. A value for the subsequent undetermined feature (e.g., D) is the determined based on a random sampling of the distribution (e.g., DistD) determined for that feature. When all of the feature values have been determined, then the synthetic data case is complete.

In some embodiments, optionally, the synthetic data case can be tested for fitness. Testing the synthetic data case for fitness can include any appropriate technique, including confirming that the synthetic data case meets any received conditions, or whether it meets other criteria, such as a fitness score or function. The fitness score or function may be any appropriate function. In some embodiments, the fitness function depends on the domain of the synthetic data case and can be a measure of performance of the synthetic data case as compared to other data cases. For example, the fitness function may be a measure of speed, processing efficiency, or some other measure of performance. Further, the fitness function might be modified at random, to introduce additional variation.

Upon completion of the synthetic data case, optionally, it can be provided or used as synthetic data. For example, the synthetic data case may be provided in response to the received request for synthetic data. In some embodiments, multiple synthetic data cases may be created in response to receiving the original request, and may be provided in response to that request. Providing the synthetic data case(s) in response to the request can take any appropriate form, including having them sent via HTTP, HTTPS, FTP, FTPS, via an API, a remote procedure call, a function or procedure call, etc., and/or in response to one of the foregoing.

In some embodiments, optionally, after one or more synthetic data cases have been created, control of a controllable system can be caused based at least in part on the synthetic data case(s) created using techniques herein. For example, a computer-based reasoning model may be trained based on the synthetic data case(s) and that model may be used to control a controllable system. Numerous examples of causing control of a controllable system are discussed herein and include, manufacturing control, vehicle control, image labelling control, smart device control, federated system control, etc.

Parameterizing Synthetic Data Via Prediction Conviction Examples

As discussed elsewhere, various embodiments use the double-sided exponential distribution as a maximum entropy distribution of distance in Lp space. One may then be able to derive a closed form solution for how to scale the exponential distributions based on a prediction conviction value. For example, a value, v, for the prediction conviction may be expressed as $$v = \pi_p(x) = \frac{EI}{I(x)} \quad (13)$$

which may be rearranged as $$I(x) = \frac{EI}{v}. \quad (14)$$

Substituting in the self-information described elsewhere herein:

$$\frac{\varphi(x)}{\|r(x)\|_p} = \frac{EI}{v}. \quad (15)$$

In some embodiments, that the units on both sides of Equation 15 match. This may be the case in circumstances where he natural logarithm and exponential in the derivation of Equation 15 cancel out, but leave the resultant in nats. We can rearrange in terms of distance contribution as:

$$\varphi(x) = \frac{\|r(x)\|_p \cdot EI}{v}. \quad (16)$$

If we let p=0, which may be desirable for conviction and other aspects of the similarity measure, then we can rewrite the distance contribution in terms of its parameter, $\lambda_i$, with expected mean of $$\frac{1}{\lambda_i}$$

This becomes $$\Pi_i E(1/\lambda_i) = \frac{\Pi_i r_i EI}{v}. \quad (17)$$

In some embodiments, due to the number of ways surprisal may be assigned or calculated across the features, various solutions may exist. However, unless otherwise specified or conditioned, embodiments may include distributing surprisal uniformly across the features, holding expected proportionality constant. In some embodiments, the distance contribution may become the mean absolute error for the exponential distribution, such as:

$$E(1/\lambda_i) = r_i \frac{EI}{v}. \quad (18)$$

and solving for the $\lambda_i$ to parameterize the exponential distributions may result in:

$$\lambda_i = \frac{v}{r_i EI}. \quad (19)$$

In some embodiments, Equation 19, when combined with the value of the feature, may become the distribution by which to generate a new random number under the maximum entropy assumption of exponentially distributed distance from the value.

Reinforcement Learning Examples

In some embodiments, the techniques can generate data with a controlled amount of surprisal, which may be a novel way to characterize the classic exploration versus exploitation trade off in searching for an optimal solution to a goal. Traditionally, pairing a means to search, such as Monte Carlo tree search, with a universal function approximator, such as neural networks, may solve difficult reinforcement learning problems without domain knowledge. Because the data synthesis techniques described herein utilize the universal function approximator model (kNN) itself, it enables the techniques to be use in a reinforcement learning architecture that is similar and tightly coupled, as described herein.

In some embodiments, setting the conviction of the data synthesis to "1" (or any other appropriate value) yields a balance between exploration and exploitation. Because, in some embodiments, the synthetic data generation techniques described herein can also be conditioned, the techniques may condition the search on both the current state of the system, as it is currently observed, and a set of goal values for features. In some embodiments, as the system is being trained, it can be continuously updated with the new training data. Once states are evaluated for their ultimate outcome, a new set of features or feature values can be added to all of the observations indicating the final scores or measures of outcomes (as described elsewhere herein, e.g., in relation to outcome features). Keeping track of which observations belong to which training sessions (e.g., games) may be beneficial as a convenient way to track and update this data. In some embodiments, given that the final score or multiple goal metrics may already be in the kNN database, the synthetic data generation may allow querying for new data conditioned upon having a high score or winning conditions (or any other appropriate condition), with a specified amount of conviction.

In some embodiments, the techniques herein provide a reinforcement learning algorithm that can be queried for the relevant training data for every decision, as described elsewhere herein. The commonality among the similar cases, boundary cases, archetypes, etc. can be combined to find when certain decisions are likely to yield a positive outcome, negative outcome, or a larger amount of surprise thus improving the quality of the model. In some embodiments, by seeking high surprisal moves, the system will improve the breadth of its observations.

Additional Reinforcement Learning and Other Embodiments

In some embodiments, the techniques may be used for reinforcement learning. For example, each time a synthetic training case is created, then the set of training cases can be updated and new synthetic data can be generated based on the updated set of training cases. In some embodiments, the techniques herein are used for reinforcement learning. For reinforcement learning, the outcome or goal feature(s) (e.g., the score of a game, or having a winning checkers match) are treated as conditioned inputs or features. For example, in the checkers example, the synthetic data case is generated with conditions of the current game board setup and where the move was part of a winning strategy. The "winning strategy" feature may have been set in the training data set. For example, once a game has been won, an outcome feature is set to either "winning" or "losing" for all moves that had been made in the game. As such, each move in a winning game has the outcome feature set to "winning" and each move in a losing game has outcome set to "losing." As such, then the data is conditioned to pick only moves that are part of a winning game, that feature (outcome="winning") is used in the KNN calculation discussed elsewhere herein.

The reinforcement learning scenarios can also include ranges (like a score above, below, or within a certain threshold), and other criteria. For example, as discussed elsewhere herein, the techniques herein can be useful in reinforcement learning situations where synthetic data is needed on expensive, dangerous, and/or hard to reproduce scenarios. For example, if pipelines only fail (e.g., leak, explode, become clogged) 0.001% of the time, but training data is needed to train a computer-based reasoning system to detect when those scenarios are going to happen, the techniques herein can be used to synthesize training data for those rare cases. This allows additional training data for pipeline failure to be gathered without incurring the difficulty, danger, and cost of actual pipeline failures. In such an example, the failure of the pipeline could be one of the conditions on the synthetic data. So, as data is being generated, the focal cases determined will be those associated with pipeline failure, and the subsequently-generated features will represent the distribution of values of those features within the conditioned data.

In some embodiments, the techniques may be used to create synthetic data that replicates users, devices, etc. For example, data that is based on, is similar to user data (or device data, etc.) can be created using the techniques herein. Consider user data that cannot be used (because it is not anonymous) and where one would prefer not to anonymize the data. That data can be used to create synthetic user data. If the data includes personally identifiable information as features (e.g., name, SSN, etc.), those features could be assigned random values, and the rest of the features can be synthesized based on user data (and possibly conditions) using the techniques discussed herein. Alternatively, in some embodiments, features containing personally-identifiable information could also be generated based on existing user data, but with very high surprisal, creating a much wider distribution than seen in the user data.

Example Processes for Entropy-Based Techniques for Creation of Well-Balanced Computer Based Reasoning Systems FIG. 1 depicts a process for using entropy-based techniques for creation of well-balanced computer-based reasoning system. As an overview, in the process 100 of FIG. 1, a request is received 110 to determine whether to include a particular data element (or one or more data elements) in the computer-based reasoning model. The receipt 110 of this request could be part of reduction (in size, memory used, etc.) of an existing computer-based reasoning model, adding training data to a model, and the like. After receiving the request on whether to include the data element or elements in the computer-based reasoning model, the process will determine 120 and 130 two PDMFs, one for the set of data elements associated with the computer-based reasoning model without the one or more particular data elements calculating expected values for future data elements, and one for the full set of data elements, including the one or more particular data elements. The surprisal is then determined 140 based on the two PDMFs, and a decision is made whether to include 150 the one or more particular data elements in the computer-based reasoning model based on the surprisal. The process 100 may optionally be repeated for multiple data elements or groups of data elements (indicated by the dashed line in FIG. 1). Once the data element(s) are included or excluded from the computer-based reasoning model, a real-world system may be controlled 199 with the computer-based reasoning model (such as an autonomous vehicle, an image labeling system, etc.).

Returning to the top of FIG. 1, the process receives 110 a request to determine whether to include particular data in a computer-based reasoning model. The request may be received 110 using any appropriate communication mechanism, such as HTTP, HTTPS, FTP, FTPS, an API call, a remote procedure call, a function or procedure call, The received 110 request may be a request to reduce the size of a computer-based reasoning model. For example, a system or device (not depicted in FIG. 2), may request the reduction in model size for a computer-based reasoning model to the training and analysis system 210. In other embodiments, the training and analysis system 210 may initiate the model reduction request on its own (e.g., when a model reaches a certain threshold or at a fixed interval). In some embodiments, the request received 110 can be to reduce the model to a particular size, by a certain amount, or based on the informational value of the elements of the model (described more herein). As described herein, reducing the size of the computer-based reasoning model while maintaining most of the informational value of the model is beneficial. The model being culled could be any appropriate model, including computer-based reasoning models for self-driving vehicles, labelling images, decisions on claims (e.g., how to fund a claim based on the factors of the case), and the like.

In some embodiments, the request to determine whether to include the one or more particular data elements in a computer-based reasoning model is received 110 as part of training. For example, if the training is ongoing, the request received 110 may be a request to determine whether to add a newly-received data element to the computer-based reasoning model. As a particular vehicular example, if Alicia is training a self-driving car computer-based reasoning system, and data (context-action pairs) is being collected for that drive (perhaps in real time, perhaps after the fact, but before the data is added to the model), then process 100 may be used to determine whether each element of data for Alicia's training data should be added to the computer-based reasoning model. Determining whether to add the elements before they are added to the computer-based reasoning model will allow the model to maintain a smaller size (by not adding elements that do not provide sufficient informational value), while still adding those elements that do provide informational value. As discussed herein, having a smaller model with high informational content is beneficial.

A first PDMF is determined 120 for the set of data elements that excludes the one or more particular data elements, and a second PDMF is determined 130 for the set of data elements that includes the one or more particular data elements. In some embodiments, as discussed herein, the determination of whether to include data in a computer-based reasoning model is made as part of a model reduction. In such embodiments, a PDMF is determined 130 for the model as it currently stands (e.g., with the data element in question) and another is determined 120 for the computer-based reasoning model excluding the data element. For example, if a determination is being made whether one or more particular data elements (e.g., a context-action pair)

should be included/remain in the computer-based reasoning model, then a PDMF for the computer-based reasoning model with the data element will be determined as well one without that data element using placeholder expected values for the data. These two PDMFs will be used to determine whether to keep the data element in the computer-based reasoning model. In some embodiments, the second PDMF may be calculated based on treating the model as an 'empty model' where the probability of every data element is the interpreted as the same or "even", instead of using existing data element probability densities.

In some embodiments, the determination of whether to include one or more particular data elements in a computer-based reasoning model happens before data is added to the computer-based reasoning model. When the determination is being made whether to add a data element to a computer-based reasoning model, a PDMF is determined for the model as it stands (e.g., without the one or more particular data elements, using an expected value instead) and another is determined for the model with the data element added. These two PDMFs will be used to determine whether to add the data element to the computer-based reasoning model.

The calculation of a PDMF is discussed elsewhere herein in detail. In some embodiments, determining 120 and/or 130 a PDMF includes using a multivariate Laplace distribution, a multivariate Gaussian distribution, numerical methods of Bayesian inference, or other kernel methods.

In some embodiments, determining 120 and/or 130 a PDMF includes determining multiple nearest data elements from the set of data elements in the computer-based reasoning model for the one or more particular data elements, and the distance contribution for each. A combined distance measure is then determined for the one or more particular data elements based on the distance measures for the nearest-neighbor elements' distances (as described elsewhere, these can be equally weighted, harmonically weighted, etc.), and the PDMF can be determined based at least in part on the combined distance measure.

Surprise is determined 140 based on the first and second PDMFs. For example, in some embodiments, the surprisal of the one or more particular data elements is the ratio of the first and second PDMFs. Determination of surprisal is discussed extensively herein. As noted, in some embodiments, the surprisal is a calculation of P/Q. Other embodiments include different calculations for surprisal. For example, surprisal could be calculated as log(P)/log(Q), (P*log(P))/(Q*log(Q)), P^2/Q^2, X*P/Q (where X is a coefficient), Q/P, etc. The embodiments discussed primarily herein are those in which P (or a function thereof) is in the numerator and Q (or a function thereof) are in the denominator, but the techniques apply equally even if the positions of P and Q are swapped. In the embodiments where P is in the numerator of the equation and Q is in the denominator, higher surprisal can be associated with the one or more particular data elements providing more information to the model; and lower surprisal can be associated with the one or more particular data elements providing less information to the model. The opposite could be true when P is in the denominator and Q is in the numerator. The higher the information provided to the model from the data element, the "better" the model will be with the data element included. Therefore, the higher the surprisal, the more likely the data element will be added to the model.

Process 100 then proceeds by determining whether to include 150 the one or more particular data elements based on the determined 140 surprisal. As noted above and elsewhere, the higher the surprisal of the one or more particular data elements, the more information it provides to the model, and the more likely it should be included in the model. In some embodiments, determining whether to include 150 the one or more particular data elements in the model includes determining whether the surprisal is beyond (e.g., above) a (lower limit) threshold. If the surprisal of a new data element meets the particular threshold, then it will be included in the model. This approach can be useful when the goal of using the techniques herein is to balance information in the model and model size (whether pruning an existing model or building a model as data elements are considered, e.g., during training). In some embodiments, the surprisal threshold is a numeric threshold (e.g., 0.1, 1, 2.1, 100, etc.). The surprisal is then compared to that threshold in order to make the determination of whether to include 150 the one or more particular data elements. In some embodiments, the surprisal threshold is a ratio of the surprisal of the one or more particular data elements and the average surprisal of the data elements of the computer-based reasoning model. For example, if the one or more data elements has a surprisal that is X % (e.g., 100%, 150%, 200%, etc.) of the average surprisal of the computer-based reasoning model, then it may be included in the computer-based reasoning model. It may be beneficial to not add cases to the model with low entropy (e.g., beyond a lower threshold) when it would not provide sufficient additional information to the computer-based reasoning model. For example, a low pass filter may remove anomalies, and a high pass filter may remove redundancies. So, in some embodiments, the surprisal is compared both to high and low thresholds, and is only added if the surprisal is within the bounds (or not outside the bounds) of the two thresholds.

In some embodiments, the element with the top N surprisals are the only ones included in the computer-based reasoning model. Limiting the model to a certain number (N) of data elements may be a useful approach when a certain limit on the computer-based reasoning model size is desired for reasons such as memory availability, tolerable latency for the model to respond, and computational effort required. In examples and embodiments in which a reduction in computer-based reasoning model of a particular size is the goal (e.g., removing D data elements), then the data elements with the lowest N surprisal may be excluded from the model.

Consider the example of Alicia training a self-driving vehicle simulation. As the new data elements (e.g., context-action pairs related to the context of the vehicle and the actions being taken) are received, each may be assessed for surprisal with respect to the computer-based reasoning model being built. If the goal is to limit the addition of new data elements to only those with certain surprisal, then the surprisal may be compared to a threshold, and the data element may only be added to the computer-based reasoning model if the surprisal for the data element exceeds a (lower limit) threshold. If the goal is to limit the computer-based reasoning model size to a particular threshold, then all candidate data elements may be assessed, and only those with the highest surprisal are added to the computer-based reasoning model (e.g., the data elements with the top N surprisals, where N is the goal for the number of data elements in the computer-based reasoning model).

Going further into the example, surprising data elements (those with high surprisal) may be those that are least related to previous data elements in the computer-based reasoning model. For example, if Alicia has not previously driven over railroad tracks, then data elements (e.g., context-action pairs) related to actions taken in the context of driving over railroad tracks may be the most surprising. If Alicia has driven for many miles on straight stretches of highway during daylight, then additional data elements in that context may not generate high surprisal scores.

As another example, some embodiments are related to systems for labeling images. Human experts may label images in order to identify features of the images and/or the subject of the image. These labels, and the contexts in which they were made (the image being the primary source of the context), may be used as training data for a computer-based reasoning model. The techniques herein could be used to determine how much surprisal each new data element (e.g., a context-label pair) provides, and only include those data elements that have a surprisal above a certain (lower limit) threshold. Similarly, a computer-based reasoning model for image labeling could also be pruned, assessing each data element and including only the data elements with the top N surprisals and/or excluding the data elements with the bottom D surprisals.

As yet another example, some embodiments relate to making decisions on how to value claims. For example, numerous input data may be gathered related to a claim (data on the entity or person making the claim, how and when the underlying event occurred, etc.). As new data elements for claim valuation are received, each can have its surprisal determined relative to the existing computer-based reasoning model. Those new data elements with surprisals beyond (e.g., above) a certain threshold would be added to the computer-based reasoning model. Those with surprisals beyond (e.g., below) the threshold may be excluded from the computer-based reasoning model. Further, the computer-based reasoning model may be pruned by excluding the data elements with the lowest surprisal and/or only including those with the highest surprisal.

As alluded to in the examples above, in some embodiments, more than one embodiment or approach described herein may be used (not depicted in FIG. 1). For example, during the training of a computer-based reasoning system, only data elements with surprisals beyond (e.g., above) a particular threshold may be added to the computer-based reasoning model. Once the training is over, it may be pruned (e.g., limiting the model to the top N most "surprising" data elements and/or removing the bottom D least surprising data elements). Further, in some embodiments, the criteria used for adding (or pruning) may change over time. For example, the threshold to add new data elements to a computer-based reasoning model may increase as the model grows, making it yet harder for a data element to be "surprising" enough to be added to the model. Additionally, or in the alternative, the threshold to add new data elements may decrease over time, allowing data elements to be added even if they are less surprising. Further, the threshold may stay the same and, due to the decreased relative informativeness of data elements in the same training domain, fewer data elements will be accepted into the model as the model becomes asymptotically representative of the training domain. In this way, the techniques recognize that, as a computer-based reasoning model grows, it becomes increasingly difficult for new data elements to be "surprising."

As depicted in FIG. 1, the process 100 may optionally return to determine whether other data elements should be included in the computer-based reasoning model (e.g., indicated by the dashed line from 150 to 110). In the embodiments and examples in which a model is being built (e.g., during training), this includes new data elements being considered for inclusion. For example, as Alicia is driving, new data elements, such as context-action pairs can be assessed for inclusion in the computer-based reasoning model using the techniques herein. In the context of reducing model size once it has been built, the process 100 may be run for each element (or some subset of them) in the computer-based reasoning model. As noted elsewhere herein, the data elements of an existing computer-based reasoning model may be assessed until a threshold number (D) have been excluded from the computer-based reasoning model and/or a threshold number (N) have been selected for inclusion in the computer-based reasoning model.

In some embodiments, when the determined 140 surprisal is beyond (e.g., below) a certain threshold, the techniques may include flagging that the surprisal is low (not depicted in FIG. 1). This can be useful, for example, during collection of training data. For example, if Alicia is driving in a context where much data has already been collected (e.g., daytime highway driving and straight sections of road), and the surprisal for the data elements in those contexts could be low. As such, Alicia could be given an indication (e.g., in the form of an audio cue from a computer-based reasoning training and analysis system 210 within the vehicle, or the like) that driving in the current context was not providing much additional information to the computer-based reasoning model. In response to the flagging, Alicia might exit the highway to start training the computer-based reasoning on side streets. Techniques and embodiments such as this not only help control the size of the computer-based reasoning model but also could be helpful in reducing the amount of time and effort needed to train the computer-based reasoning model by helping focus the training. Further, an indication that incoming data elements are not providing much additional information can also be an indication that the computer-based reasoning model is ripe for pruning and such an indication could be used to prompt the start of process 100.

In some embodiments, another way a model may be culled by removing data elements associated with anomalous actions (not depicted in FIG. 1). An anomaly could be flagged during later operation (e.g., if an anomalous action occurs, it could be flagged by an operator of the system being controlled). In some embodiments, the context-action pair or data element associated with the anomalous action could be flagged for removal. The anomalous data element could be removed from the model. Removing anomalous data not only can benefit the use of the model because anomalous decision will no longer (or less likely) be made using the computer-based reasoning model, but also the computer-based reasoning model will be smaller, which has the benefits discussed herein.

When an anomaly is detected, more data "around" the data element associated with the anomaly might be needed. For example, if an anomaly is detected, the context in which the anomaly occurred might be ripe for additional data elements. This could be "flagged" for a trainer, who could then focus training on that context. These additional data elements could then be considered for addition to the computer-based reasoning model in the manner described herein.

When the model is ready for use it may be provided to a control system (e.g., control system 220 of FIG. 2) for control of a real-world system. One example of controlling a system is controlling an image labelling system which is discussed with respect to FIG. 4, and elsewhere herein.

Another example of controlling a real-world system is controlling a self-driving vehicle. Vehicle-related data elements and control are discussed with respect to FIG. 4 and elsewhere herein, and can include obtaining contextual data for a current context for the self-driving vehicle (e.g., what context is the vehicle in at the moment), determining an action based on the current context, and causing performance of the determined context for the self-driving vehicle.
Additional Example Process for Entropy-Based Techniques for Creation of Well-Balanced Computer Based Reasoning Systems The techniques herein are often described in terms of including or excluding particular data elements, such as data context-action pairs, as part of, e.g., a case-based reasoning model. In some embodiments, in addition to or instead of including particular context action pairs, the techniques can be used to include or exclude other types of data elements, such as features of data elements a computer-based reasoning model and/or parameters of a computer-based reasoning model. For example, the techniques can be used to determine the surprisal of features in the data elements. As one example and turning to process 500 of FIG. 5, in the vehicular context, the data elements may include input features, such as road width on which the vehicle is driving. The surprisal for the inclusion of road width can be determined 520, 530, 540. And the determination whether to select or include 550 the feature can then be made. After that, control of the vehicle could be caused 599 using the updated computer-based reasoning model. Further, this can be done for features that are inputs (e.g., road width, vehicle weight, etc.), as well as outputs (e.g., whether to break, turn left, etc.). As another example, the techniques herein may include determining whether to include or exclude particular parameters of the computer-based reasoning model, such as proximity, similarity, topology, feature weights, data transformations, function selection, etc. used in the computer-based reasoning model.

Returning to the top of FIG. 5, a request may be received 510 as to whether to include or select one or more particular aspects in a computer-based reasoning model. The request may be received using any appropriate communication mechanism, such as HTTP, HTTPS, FTP, FTPS, an API call, a remote procedure call, a function or procedure call, As noted above, these aspects can be features of data elements (e.g., individual or sets of values or variables in the contexts, particular action data, etc.). The aspects can also be aspects of the computer-based reasoning model itself, such as proximity, similarity, topology, feature weights, data transformations, function selection, etc.

PDMFs are determined 520 and 530 for the model with and without the particular aspects of the computer-based reasoning model, and the surprisal of including the particular aspects can be determined 540 from the two PDMFs. Determining PDMFs are described elsewhere herein. In the vehicular example, a determination could be made for the computer-based reasoning model including in the list of features considered the width of the road (for the first PDMF) and without the width of the road (the second PDMF). If the surprisal determined is beyond (e.g., above) a certain (lower limit) threshold (e.g., a numeric value or a percentage as compared to the average for the computer-based reasoning model), then the feature may be selected or included 550 in the computer-based reasoning model, or, e.g., the feature of road width may be considered in the data elements in the model. It may be beneficial to not add cases to the model with low entropy (e.g., beyond a lower threshold) when it would not provide sufficient additional information to the computer-based reasoning model, and to avoid adding cases with very high surprisal (e.g., beyond a threshold) to avoid adding anomalous cases. For example, a low pass filter may remove anomalies, and a high pass filter may remove redundancies. So, in some embodiments, the surprisal is compared both to high and low thresholds, and is only added if the surprisal is within the bounds (not out of bounds) of the two thresholds.

As another example, a request may be received 510 to determine which distance function (e.g., Euclidean distance, Minkowski distance, Damerau-Levenshtein distance, Kullback-Leibler divergence, etc.) and which distance function parameters to use for calculating distance among data elements. The surprisal can be determined 520, 530, 540 for each of the candidate premetrics/distance measures and the function with the highest surprisal may be chosen as the parameter to be selected or included 550 with the computer-based reasoning model.

Process 500 optionally may return from the determination whether to select or include 550 particular aspects into the computer-based reasoning in order to receive 510 more requests, and make more determination 520-550 of what to include in the computer-based reasoning model. When there are no more aspects to consider selecting or including 550, the computer-based reasoning model may be sent to a control system and control of a system may be caused 599 based on that computer-based reasoning model. Various aspects of causing control of the system are discussed throughout herein, including with respect to FIG. 4.

Figure 6:
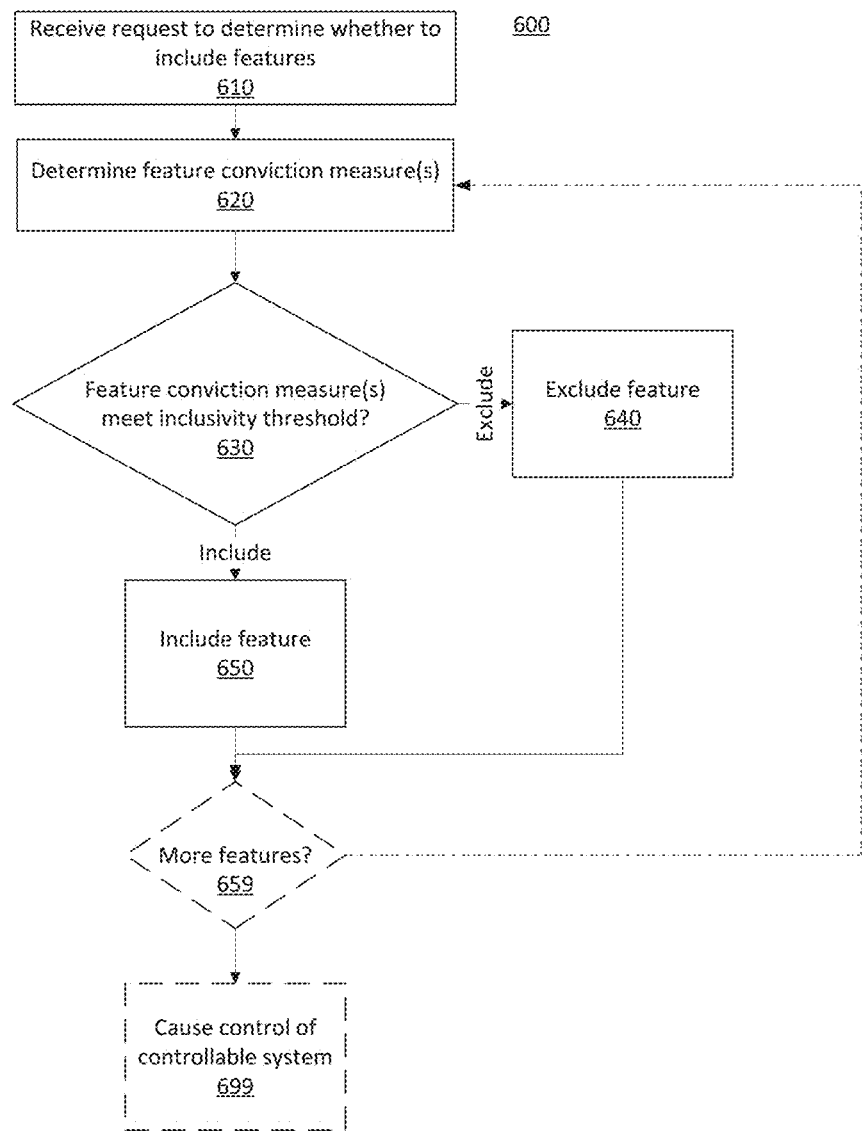

As used herein, the term "model elements" is a broad term encompassing it plain and ordinary meaning and includes data elements (defined elsewhere herein) and aspects of computer-based reasoning models (defined elsewhere herein). As such, any discussion herein of the techniques with respect to either the data elements or the aspects of computer-based reasoning models would also be applicable to model elements of the computer-based reasoning model.
Additional Example Processes for Entropy-Based Techniques for Creation of Well-Balanced Computer-Based Reasoning Systems In some embodiments, as depicted in FIG. 6, one or more conviction measures, including surprisal measures or scores, and/or feature prediction contribution (together, these may be termed "feature conviction measures") may be used to reduce the size of a model in a computer-based reasoning system, determine what cases, features, or combinations thereof to include or exclude from a model, etc. For example, if a feature does not contribute much information to a model, as determined by looking at one or more feature conviction measures, then it may be removed from the model. As a more specific example, the feature conviction measures may be determined for multiple input contexts (e.g., tens of, hundreds of, thousands of, or more) and the feature conviction measures may be determined 620 for each feature for each input context. Those features that reach an exclusionary threshold amount of contribution to a decision (e.g., as determined by the feature prediction contribution and/or other feature conviction measures) may be excluded 640 from the computer-based reasoning model. In some embodiments, only those features that reach an inclusion threshold may be included 650 in the computer-based reasoning model. In some embodiments, both an exclusionary lower threshold and inclusionary upper threshold may be used. In other embodiments, the feature conviction measures of a feature may be used to rank features and the top N features may be those included in the models. Reducing the size of the model by excluding features from the model may be beneficial in embodiments where the size of the model causes the need for extra storage and/or computing power. In many computer-based reasoning systems, smaller models (e.g., with fewer features being analyzed) may be more efficient to store and require less computing power when making decision. The reduced models may be used, for example, with any of the techniques described herein.

Returning to the top of process 600, as one example, in the vehicular context, the data elements may include input features, such as road width on which the vehicle is driving. A feature conviction measure such as the feature prediction contribution for the inclusion of road width can be determined 620. And the determination whether to select or include 650 or exclude 640 the feature from the computer-based reasoning model can then be made based on the feature conviction measure. After that, control of the vehicle could be caused 699 using the updated computer-based reasoning model (e.g., including or excluding road width). Further, this can be done for features that are inputs (e.g., road width, vehicle weight, etc.), as well as outputs (e.g., whether to break, turn left, etc.). As another example, the techniques herein may include determining whether to include or exclude various parameters of the computer-based reasoning model, such as proximity, similarity, topology, feature weights, data transformations, function selection, etc. used in the computer-based reasoning model.

Returning to the top of FIG. 6, a request may be received 610 as to whether to include or exclude one or more particular features in a computer-based reasoning model. The request may be received using any appropriate communication mechanism, such as HTTP, HTTPS, FTP, FTPS, an API call, a remote procedure call, a function or procedure call, etc. As noted above, these features can be context or action features of cases, data elements, and/or context-action pairs, and examples of features include individual or sets of values or variables in the contexts, particular action data, etc. The features can also be aspects of the computer-based reasoning model itself, such as proximity, similarity, topology, feature weights, data transformations, function selection, etc.

Feature conviction measures are determined 620 for the particular features of the computer-based reasoning model. Various embodiments of determining feature conviction measures are described elsewhere herein, and include determining feature prediction scores, feature prediction conviction, surprisal for features, familiarity conviction for features, and/or the like. Additionally, as described elsewhere herein, each of the feature conviction measures may be determined 620 or calculated using targeted or untargeted techniques. In the vehicular example, a determination 620 could be made for the feature conviction measures (either targeted or untargeted) for inclusion of the width of the road in the computer-based reasoning model.

If the feature conviction measures are determined 630 to meet inclusivity conditions (e.g., a certain (lower limit) threshold (e.g., a numeric value or a percentage as compared to the average for the computer-based reasoning model) for feature prediction contribution of the feature), then the feature may be selected for or included 650 in the computer-based reasoning model, or, e.g., the feature of road width may be included 650 as part of the context of the self-driving vehicle computer-based reasoning model. For example, if the feature prediction contribution is determined 630 to be beyond (e.g., above) a certain threshold (e.g., a numeric threshold), then the feature may be included 650 in the computer-based reasoning model, otherwise the feature may be excluded 640.

In some embodiments, multiple feature conviction measures may be used. As an example of analysis of two or more feature conviction measures, in some embodiments, prediction conviction and familiarity conviction of the features may be determined 620. Features determined 630 to have high prediction conviction (e.g., beyond a threshold) and low (e.g., beyond a lower threshold) familiarity conviction (two feature conviction measures), may be excluded 640 from the computer-based reasoning model. Features that do not meet this exclusion criteria may be included 650 in the model. As another example, targeted feature conviction may be determined 620 as a sole feature conviction measure. If it is determined 630 that the targeted feature conviction is low (e.g., beyond a lower threshold), then the feature may be excluded 640 from the model, otherwise, it may be included 650 in the model. Additional examples of inclusivity conditions include:

If both the familiarity conviction and prediction conviction are low (e.g., beyond a lower threshold), then exclude the feature(s) from the model If targeted and untargeted prediction conviction is low (e.g., beyond a lower threshold), then exclude the feature(s) from the model If the familiarity conviction is very high (beyond (e.g., above) a specific threshold), then exclude the feature(s) from the model If the prediction conviction is high but the familiarity conviction is in a region around 1, then exclude from the model.

If both the familiarity conviction and prediction conviction are high, then exclude the feature(s) from the model.

If the prediction contribution is low (e.g., beyond a lower threshold), then exclude the feature(s) from the model.

If the prediction conviction is beyond (e.g., above) a certain threshold, include the feature(s) in the model.

If the product of the prediction conviction and familiarity conviction is low (e.g., beyond a lower threshold), then exclude the feature from the model.

In any of the above conditions, it may be that the decision to include or exclude a feature is made on a case by case basis, or, in some embodiments, the cases may be considered together or jointly, and the decisions may be made based on the relative conviction measures for the cases. For example, in some embodiments, the features with the highest (or lowest) N (e.g., as a percentage of the total number of features, or a fixed number) values for feature conviction measures may be included 650 in the computer-based reasoning model. As a more specific example, the N features with the highest feature prediction contribution may be selected for inclusion in the computer-based reasoning model and all other features may be excluded. Relatedly, the feature with the lowest (or highest) N feature conviction measures may be excluded from the computer-based reasoning model and all other features may be included. For example, the N features with the lowest feature prediction contribution may be excluded from the computer-based reasoning model and all other features may be included. Further, in some embodiments, two or more of the conditions may be considered together when making a decision to include or exclude a case.

As another example, a request may be received 610 to determine which distance function (e.g., Euclidean distance, Minkowski distance, Damerau-Levenshtein distance, Kullback-Leibler divergence, etc.) and which distance function parameters to use for calculating distance among data elements. The feature prediction contribution or other feature conviction measure can be determined 620 for each of the candidate premetrics/distance measures and the function with the highest feature prediction contribution (or the feature for which its feature conviction measure meets inclusivity conditions) may be chosen as the distance function to be selected or included 650 with the computer-based reasoning model.

Process 600 optionally may return 659 from the determination whether to select or include 650 or exclude 640 particular features into the computer-based reasoning in order to receive 610 more requests, and make more determinations 620 of what to include 650 or exclude 640 in the computer-based reasoning model. When there are no more aspects to consider excluding 640 or including 650, the computer-based reasoning model may be sent to a control system and control of a system may be caused 699 with that computer-based reasoning model. Various aspects of controlling the system are discussed throughout herein, including with respect to FIG. 4.

As already alluded to, and not depicting in FIG. 6, the techniques to determine whether to include features in a computer-based reasoning model may be used in conjunction with the surprisal-based feature inclusion techniques described herein with respect to process 500 and elsewhere. Further, both the surprisal and entropy-based techniques herein are part of a genus of techniques that include the feature prediction contribution techniques and are described separately for additional clarity.

Figure 7A:
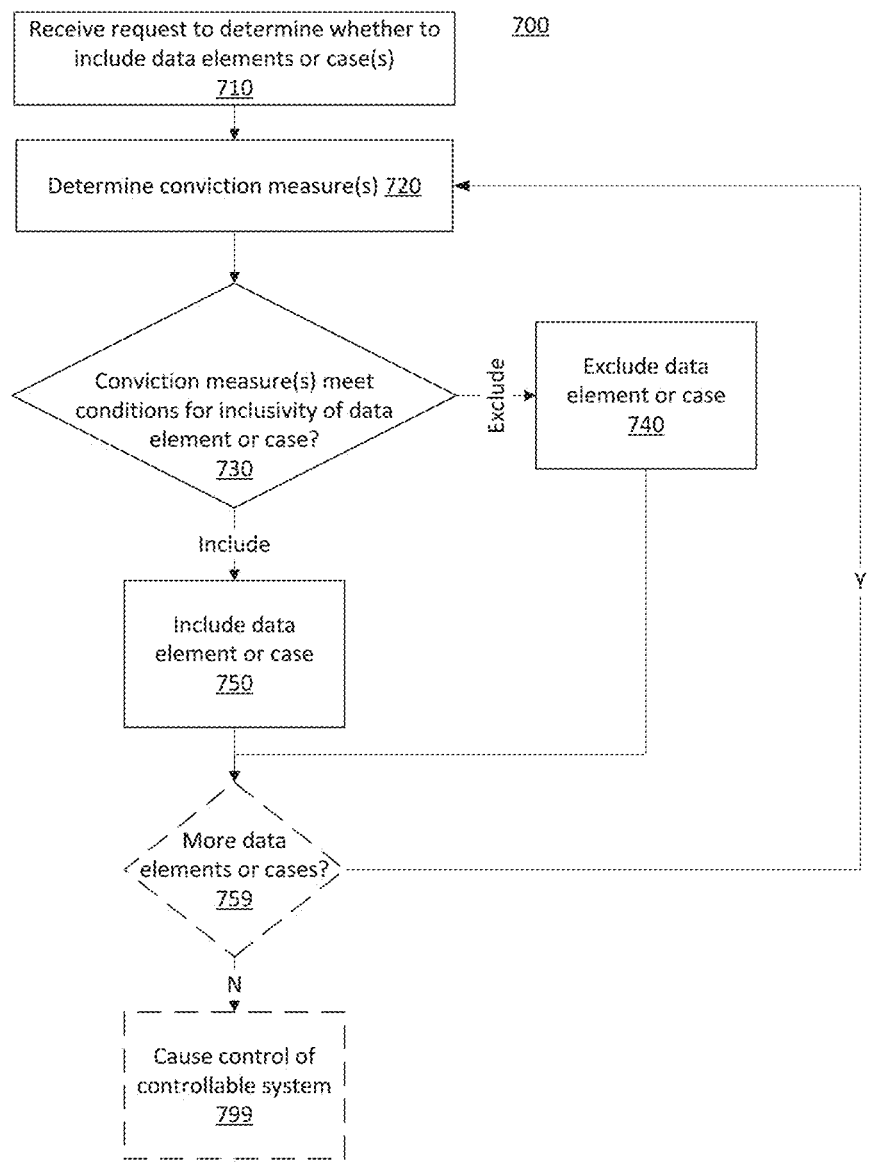

Additional Example Processes for Entropy-Based Techniques for Creation of Well-Balanced Computer Based Reasoning Systems In some embodiments, as depicted in FIG. 7A, a conviction measure, such as conviction (e.g., residual, distance contribution, familiarity conviction, and/or prediction conviction, any or all being targeted or untargeted) may be used to reduce the size of a model in a computer-based reasoning system. For example, if a case does not contribute much to a model, then it may be removed from the model. As a more specific example, residual, distance contribution, familiarity conviction, and prediction conviction may be determined 720 for multiple cases in a case-based reasoning model (e.g., tens of, hundreds of, thousands of, or more). Those cases that meet a checked inclusivity condition 730, (e.g., excluding based on high prediction conviction and low familiarity conviction; distance contribution being beyond a threshold, distance contribution being low and familiarity conviction being high, the residual being low and distance contribution being low) may be included 750 or excluded 740 from the computer-based reasoning model, depending on the inclusivity condition. In some embodiments, only those cases that reach an inclusion threshold may be included 750 in the computer-based reasoning model, or only those cases that reach an exclusion threshold may be excluded 740. In some embodiments, both an exclusionary lower threshold and inclusionary upper threshold may be used. In other embodiments, conviction may be used to rank features and the top N cases may be those included in the models. As noted elsewhere herein, excluding cases from the model, which reduces the size of the model, may be beneficial in embodiments where the model would otherwise cause the need extra storage and/or computing power. In many computer-based reasoning systems, smaller models (e.g., with fewer cases) may be more efficient to store and when making decision. The reduced models may be used, for example, with any of the techniques described herein.

Returning to the top of process 700, in some embodiments, conviction measures (such as familiarity conviction and/or prediction conviction) may be used to determine whether to include or exclude cases, such as context action pairs. For example, training cases in a self-driving vehicle computer-based reasoning model may be tested in order to determine whether to include or exclude those particular data elements or cases (e.g., whether to "prune" those cases and/or "compress" the model). In some embodiments, the training cases may be assessed before they are included in a training data set. This can help a system determine whether to include new training data cases in a training data set or computer-based reasoning model, or whether to exclude those cases.

As discussed elsewhere herein, information on the assessment whether to include 750 or exclude 740 cases can also be used to help direct training. For example, if a new training case is included 750 in the training data set and/or computer-based reasoning model, then a human or automated operator may be given that information in order to encourage more data along those lines. If a case is excluded 740, then an indication can be sent to an operator in order to indicate to not include or produce more training data along those lines. As an example, in the vehicular context, cases may be related to driving on a highway. The contribution for the inclusion of the highway driving cases can be determined 720. And the determination whether to select or include 750 or exclude 740 the case can then be made. After that, control of the vehicle could be caused 799 using the updated computer-based reasoning model.

Returning to the top of FIG. 7A, the process receives 710 a request to determine whether to include particular data in a computer-based reasoning model. The request may be received 710 using any appropriate communication mechanism, such as HTTP, HTTPS, FTP, FTPS, an API call, a remote procedure call, a function or procedure call, The received 710 request may be a request to reduce the size of a computer-based reasoning model (or assess whether to add a new case to a computer-based reasoning model). For example, a system or device (not depicted in FIG. 2), may request the reduction in model size for a computer-based reasoning model to the training and analysis system 210. In other embodiments, the training and analysis system 210 may initiate the model reduction request on its own (e.g., when a model reaches a certain threshold or at a fixed interval). In some embodiments, the request received 710 can be to reduce the model to a particular size, by a certain amount, or based on the informational value of the elements of the model (described more herein). As described herein, reducing the size of the computer-based reasoning model while maintaining much of the informational value of the model is beneficial. The model being culled could be any appropriate model, including computer-based reasoning models for self-driving vehicles, manufacturing control, federated system control, labelling images, decisions on claims (e.g., how to fund an insurance claim based on the factors of the case), and the like.

In some embodiments, the request to determine whether to include the one or more particular data elements or cases in a computer-based reasoning model is received 710 as part of training. For example, if the training is ongoing, the request received 710 may be a request to determine whether to add a newly-received case to the computer-based reasoning model. Using the vehicular example, if Alicia is training a self-driving car computer-based reasoning system, and data (e.g., context-action pairs) is being collected for that drive (perhaps in real time, perhaps after the fact, but before the data is added to the model), then process 700 may be used to determine whether each case or data elements for Alicia's training data should be added to the computer-based reasoning model. Determining whether to add the elements before they are added to the computer-based reasoning model will allow the model to maintain a smaller size (by not adding elements that do not provide sufficient informational value), while still adding those elements that do provide informational value. As discussed herein, having a smaller model with high informational content can be beneficial.

One or more conviction scores may be determined 720 for the cases or data elements. For example, conviction scores, such as distance contribution, residual, prediction conviction, and/or familiarity conviction scores for the case(s) or data elements may be determined. Determining distance contribution, residual, prediction conviction, familiarity conviction, and other conviction measures are described elsewhere herein. In some embodiments, one or more targeted or untargeted conviction scores may be determined. In some embodiments, one or more of distance contribution, residual, familiarity conviction, and prediction conviction (or another conviction score) may be determined 720. Further, both or either of targeted and untargeted conviction scores (e.g., for any of distance contribution, residual, prediction conviction, and familiarity conviction) may be determined 720.

After the conviction scores have been determined 720, then a check 730 is made whether the conviction scores meet an inclusivity condition. As used herein, an inclusivity condition may be a condition to either include or exclude a case. For example, a check 730 may be made to determine whether the prediction conviction is beyond (e.g., above) a first threshold, whether the familiarity conviction is beyond (e.g., below) a second threshold, whether the residual is beyond (e.g., below), and/or, e.g., whether distance contribution is beyond (e.g., below) a fourth threshold. If that condition is met, then, in some embodiments, the case may be excluded 740 from the model. As a more specific example, when the prediction conviction is high (e.g., beyond a threshold) and the familiarity conviction is low (e.g., beyond a lower threshold), then, in some embodiments, it may be the case that the case is easy to "label" or associate with an outcome, but is not needed in the model (e.g., it does not provide much or any additional information), and it therefore may be excluded 740 from the model. As another specific example, when the distance contribution is beyond a threshold (e.g., lower threshold), then the case may not contribute significantly to the model and therefore be excluded from the model. As yet other specific examples, cases may be excluded when the distance contribution is beyond a lower threshold and either the residual is beyond a lower threshold and/or familiarity conviction is beyond an upper threshold. Therefore, in some embodiments, the case can be excluded without reducing the overall effectiveness of the model by much. The thresholds for distance contribution, residual, prediction conviction, and familiarity conviction may be any appropriate threshold including, a value scaled by the size of the model, a value scaled by the accuracy of the model, a fixed value, etc. If the conviction measure is used instead of conviction (without being taken as a ratio to the expected value), then additional thresholds may be appropriate including a fixed value of entropy, entropy scaled based on the model, entropy scaled based on other measures of the model, etc.

Other conditions that may be checked 730 to determine whether include 750 or exclude 740 cases from a computer-based reasoning model may include checking 730 whether both prediction conviction and familiarity conviction are both high (e.g., each beyond a threshold). If both are high, then the case may be excluded 740. In some embodiments, if prediction conviction is high (e.g., beyond a threshold) and familiarity conviction is around 1 or some other moderately low value beyond (e.g., below) 1, then the case may be redundant, and may be excluded 740 from the model. Otherwise, it may be included 750. Other possible checks 730 that can be made are:

If the targeted familiarity conviction high (e.g., beyond a threshold) and untargeted familiarity conviction high (e.g., beyond a threshold), then exclude the case from the model.

If both the familiarity conviction and prediction conviction are low (e.g., beyond a lower threshold), then exclude the case from the model.

If untargeted prediction conviction is high, include (don't exclude) the case in the model.

If prediction conviction is high and familiarity conviction is low, then exclude the case model If targeted prediction conviction is high and familiarity conviction is high, include (don't exclude) the case in the model If the product of prediction conviction and familiarity conviction is high, then exclude the case in the model.

If the product of prediction conviction and familiarity conviction is not in the top small percentage of the model, then exclude the case from the model.

If distance contribution is below a threshold, then exclude (or include) the case from the model.

If distance contribution is less than average (e.g., mean, median, etc.), then exclude (or include) the case from the model.

If the distance contribution is above a threshold (e.g., a set threshold, a percentage threshold, the average, etc.), then exclude the case from the model.

If the distance contribution is within a certain range, then exclude (or include) the case in the model.

If the distance contribution is outside a certain range, then exclude (or include) the case in the model.

If distance contribution is below a threshold and familiarity conviction is above a threshold, then exclude the case.

If distance contribution is below a threshold and the residual is below a threshold, then exclude the case.

If a function of one or more of distance contribution, prediction conviction, and/or familiarity conviction are beyond a threshold, then exclude (or include) the case in the model. Such a function may be, for example, (prediction conviction)+(familiarity conviction); (prediction conviction)^A+(familiarity conviction)^B; (distance contribution)^X; (distance contribution)−(prediction conviction); (distance contribution)/(prediction contribution); (familiarity conviction)/(prediction conviction); (prediction conviction)*(familiarity conviction); X*(prediction conviction)^A+Y*(familiarity conviction)+Z*(distance contribution)^C+W*(residual)^D; a combination of two or more of these functions, or the like, where A, B, C, D, W, X, Y, and Z may each be positive (or negative) numbers (or fractions), including zero.

In any of the above conditions, it may be that the decision to include or exclude a case is made on a case by case basis, or, in some embodiments, the cases may be considered together or jointly and the decisions may be made based on the relative conviction measures for the cases. For example, only the top (or bottom) N cases for a function of distance contribution, residual, targeted prediction conviction, and/or familiarity conviction may be included in the model, and the rest may be excluded. Further, two or more of the conditions may be considered together when making a decision to include or exclude a case. Not depicted in FIG. 7A, surprisal for the case(s) may also be determined, as described elsewhere herein. The determined surprisal may be used in conjunction with or instead of one or more of the conviction measures described herein. For example, if surprisal is low (e.g., beyond a lower threshold) and targeted prediction conviction is high, then the case may be included 750 (not excluded 740) from the model.

Excluding 740 a case from a model may include, in some embodiments, removing the case and/or a pointer to a case from a file, database, or other storage associated with the model. Including 750 a case in a model may include, in some embodiments, adding the case and/or a pointer to a case to a file, database, or other storage associated with the model.

In some embodiments, determining 730 whether cases meet the inclusivity condition includes determining whether the cases are "archetype" cases. For example, an inclusivity condition can be determining whether both the prediction conviction and familiarity prediction are high (e.g., each beyond (e.g., above) a particular threshold). If it is determined that both prediction conviction and familiarity conviction are high, the case may be considered an archetype, and therefore may be included 750 in the model. If the inclusivity condition is not met, then the case may be excluded 740 from the model. Relatedly, the inclusivity condition could be determining the top N cases or top P percent of cases (e.g., percent of cases in the model) for a combined distance contribution, residual, prediction conviction, and/or familiarity conviction score (e.g., as calculated by (prediction conviction)+(familiarity conviction); (prediction conviction)^A+(familiarity conviction)^B; (distance contribution)^X; (distance contribution)−(prediction conviction); (distance contribution)/(prediction contribution); (familiarity conviction)/(prediction conviction); (prediction conviction)*(familiarity conviction); X*(prediction conviction)^A+Y*(familiarity conviction)+Z*(distance contribution)^C+W*(residual)^D; a combination of two or more of the preceding, or the like, where A, B, C, D, W, X, Y, and Z may each be positive (or negative) numbers (or fractions), including zero). If a particular case meets the inclusivity condition of being one of the top N cases (or top P percent of cases), then that particular case may be included 750 in the model, otherwise, it may be excluded 740. In some embodiments, high prediction conviction and moderate familiarity prediction may also be used as an inclusivity condition.

After determining whether to include 750 or exclude 740 a case, then a determination 759 is made whether to consider more cases or data elements for inclusion 750 or exclusion 740. If there are more cases to consider, then conviction score(s) are determined 720 for the next cases, and process 700 proceeds. If there are no more cases to consider for exclusion, then control of a controllable system may be caused 799. Causing 799 control of a controllable system is described elsewhere herein.

In some embodiments, when determining 759 whether to continue including 750 and/or excluding 740 more cases can include including or excluding cases until a space goal, memory size goal, and/or number of cases goal is met. For example, if the received 710 request includes a number of cases by which to reduce the model, then cases may be removed until that number of cases are excluded. If the received 710 request includes a total number of cases to include in the model, then cases may be included 750 until that number of cases have been included in the model.

In some embodiments, determining 759 whether to exclude more cases may include determining familiarity conviction for each case as it is being removed. When the familiarity conviction for a removed case equal or approaches the average familiarity conviction for cases in the model (e.g., it could be a familiarity conviction of "1"), then that may be a limit on the number of cases that can be removed from the model. For example, removing more cases after removal of cases is associated with a familiarity conviction near the average for the model may be associated with removing information from the model.

In some embodiments, determining 759 whether to exclude more cases may include determining entropy for each case as it is being removed. When the entropy for removal of a case goes up beyond a threshold amount, then that may be a limit on the cases that can be removed from the model. For example, removing more cases after removal of cases after the entropy has gone up beyond a threshold amount may be associated with removing information from the model. Determining whether entropy has gone up beyond a threshold amount may include determining that the entropy has increased by more than a particular percentage (e.g., 10%, 90%, 150%, etc.) by more than a particular amount (e.g., 1, 2, 10, 100), or by using any other appropriate technique.

As discussed elsewhere, the techniques for inclusion 750 or exclusion 740 of cases based on surprisal and/or conviction can be useful when the goal of using the techniques herein is to balance information in the model and model size (whether pruning an existing model or building a model as cases are considered, e.g., during training). In some embodiments, the surprisal and/or conviction thresholds are numeric thresholds (e.g., 0.1, 1, 2.1, 100, etc.). The surprisal or conviction is then compared to that threshold in order to make the determination of whether to include 750 or exclude 740 the one or more cases. In some embodiments, as discussed elsewhere herein, it may be beneficial to not add (exclude 740) cases to the model when they do not provide sufficient additional information to the computer-based reasoning model. For example, a low pass filter may remove anomalies, and a high pass filter may remove redundancies. So, in some embodiments, the surprisal is compared both to high and low thresholds, and is only included 750 if the conviction scores and/or surprisal scores are within bounds (or not outside the bounds) of the two thresholds.

In some embodiments, the received 710 request may request a particular size of computer-based reasoning model. The element with the top N "scores" with respect to a particular measure are the only ones included 750 in the computer-based reasoning model, and the rest are excluded, where N may be calculated as the number of cases that meet the particular size for the computer-based reasoning model. For example, the N cases with the highest prediction conviction scores and lowest familiarity conviction scores may be selected for inclusion 750 in the model and the rest of the cases may be excluded 740. For example, the N cases with the highest value in the formula (prediction conviction)−(familiarity conviction) may be selected for inclusion 750 in the model. Limiting the model to a certain number (N) of cases may be a useful approach when a certain limit on the computer-based reasoning model size is desired for reasons such as memory availability, tolerable latency for the model to respond, and computational effort required. In examples and embodiments in which a request for reduction in computer-based reasoning model of a particular size is received 710 (e.g., removing D cases), then the cases with the lowest D scores on a particular measure may be excluded 740 from the model.

Consider the example of Alicia training a self-driving vehicle simulation. As the new cases (e.g., context-action pairs related to the context of the vehicle and the actions being taken) are received, each may be assessed with respect to the computer-based reasoning model being built (e.g., using a process discussed herein such as process 700). If the goal is to limit the addition of new cases to only those with certain additional information gain, then the condition may be checked 730, and the case may only be included 750 to the computer-based reasoning model if the condition indicates inclusion, otherwise, the case may be excluded 740. If the goal is to limit the computer-based reasoning model size to a particular threshold, then all candidate cases may be assessed, and only those with the for which the check 730 indicates inclusion 750 are added to the computer-based reasoning model (e.g., the cases with the top N surprisals, where N is the goal for the number of cases in the computer-based reasoning model).

Going further into the example, cases that meet the checked 730 conditions may be those that are least related to previous cases in the computer-based reasoning model. For example, if Alicia has not previously driven over railroad tracks, then cases (e.g., context-action pairs) related to actions taken in the context of driving over railroad tracks may be the most surprising and have the most information gain. If Alicia has driven for many miles on straight stretches of highway during daylight, then additional cases in that context may not be excluded 740 based on the checks 730.

As another example, some embodiments are related to systems for labeling images. Human experts may label images in order to identify features of the images and/or the subject of the image. These labels, and the contexts in which they were made (the image being the primary source of the context), may be used as training data for a computer-based reasoning model. The techniques herein could be used to determine whether to include 750 each new case or data element (e.g., a context-label pair), and only include 750 those cases that are determined to not be excluded 740 based on checking 730 conditions. Similarly, a computer-based reasoning model for image labeling could also be pruned, assessing each case and including only the cases with the top N scores for the conditions checked 730 and/or excluding the cases with the bottom D scores for the conditions checked 730.

As alluded to in the examples above, in some embodiments, more than one embodiment or approach described herein may be used (not depicted in FIG. 7A). For example, during the training of a computer-based reasoning system, only cases that meet the checked 730 conditions may be included 750 to the computer-based reasoning model. Once the training is over, the model may be pruned (e.g., limiting the model to the top N highest scoring case for the checked 730 conditions and/or removing the bottom D lowest scores on the checked conditions). Further, in some embodiments, the criteria used for adding (or pruning) may change over time. For example, the threshold to add new cases to a computer-based reasoning model may increase as the model grows, making it yet harder for a case to be included 750 in the model. Additionally, or in the alternative, the threshold to add new cases may decrease over time, allowing cases to be added even if they have lower scores on the checked 730 conditions. Further, the threshold may stay the same and, due to the decreased relative informativeness of cases in the same training domain, fewer cases will be accepted into the model as the model becomes asymptotically representative of the training domain. In this way, the techniques recognize that, as a computer-based reasoning model grows, it becomes increasingly difficult for new cases to meet the conditions for inclusion.

As depicted in FIG. 7A, the process 700 may optionally determine 759 whether other cases should be included or excluded in the computer-based reasoning model. In the embodiments and examples in which a model is being built (e.g., during training), this includes new cases being considered for inclusion 750. For example, as Alicia is driving, new cases, such as context-action pairs can be assessed for inclusion in the computer-based reasoning model using the techniques herein. In the context of reducing model size once it has been built, the process 700 may be run for each case (or some subset of them) in the computer-based reasoning model. As noted elsewhere herein, the cases of an existing computer-based reasoning model may be assessed until a threshold number (D) have been excluded from the computer-based reasoning model and/or a threshold number (N) have been selected for inclusion in the computer-based reasoning model.

In some embodiments, when the determined to exclude 740 a case, the techniques may include flagging that the case is being excluded (not depicted in FIG. 7A). This can be useful, for example, during collection of training data. For example, if Alicia is driving in a context where much data has already been collected (e.g., daytime highway driving and straight sections of road), many of those cases may be excluded 740. As such, Alicia could be given an indication (e.g., in the form of an audio cue from a computer-based reasoning training and analysis system 210 within the vehicle, or the like) that driving in the current context was not providing much additional information to the computer-based reasoning model. In response to the flagging, Alicia might exit the highway to start training the computer-based reasoning on side streets. Techniques and embodiments such as this not only help control the size of the computer-based reasoning model but also could be helpful in reducing the amount of time and effort needed to train the computer-based reasoning model by helping focus the training. Further, an indication that incoming cases are not providing much additional information can also be an indication that the computer-based reasoning model is ripe for pruning and such an indication could be used to prompt the start of process 700.

In some embodiments, another way a model may be culled by removing cases associated with anomalous actions (not depicted in FIG. 7A). An anomaly could be flagged during later operation (e.g., if an anomalous action occurs, it could be flagged by an operator of the system being controlled). In some embodiments, the case, context-action pair, or data element associated with the anomalous action could be flagged for removal. The anomalous cases could be removed from the model. Removing anomalous data not only can benefit the use of the model because anomalous decision will no longer (or less likely) be made using the computer-based reasoning model, but also the computer-based reasoning model will be smaller, which has the benefits discussed herein.

When an anomaly is detected, more data "around" the case or data element associated with the anomaly might be needed. For example, if an anomaly is detected, the context in which the anomaly occurred might be ripe for additional cases. This could be "flagged" for a trainer, who could then focus training on that context. These additional cases could then be considered for addition to the computer-based reasoning model in the manner described herein.

When the model is ready for use it may be provided to a control system (e.g., control system 220 of FIG. 2) for causing 799 control of a controllable real-world system. One example of controlling a system is controlling an image labelling system which is discussed with respect to FIG. 4, and elsewhere herein.

Another example of causing 799 control of a real-world system is causing control of a self-driving vehicle. Vehicle-related cases and control are discussed with respect to FIG. 4 and elsewhere herein, and can include obtaining contextual data for a current context for the self-driving vehicle (e.g., what context is the vehicle in at the moment), determining an action based on the current context, and causing performance of the determined context for the self-driving vehicle.

Figure 7B:
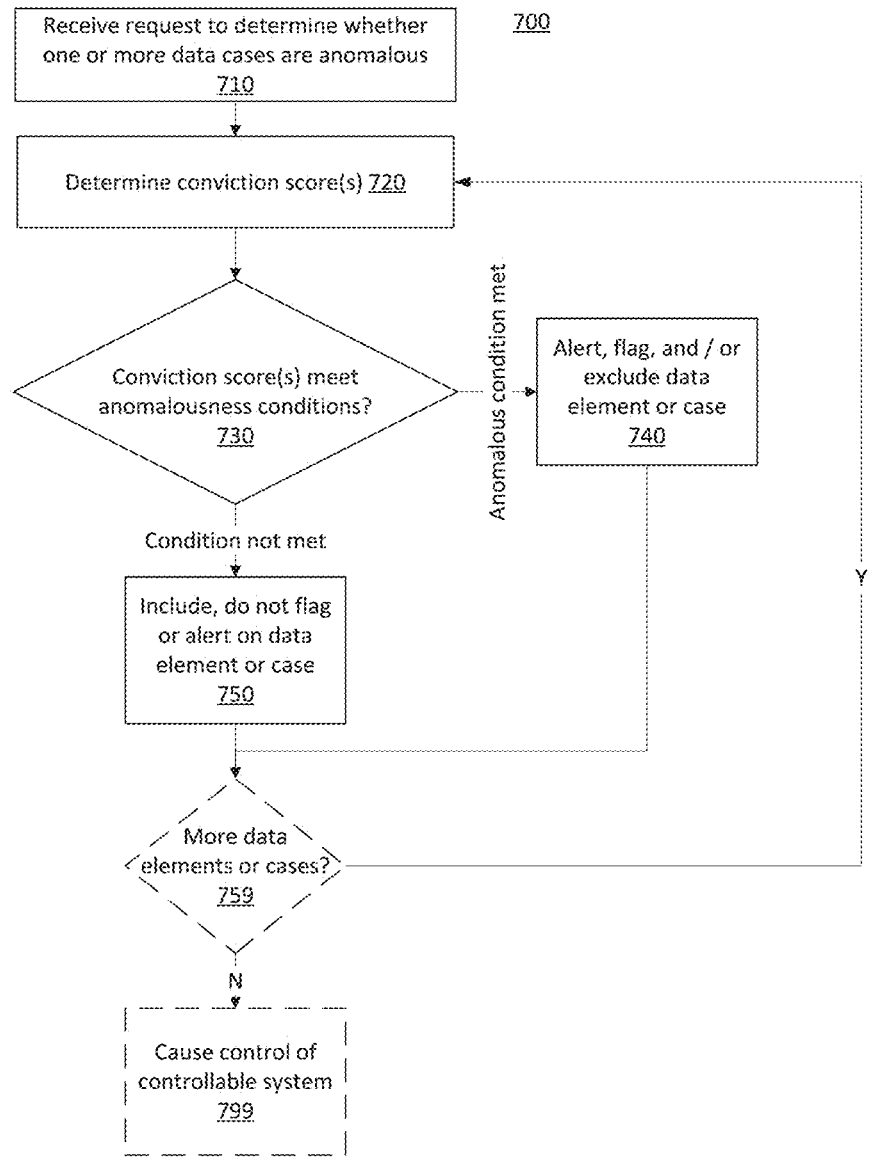

Additional Example Processes for Creation of Well-Balanced Computer Based Reasoning Systems FIG. 7B depicts additional example processes for creation of well-balanced computer-based reasoning systems. The portions of FIG. 7B with similar labels to those in FIG. 7A represent similar techniques, and are generally described with respect to FIG. 7A. The differences between the two figures are noted here and throughout. In some embodiments, as depicted in FIG. 7B, a request to determine 710 whether one or more cases are anomalous may be received (e.g., by the training and analysis system 210 of FIG. 2). One or more conviction measures, such as familiarity conviction and/or distance contribution, either or both of targeted and untargeted, may be determined in order to assess the anomalousness of the one or more cases. For example, a determination 730 may be made to determine whether the case(s) meet an anomalousness condition (e.g., a check whether a case does not contribute significantly to a model (e.g., low distance contribution), and is found to be "surprising" (e.g., low familiarity conviction), then it may meet an anomalousness condition as compared to the model. If the cases(s) meet the anomalousness condition, then an alert or flag may be raised 740 and/or the case may be excluded 740 from the model. If the anomalous condition is determined 730 to not be met, then no flag or alert may be raised 750 and/or the case may be included 750 in the model. In some embodiments, determinations 730 for two or more cases may be made in sequence (e.g., one after another), and/or determinations 730 may be made for two or more cases together (e.g., checking the anomalousness of two or more cases as compared to the model based on the conviction measures determined 720). The techniques may also be used with any of the inclusivity (inclusion or exclusion) criteria and/or decision making described herein (e.g., with respect to FIG. 7A). In some embodiments, the determined 720 conviction scores may be compared to specific threshold(s) and/or the determined conviction scores may be ranked and the top or bottom N cases may be flagged or alerted 740 and/or excluded 740 from the model.

Flagging and/or alerting 740 cases as anomalous and/or excluding 740 potentially anomalous cases from a model may have many benefits. For example, cases that are flagged 740 as anomalous may be reviewed by a human operator for inclusion or exclusion in a model; flagged for potentially fraudulent activity (e.g., in a financial or technical context); flagged for security concerns (e.g., in a corporate or technical context); flagged for potential repair (e.g., in the manufacturing or equipment analysis context); flagged for any other heightened scrutiny—either positive or negative.

As noted elsewhere herein, excluding cases from the model, which reduces the size of the model, may be beneficial in embodiments where a larger model may need extra storage and/or computing power. In many computer-based reasoning systems, smaller models (e.g., with fewer cases) may be more efficient to store and more efficient to query when actions or decisions are requested. The reduced models may be used, for example, with any of the techniques described herein.

Returning to the top of process 700, in some embodiments, conviction measures (such as familiarity conviction and/or distance contribution) may be used to determine whether to flag, alert on, include and/or exclude cases. Further, new cases may be compared to an existing model for determination of whether the new cases are anomalous with respect to the previous cases. For example, a new transaction (e.g., for a purchase) may be determined as anomalous with respect to a trained model. That new transaction may be flagged for review, and the transaction may be denied automatically by the system, flagged for human review before the transaction can proceed, etc.

Further, in some embodiments, the training cases may be assessed before they are included in a training data set. This can help a system determine whether to include new training data cases are anomalous before including them in a model (or as a decision whether to exclude cases that are already in a model). In some instances, it is important to include anomalous data when it represents anomalies that are desired to be captured in the model. In some instances, it is important to exclude anomalous data when it represents anomalies that are desired to be excluded from the model. Further, as discussed elsewhere herein, information on the assessment whether to include 750 or exclude 740 cases can also be used to help direct training.

Returning to the top of FIG. 7B, the process receives 710 a request to determine whether particular data cases are anomalous. Various embodiments of receiving 710 a request are discussed elsewhere herein. The received 710 request may be a request to determine whether to flag or alert as anomalous the data cases, to determine whether to include or exclude the data cases (e.g., as part of pruning a model or while training a model), etc.

One or more conviction scores may be determined 720 for the cases or data elements. For example, distance contribution, and/or familiarity conviction scores for the case(s) or data elements may be determined. Determining distance contribution and familiarity conviction are described elsewhere herein. In some embodiments, one or more targeted or untargeted conviction scores may be determined. In some embodiments, both familiarity conviction and distance contribution may be determined 720. Further, both or either of targeted and untargeted conviction (or both or either of distance contribution and familiarity conviction) may be determined 720.

After the conviction scores have been determined 720, then a check 730 is made whether the conviction scores meet one or more anomalousness condition(s). For example, a check 730 may be made to determine whether the distance contribution is beyond (e.g., below) a first threshold and whether the familiarity conviction is beyond (e.g., below) a second threshold. If those condition(s) are met, then, in some embodiments, the case may be flagged or alerted 740 as anomalous and/or included or excluded 740 from the model. When the distance contribution is low (e.g., beyond a threshold) and the familiarity conviction is low (e.g., beyond a lower threshold), then, in some embodiments, it may be the case that the case is easy to "label" or associate with an outcome, but is not common in the model (e.g., does not match what is in the model), and it therefore may be alerted or flagged 740 as anomalous and/or included or excluded 740 from the model. In some embodiments, the case can be excluded without significantly reducing the overall effectiveness of the model, and while protecting the model from later causing predictions based on the cases that were excluded for meeting the anomalousness condition. As discussed elsewhere herein with respect to other types of thresholds (e.g., in the context of including or excluding cases based on whether conviction scores met inclusivity thresholds), the thresholds for low distance contribution and low familiarity conviction may be any appropriate threshold including, a value scaled by the size of the model, a value scaled by the accuracy of the model, a fixed value, and/or any of the other thresholds discussed, etc.

Other conviction measures may be used to determine 730 whether to flag or alert 740 or include/exclude 740 a case. For example, measures that assess whether a data case is familiar along with measures that assess whether the case contributes beyond a threshold to a model may be used.

Further, and not depicted in FIG. 7B, a check may also, or instead, be made based on whether one or more conviction scores for one or more cases are beyond non-anomalousness threshold(s). For example, in some embodiments, those cases beyond (e.g., above) a first threshold for familiarity conviction and beyond (e.g., above) a second threshold for distance contribution may be flagged or alerted 740 as non-anomalous and/included or excluded 740 from the model. For example, in some embodiments, it may be desirable to include only those cases that are sufficiently non-anomalous in order to create a model that is more centered on common scenarios.

In some embodiments, the determination 730 of whether the conviction scores meet the anomalousness condition(s) include functions and/or determinations other than checks of the conviction measure(s) against thresholds. For example, in some embodiments, a function of one or more conviction scores can be checked and/or assessed. As a particular example, a distance contribution and familiarity conviction may be added or multiplied together (either with or without normalization) and that result may be checked against a single threshold. As another example, each conviction measure may be multiplied by a coefficient and/or raised to a power in order to create a single conviction score that is compared to a threshold. For example, distance contribution (DC) and familiarity conviction (FC) could be combined in a number of ways, such as X*DC+Y*FC; X*DC^A+Y*FC^B (where X, Y, A, and B could be any number); etc., and this result could be checked against a threshold. As additionally discussed elsewhere herein, the threshold against which measures are compared (for anomalousness or other comparisons) may be a fixed number, a number that changes over time, a number that is determined based on the model, a percentile (e.g., "top X % most anomalous cases"), a percent that changes over time (e.g., "top X % most anomalous cases seen [ever, today, this week, etc.]"), the number of cases to include as anomalous (e.g., "the top N most anomalous cases"), etc.

In some embodiments, anomalous cases may be detected and a model may be created based on the cases for which the anomalousness conditions were met. Such a model may be useful for later comparing cases to determine if those cases are similar to previous anomalies, are potentially anomalous themselves, etc. This may be useful, for example, in some contexts, anomalousness may be a positive aspect (e.g., when certain workers or machines are performing far above fellow workers or machines), and/or when a model of anomalies is useful to detect future anomalies.

In some embodiments, the techniques may include that the decision to flag, alert, include or exclude a case be made on a case by case basis, or, in some embodiments, the cases may be considered together, in batch, or jointly and the decisions may be made based on the relative conviction measures for the cases as a whole. For example, only the top N cases for combined distance contribution and/or familiarity conviction may be alerted or flagged 740 for review and/or included or excluded 740 from the model. Further, numerous conditions may be considered together when making a decision to include or exclude a case. In some embodiments, surprisal for the case(s) may also be determined 720, as described elsewhere herein. The determined surprisal may be used in conjunction with or instead of one or more of the conviction measures described herein. For example, if surprisal is low (e.g., beyond a lower threshold) and distance contribution is low and familiarity conviction is low, then the case may be flagged or alerted 740 (or included or excluded 740) from the model.

In some embodiments, alerting or flagging 740 a case may include, as discussed herein, flagging for human review and/or another system. For example, alerting or flagging 740 may include sending a message that the case should be reviewed by a human operator. In some embodiments, sending for review by a human may provide a way to reduce the workload on the human operator (e.g., not requiring as many reviews, reviewing only those cases flagged as anomalous). As another example, alerting or flagging may include sending the case for review by a second system (e.g., in the context of FIG. 2, the control system 220 may flag a case for review by the training and analysis system 230). In some embodiments, sending cases for review by a second system may be beneficial when the "cost" (time, CPU, monetary, etc.) of review by the second system is higher than the system doing the flagging. In such an embodiment, the second system will only need to review a portion of cases flagged as potentially anomalous, thereby providing a cost savings.

Excluding 740 a case from a model may include, in some embodiments, removing the case and/or a pointer to a case from a file, database, or other storage associated with the model. Including 750 a case in a model may comprise, in some embodiments, adding the case and/or a pointer to a case to a file, database, or other storage associated with the model.

After determining whether or not to flag or alert (etc.) 750 or 740 a case, then a determination 759 may be made whether to consider more cases or data elements for alerting or flagging 740. If there are more cases to consider, then conviction score(s) are determined 720 for the next cases, and process 700 proceeds. If there are no more cases to consider for anomalousness, then control of a controllable system may be caused 799. Causing 799 control of a controllable system is described below and elsewhere herein.

In some embodiments, when determining 759 whether to continue to check conviction scores for cases for anomalousness can include including or excluding cases until a certain number (or percentage) of anomalies have been detected, until space goal, until a memory size goal has been met, until number of cases analyzed goal has been met, and/or until all cases have been analyzed. For example, as discussed if the received 710 request includes a number of cases by which to reduce the model, then cases may be removed (e.g., including anomalous cases) until that number of cases are excluded. If the received 710 request includes a total number of cases to include in the model, then cases may be included 750 (e.g., excluding anomalous cases) until that number of cases have been included in the model.

As alluded to in the examples above, in some embodiments, the criteria used for anomalousness may change over time. For example, the threshold for a conviction measure such as distance contribution and/or familiarity conviction may increase (or decrease) as the model grows, changing the bar for flagging 740 a case as anomalous.

As depicted in FIG. 7B, the process 700 may optionally determine 759 whether other cases should be checked for anomalousness. In the embodiments and examples in which a model is being built (e.g., during training), this includes new training cases being considered for inclusion 750.

In some embodiments, as discussed herein, a model may be culled by removing cases associated with anomalous actions. An anomaly could be flagged during later operation (e.g., if an anomalous action occurs, it could be flagged by an operator of the system being controlled). In some embodiments, the case, context-action pair, or data element associated with the anomalous action could be flagged for removal. The anomalous cases could be removed from the model. In some embodiments, removing anomalous data not only can benefit the use of the model because anomalous decision may no longer be (or will less likely to be) made using the computer-based reasoning model, but also the computer-based reasoning model may be smaller, which has the benefits discussed herein.

In some embodiments, when an anomaly is detected, more data "around" the case or data element associated with the anomaly might be needed. For example, if an anomaly is detected, the context in which the anomaly occurred might be ripe for additional cases. This could be "flagged" for a trainer, who could then focus training on that context. These additional cases could then be considered for addition to the computer-based reasoning model in the manner described herein.

When the model is ready for use it may optionally be provided to a control system (e.g., control system 220 of FIG. 2) for causing 799 control of a controllable real-world system. Examples of controlling real world systems are discussed extensively herein and include controlling an image labeling system, a self driving car, a manufacturing system, a smart home system, a health care system, a federated system, a cyber security system, etc.

Weighting Based on Conviction Measures

In some embodiments, not necessarily depicted in the figures, conviction measures may be used to weight features and or cases in various contexts. For example, in embodiments where features are used together to determine a decision, action, etc. (such as determining the value to set a throttle to, the direction of a steering mechanism, the pressure of a valve, etc.), the features can all be equally weighted. In some embodiments, however, the features can have weights therewith associated. The weights on the features may be preset (e.g., by a human operator) or they may be determined based on one or more of the conviction measures. For example, in some embodiments, the conviction score (or a multiple or ratio of it) of a feature may be used as the weight for the feature when determining a value for the distance metric. This may be beneficial when the distance between two cases may be better measured by weighting more heavily toward features with higher conviction. As another example, the features could be weighted by another ratio, sum, product, or other function of a conviction measure, such as the square of the feature prediction contribution, the reciprocal of the familiarity conviction, the feature prediction contribution*the familiarity conviction, etc.

In some embodiments, conviction measures may also be used to weight the importance of cases in any appropriate context. For example, as a parallel to, in addition to, and/or instead of performing model pruning, cases can be weighted based on the conviction of the case. For example, lower conviction cases may be given less weight (e.g., in determining what action among the kNN's actions to choose or perform or cause performance of, reducing the impact of anomalies in a self-driving vehicle, increasing the impact of anomalous data to better handle defect detection in an assembly line, etc.). As another example, if a more surprising action is desired, cases with higher conviction could be weighted lower when choosing what action to perform. Weights for cases may, in various embodiments, be any ratio, sum, product, or other function of any of the conviction measures (or their reciprocal or negative), such as 1*prediction conviction, the square of familiarity conviction, targeted prediction conviction*untargeted familiarity conviction.

Comparing Two Computer Based Reasoning Systems

In some embodiments, the techniques herein include comparing two computer-based reasoning models to see which of the two is more surprising and/or has more information. For example, the data elements (e.g., using process 100 or 600) or aspects (e.g., using process 500 or 700) of one computer-based reasoning model can be compared to another computer-based reasoning model. The model with the higher surprisal would be considered to have more information. This determination can be useful when the models differ (possibly even considerably), and a determination on which model provides more information will inform a choice of which model to use. Further, one computer-based reasoning model can be directly compared to one or more computer-based reasoning models by computing the surprisal of adding all of the training elements contained in the first computer-based reasoning model to each of the others. The surprisal of each pairing indicates which models are anomalous compared to the baseline. Individual training cases can be compared from one computer-based reasoning model to another, and the highest surprisal training cases show where the first model differs from the second.

Example Processes for Controlling Systems

Figure 4:
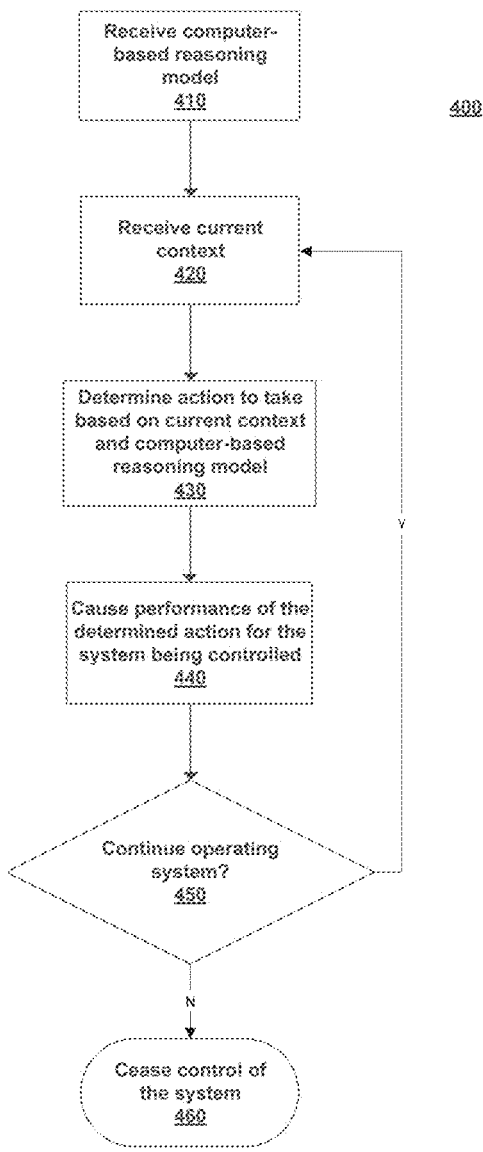
FIG. 4 depicts an example process for controlling a system.
Figure 5:
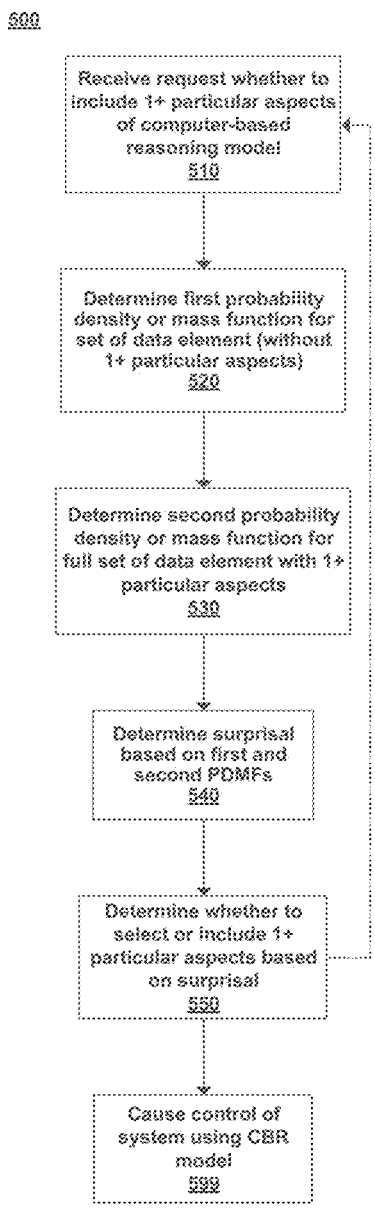
FIG. 5, FIG. 6, FIG. 7A, and FIG. 7B depict additional example processes for creation of well-balanced computer-based reasoning systems.

FIG. 4 depicts an example process 400 for controlling a system. In some embodiments and at a high level, the process 400 proceeds by receiving or receiving 410 a computer-based reasoning model for controlling the system. The computer-based reasoning model may be one created using process 100, as one example. In some embodiments, the process 400 proceeds by receiving 420 a current context for the system, determining 430 an action to take based on the current context and the computer-based reasoning model, and causing 440 performance of the determined action (e.g., labelling an image, causing a vehicle to perform the turn, lane change, waypoint navigation, etc.). If operation of the system continues 450, then the process returns to receive 420 the current context, and otherwise discontinues 460 control of the system. In some embodiments, causing 199 performance of a selected action may include causing 440 performance of a determined action (or vice-versa).

As discussed herein the various processes 100, 400, 500, 600, 700 etc. may run in parallel, in conjunction, together, or one process may be a subprocess of another. Further, any of the processes may run on the systems or hardware discussed herein. The features and steps of processes 100, 400, 500, 600, 700 could be used in combination and/or in different orders.

Self-Driving Vehicles

Returning to the top of the process 400, it begins by receiving 410 a computer-based reasoning model for controlling the system. The computer-based reasoning model may be received in any appropriate matter. It may be provided via a network 290, placed in a shared or accessible memory on either the training and analysis system 210 or control system 220, or in accessible storage, such as storage 230 or 240.

In some embodiments (not depicted in FIG. 4), an operational situation could be indicated for the system. The operational situation is related to context, but may be considered a higher level, and may not change (or change less frequently) during operation of the system. For example, in the context of control of a vehicle, the operational situation may be indicated by a passenger or operator of the vehicle, by a configuration file, a setting, and/or the like. For example, a passenger Alicia may select "drive like Alicia" in order to have the vehicle driver like her. As another example, a fleet of helicopters may have a configuration file set to operate like Bob. In some embodiments, the operational situation may be detected. For example, the vehicle may detect that it is operating in a particular location (area, city, region, state, or country), time of day, weather condition, etc. and the vehicle may be indicated to drive in a manner appropriate for that operational situation.

The operational situation, whether detected, indicated by passenger, etc., may be changed during operation of the vehicle. For example, a passenger may first indicate that she would like the vehicle to drive cautiously (e.g., like Alicia), and then realize that she is running later and switch to a faster operation mode (e.g., like Carole). The operational situation may also change based on detection. For example, if a vehicle is operating under an operational situation for a particular portion of road, and detects that it has left that portion of road, it may automatically switch to an operational situation appropriate for its location (e.g., for that city), may revert to a default operation (e.g., a baseline program that operates the vehicle) or operational situation (e.g., the last used). In some embodiments, if the vehicle detects that it needs to change operational situations, it may prompt a passenger or operator to choose a new operational situation.

In some embodiments, the computer-based reasoning model is received before process 400 begins (not depicted in FIG. 4), and the process begins by receiving 420 the current context. For example, the computer-based reasoning model may already be loaded into a controller 220 and the process 400 begins by receiving 420 the current context for the system being controlled. In some embodiments, referring to FIG. 2, the current context for a system to be controlled (not depicted in FIG. 2) may be sent to control system 220 and control system 220 may receive 420 current context for the system.

Receiving 420 current context may include receiving the context data needed for a determination to be made using the computer-based reasoning model. For example, turning to the vehicular example, receiving 420 the current context may, in various embodiments, include receiving information from sensors on or near the vehicle, determining information based on location or other sensor information, accessing data about the vehicle or location, etc. For example, the vehicle may have numerous sensors related to the vehicle and its operation, such as one or more of each of the following: speed sensors, tire pressure monitors, fuel gauges, compasses, global positioning systems (GPS), RADARs, LiDARs, cameras, barometers, thermal sensors, accelerometers, strain gauges, noise/sound measurement systems, etc. Current context may also include information determined based on sensor data. For example, the time to impact with the closest object may be determined based on distance calculations from RADAR or LiDAR data, and/or may be determined based on depth-from-stereo information from cameras on the vehicle. Context may include characteristics of the sensors, such as the distance a RADAR or LiDAR is capable of detecting, resolution and focal length of the cameras, etc. Context may include information about the vehicle not from a sensor. For example, the weight of the vehicle, acceleration, deceleration, and turning or maneuverability information may be known for the vehicle and may be part of the context information. Additionally, context may include information about the location, including road condition, wind direction and strength, weather, visibility, traffic data, road layout, etc.

Referring back to the example of vehicle control rules for Bob flying a helicopter, the context data for a later flight of the helicopter using the vehicle control rules based on Bob's operation of the helicopter may include fuel remaining, distance that fuel can allow the helicopter to travel, location including elevation, wind speed and direction, visibility, location and type of sensors as well as the sensor data, time to impact with the N closest objects, maneuverability and speed control information, etc. Returning to the stop sign example, whether using vehicle control rules based on Alicia or Carole, the context may include LiDAR, RADAR, camera and other sensor data, location information, weight of the vehicle, road condition and weather information, braking information for the vehicle, etc.

The control system then determined 430 an action to take based on the current context and the computer-based reasoning model. For example, turning to the vehicular example, an action to take is determined 430 based on the current context and the vehicle control rules for the current operational situation. In some embodiments that use machine learning, the vehicle control rules may be in the form of a neural network (as described elsewhere herein), and the context may be fed into the neural network to determine an action to take. In embodiments using case-based reasoning, the set of context-action pairs closest (or most similar) to the current context may be determined. In some embodiments, only the closest context-action pair is determined, and the action associated with that context-action pair is the determined 430 action. In some embodiments, multiple context-action pairs are determined 430. For example, the N "closest" context-action pairs may be determined 430, and either as part of the determining 430, or later as part of the causing 440 performance of the action, choices may be made on the action to take based on the N closest context-action pairs, where "distance" for between the current context can be measured using any appropriate technique, including use of Euclidean distance, Minkowski distance, Damerau-Levenshtein distance, Kullback-Leibler divergence, and/or any other distance measure, metric, pseudometric, premetric, index, or the like.

In some embodiments, the actions to be taken may be blended based on the action of each context-action pair, with invalid (e.g., impossible or dangerous) outcomes being discarded. A choice can also be made among the N context-action pairs chosen based on criteria such as choosing to use the same or different operator context-action pair from the last determined action. For example, in an embodiment where there are context-action pair sets from multiple operators in the vehicle control rules, the choice of which context-action pair may be based on whether a context-action pair from the same operator was just chosen (e.g., to maintain consistency). The choice among the top N context-action pairs may also be made by choosing at random, mixing portions of the actions together, choosing based on a voting mechanism, etc.

Some embodiments include detecting gaps in the training data and/or vehicle control rules and indicating those during operation of the vehicle (for example, via prompt and/or spoken or graphical user interface) or offline (for example, in a report, on a graphical display, etc.) to indicate what additional training is needed (not depicted in FIG. 4). In some embodiments, when the computer-based reasoning system does not find context "close enough" to the current context to make a confident decision on an action to take, it may indicate this and suggest that an operator might take manual control of the vehicle, and that operation of the vehicle may provide additional context and action data for the computer-based reasoning system. Additionally, in some embodiments, an operator may indicate to a vehicle that she would like to take manual control to either override the computer-based reasoning system or replace the training data. These two scenarios may differ by whether the data (for example, context-action pairs) for the operational scenario are ignored for this time period, or whether they are replaced.

In some embodiments, the operational situation may be chosen based on a confidence measure indicating confidence in candidate actions to take from two (or more) different sets of control rules (not depicted in FIG. 4). Consider a first operational situation associated with a first set of vehicle control rules (e.g., with significant training from Alicia driving on highways) and a second operational situation associated with a second set of vehicle control rules (e.g., with significant training from Carole driving on rural roads). Candidate actions and associated confidences may be determined for each of the sets of vehicle control rules based on the context. The determined 430 action to take may then be selected as the action associated with the higher confidence level. For example, when the vehicle is driving on the highway, the actions from the vehicle control rules associated with Alicia may have a higher confidence, and therefore be chosen. When the vehicle is on rural roads, the actions from the vehicle control rules associated with Carole may have higher confidence and therefore be chosen. Relatedly, in some embodiments, a set of vehicle control rules may be hierarchical, and actions to take may be propagated from lower levels in the hierarchy to high levels, and the choice among actions to take propagated from the lower levels may be made on confidence associated with each of those chosen actions. The confidence can be based on any appropriate confidence calculation including, in some embodiments, determining how much "extra information" in the vehicle control rules is associated with that action in that context.

In some embodiments, there may be a background or baseline operational program that is used when the computer-based reasoning system does not have sufficient data to make a decision on what action to take (not depicted in FIG. 4). For example, if in a set of vehicle control rules, there is no matching context or there is not a matching context that is close enough to the current context, then the background program may be used. If none of the training data from Alicia included what to do when crossing railroad tracks, and railroad tracks are encountered in later operation of the vehicle, then the system may fall back on the baseline operational program to handle the traversal of the railroad tracks. In some embodiments, the baseline model is a computer-based reasoning system, in which case context-action pairs from the baseline model may be removed when new training data is added. In some embodiments, the baseline model is an executive driving engine which takes over control of the vehicle operation when there are no matching contexts in the vehicle control rules (e.g., in the case of a context-based reasoning system, there might be no context-action pairs that are sufficiently "close").

In some embodiments, determining 430 an action to take based on the context can include determining whether vehicle maintenance is needed. As described elsewhere herein, the context may include wear and/or timing related to components of the vehicle, and a message related to maintenance may be determined based on the wear or timing. The message may indicate that maintenance may be needed or recommended (e.g., because preventative maintenance is often performed in the timing or wear context, because issues have been reported or detected with components in the timing or wear context, etc.). The message may be sent to or displayed for a vehicle operator (such as a fleet management service) and/or a passenger. For example, in the context of an automobile with sixty thousand miles, the message sent to a fleet maintenance system may include an indication that a timing belt may need to be replaced in order to avoid a P percent chance that the belt will break in the next five thousand miles (where the predictive information may be based on previously-collected context and action data, as described elsewhere herein). When the automobile reaches ninety thousand miles and assuming the belt has not been changed, the message may include that the chance that the belt will break has increased to, e.g., P*4 in the next five thousand miles.

Performance of the determined 430 action is then caused 440. Turning to the vehicular example, causing 440 performance of the action may include direct control of the vehicle and/or sending a message to a system, device, or interface that can control the vehicle. The action sent to control the vehicle may also be translated before it is used to control the vehicle. For example, the action determined 430 may be to navigate to a particular waypoint. In such an embodiment, causing 440 performance of the action may include sending the waypoint to a navigation system, and the navigation system may then, in turn, control the vehicle on a finer-grained level. In other embodiments, the determined 430 action may be to switch lanes, and that instruction may be sent to a control system that would enable the car to change the lane as directed. In yet other embodiments, the action determined 430 may be lower-level (e.g., accelerate or decelerate, turn 4° to the left, etc.), and causing 440 performance of the action may include sending the action to be performed to a control of the vehicle, or controlling the vehicle directly. In some embodiments, causing 440 performance of the action includes sending one or more messages for interpretation and/or display. In some embodiments, the causing 440 the action includes indicating the action to be taken at one or more levels of a control hierarchy for a vehicle. Examples of control hierarchies are given elsewhere herein.

Some embodiments include detecting anomalous actions taken or caused 440 to be taken. These anomalous actions may be signaled by an operator or passenger, or may be detected after operation of the vehicle (e.g., by reviewing log files, external reports, etc.). For example, a passenger of a vehicle may indicate that an undesirable maneuver was made by the vehicle (e.g., turning left from the right lane of a 2-lane road) or log files may be reviewed if the vehicle was in an accident. Once the anomaly is detected, the portion of the vehicle control rules (e.g., context-action pair(s)) related to the anomalous action can be determined. If it is determined that the context-action pair(s) are responsible for the anomalous action, then those context-action pairs can be removed or replaced using the techniques herein.

Referring to the example of the helicopter fleet and the vehicle control rules associated with Bob, the vehicle control 220 may determine 430 what action to take for the helicopter based on the received 420 context. The vehicle control 220 may then cause the helicopter to perform the determined action, for example, by sending instructions related to the action to the appropriate controls in the helicopter. In the driving example, the vehicle control 220 may determine 430 what action to take based on the context of vehicle. The vehicle control may then cause 440 performance of the determined 430 action by the automobile by sending instructions to control elements on the vehicle.

If there are more 450 contexts for which to determine actions for the operation of the system, then the process 400 returns to receive 410 more current contexts. Otherwise, process 400 ceases 460 control of the system. Turning to the vehicular example, as long as there is a continuation of operation of the vehicle using the vehicle control rules, the process 400 returns to receive 420 the subsequent current context for the vehicle. If the operational situation changes (e.g., the automobile is no longer on the stretch of road associated with the operational situation, a passenger indicates a new operational situation, etc.), then the process returns to determine the new operational situation. If the vehicle is no longer operating under vehicle control rules (e.g., it arrived at its destination, a passenger took over manual control, etc.), then the process 400 will discontinue 460 autonomous control of the vehicle.

Figure 2:
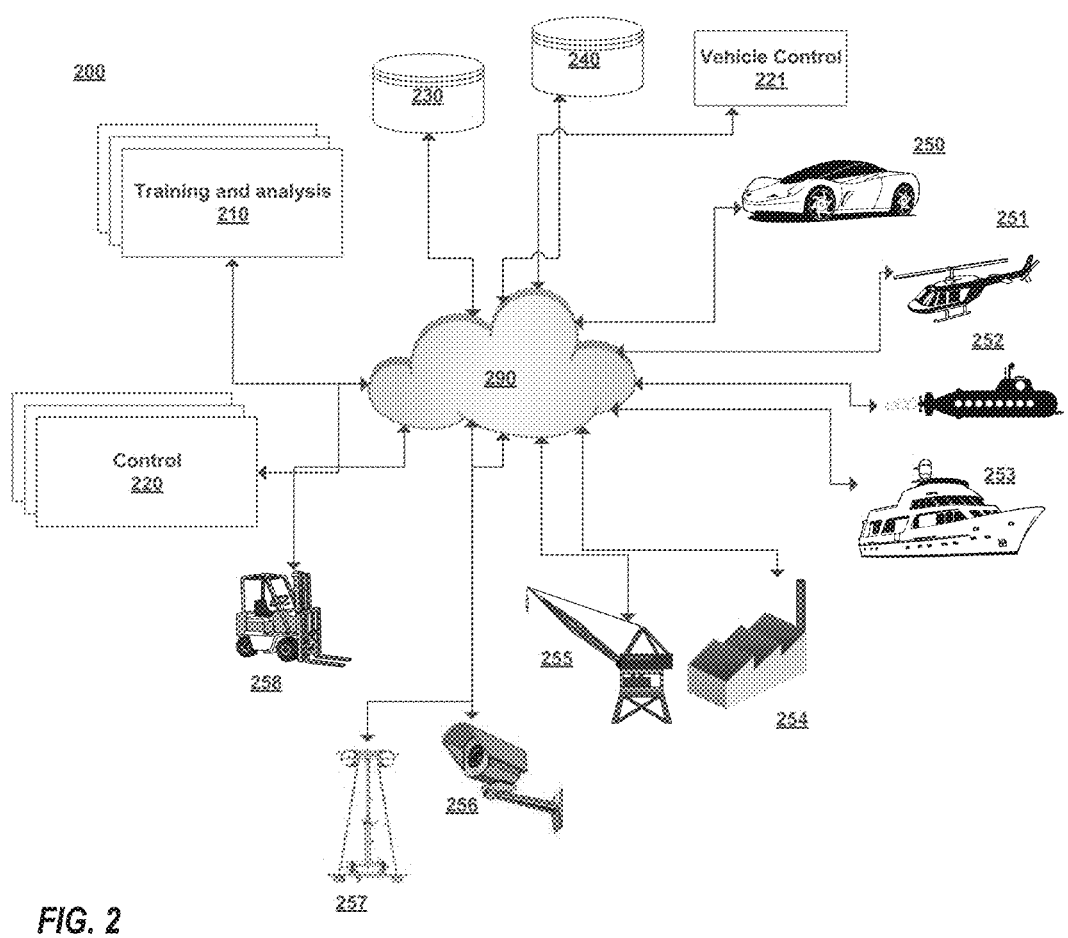
FIG. 2 depicts a block diagram of a system for creation of well-balanced computer-based reasoning systems.

Many of the examples discussed herein for vehicles discuss self-driving automobiles. As depicted in FIG. 2, numerous types of vehicles can be controlled. For example, a helicopter 251 or drone, a submarine 252, or boat or freight ship 253, or any other type of vehicle such as plane or drone (not depicted in FIG. 2), construction equipment, (not depicted in FIG. 2), and/or the like. In each case, the computer-based reasoning model may differ, including using different features, using different techniques described herein, etc. Further, the context of each type of vehicle may differ. Flying vehicles may need context data such as weight, lift, drag, fuel remaining, distance remaining given fuel, windspeed, visibility, etc. Floating vehicles, such as boats, freight vessels, submarines, and the like may have context data such as buoyancy, drag, propulsion capabilities, speed of currents, a measure of the choppiness of the water, fuel remaining, distance capability remaining given fuel, and the like. Manufacturing and other equipment may have as context width of area traversing, turn radius of the vehicle, speed capabilities, towing/lifting capabilities, and the like.

Image Labelling

The process 100, 500, 600, and/or 700 may also be applied in the context of an image-labeling system. For example, numerous experts may label images (e.g., identifying features of or elements within those images). For example, the human experts may identify cancerous masses on x-rays. Having these experts label all input images is incredibly time consuming to do on an ongoing basis, in addition to being expensive (paying the experts). The techniques herein may be used to train an image-labeling computer-based reasoning model based on previously-trained images. Once the image-labeling computer-based reasoning system has been built, then input images may be analyzed using the image-based reasoning system. In order to build the image-labeling computer-based reasoning system, images may be labeled by experts and used as training data. Using the techniques herein, the surprisal and/or conviction of the training data can be used to build an image-labeling computer-based reasoning system that balances the size of the computer-based reasoning model with the information that each additional image (or set of images) with associated labels provides. Once the image-labelling computer-based reasoning is trained, it can be used to label images in the future. For example, a new image may come in, the image-labelling computer-based reasoning may determine one or more labels for the image, and then the one or more labels may then be applied to the image. Thus, these images can be labeled automatically, saving the time and expense related to having experts label the images.

In some embodiments, process 100, 500, 600, and/or 700 may determine (e.g., based on a received 110, 510, 610, 710 request) the related conviction measures, such as conviction, contribution, and/or surprisal, of each image (or multiple images) and the associated labels or of the aspects of the computer-based reasoning model. In some embodiments, the surprisal and/or conviction for the one or more images may be determined 120, 130, 140, 520, 530, 540, 620, 720. A determination may be made whether to select or include 150, 550, 650, 750 the one or more images (or aspects) in the image-labeling computer-based reasoning model based on the determined surprisal and/or conviction. While there are more sets of one or more images with labels to assess, the process 100, 500, 600, and/or 700 may return to determine whether more image or label sets should be included or whether aspects should be included, excluded, and/or changed in the model. Once there are no more images or aspects to consider, the process 100, 500, 600, and/or 700 can turn to causing control or controlling 199, 599, 699, 799 the image analysis system using the image-labeling computer-based reasoning model.

Causing control or controlling 199, 599, 699, 799 an image-labeling system may be accomplished by process 400. For example, if the data elements are related to images and labels applied to those images, then the image-labeling computer-based reasoning model trained on that data will apply labels to incoming images. Process 400 proceeds by receiving 410 an image-labeling computer-based reasoning model. The process proceeds by receiving 420 an image for labeling. The image-labeling computer-based reasoning model is then used to determine 430 labels for the input image. The image is then labeled 440. If there are more 450 images to label, then the system returns to receive 410 those images and otherwise ceases 460. In such embodiments, the image-labeling computer-based reasoning model may be used to select labels based on which training image is "closest" (or most similar) to the incoming image. The label(s) associated with that image will then be selected to apply to the incoming image.

Manufacturing and Assembly

The process 100, 500, 600, and/or 700 may also be applied in the context of manufacturing and/or assembly. For example, conviction and/or surprisal can be used to identify normal behavior versus anomalous behavior of such equipment. Using the techniques herein, a crane (e.g., crane 255 of FIG. 2), robot arm, or other actuator is attempting to "grab" something and its surprisal is too high, it can stop, sound an alarm, shutdown certain areas of the facility, and/or request for human assistance. Anomalous behavior that is detected via conviction among sensors and actuators can be used to detect when there is some sort breakdown, unusual wear or mechanical or other malfunction, etc. It can also be used to find damaged equipment for repairs or buffing or other improvements for any robots or other machines that are searching and correcting defects in products or themselves (e.g., fixing a broken wire or smoothing out cuts made to the ends of a manufactured artifact made via an extrusion process). Conviction can also be used for cranes and other grabbing devices to find which cargo or items are closest matches to what is needed. Conviction can be used to drastically reduce the amount of time to train a robot to perform a new task for a new product or custom order, because the robot will indicate the aspects of the process it does not understand and direct training towards those areas and away from things it has already learned. Combining this with stopping ongoing actions when an anomalous situation is detected would also allow a robot to begin performing work before it is fully done training, the same way that a human apprentice may help out someone experienced while the apprentice is learning the job. Conviction can also inform what features or inputs to the robot are useful and which are not.

As an additional example in the manufacturing or assembly context, vibration data can be used to diagnose (or predict) issues with equipment. In some embodiments, the training data for the computer-based reasoning system would be vibration data (e.g., the output of one or more piezo vibration sensors attached to one or more pieces of manufacturing equipment) for a piece of equipment along with diagnosis of an issue or error that occurred with the equipment. The training data may similarly include vibration data for the manufacturing equipment that is not associated with an issue or error with the equipment. In subsequent operation of the same or similar equipment, the vibration data can be collected, and the computer-based reasoning model can be used to assess that vibration data to either diagnose or predict potential issues or errors with the equipment. For example, the vibration data for current (or recent) operation of one or more pieces of equipment, the computer-based reasoning model may be used to predict, diagnose, or otherwise determine issues or errors with the equipment. As a more specific example, a current context of vibration data for one or more pieces of manufacturing equipment may result in a diagnosis or prediction of various conditions, including, but not limited to: looseness of a piece of equipment (e.g., a loose screw), an imbalance on a rotating element (e.g., grime collected on a rotating wheel), misalignment or shaft runout (e.g., machine shafts may be out of alignment or not parallel), wear (e.g., ball or roller bearings, drive belts or gears become worn, they might cause vibration). As a further example, misalignment can be caused during assembly or develop over time, due to thermal expansion, components shifting or improper reassembly after maintenance. When a roller or ball bearing becomes pitted, for instance, the rollers or ball bearing will cause a vibration each time there is contact at the damaged area. A gear tooth that is heavily chipped or worn, or a drive belt that is breaking down, can also produce vibration. Diagnosis or prediction of the issue or error can be made based on the current or recent vibration data, and a computer-based reasoning model training data from the previous vibration data and associated issues or errors. Diagnosing or predicting the issues of vibration can be especially important where the vibration can cause other issues. For example, wear on a bearing may cause a vibration that then loosens another piece of equipment, which then can cause other issues and damage to equipment, failure of equipment, and even failure of the assembly or manufacturing process.

In some embodiments, process 100, 500, 600, and/or 700 may determine (e.g., based on a received 110, 510, 610, 710 request) the related conviction measures, such as conviction, contribution, and/or surprisal of one or more data elements (e.g., of the manufacturing equipment) or aspects (e.g., features of context-action pairs or aspects of the model) to potentially include in the manufacturing control computer-based reasoning model. In some embodiments, the surprisal and/or conviction for the one or more manufacturing elements may be determined 120, 130, 140, 520, 530, 540, 620, 720. A determination may be made whether to select or include 150, 550, 650, 750 the one or more manufacturing data elements or aspects in the manufacturing control computer-based reasoning model based on the determined surprisal and/or conviction. While there are more sets of one or more manufacturing data elements or aspects to assess (e.g., from additional equipment and/or from subsequent time periods), the process 100, 500, 600, and/or 700 may return to determine whether more manufacturing data elements or aspects sets should be included. Once there are no more manufacturing data elements or aspects to consider for inclusion, the process 100, 500, 600, and/or 700 can turn to causing control or controlling 199, 599, 699, 799 the manufacturing system using the manufacturing control computer-based reasoning system.

Causing 199, 599, 699, 799 control of a manufacturing system may be accomplished by process 400. For example, if the data elements are related to manufacturing data elements or aspects, then the manufacturing control computer-based reasoning model trained on that data will cause control manufacturing or assemble. Process 400 proceeds by receiving 410 a manufacturing control computer-based reasoning model. The process proceeds by receiving 420 a context. The manufacturing control computer-based reasoning model is then used to determine 430 an action to take. The action is then performed by the control system (e.g., caused by the manufacturing control computer-based reasoning system). If there are more 450 contexts to consider, then the system returns to receive 410 those contexts and otherwise ceases 460. In such embodiments, the manufacturing control computer-based reasoning model may be used to control a manufacturing system. The chosen actions are then performed by a control system.

Smart Voice Control

The process 100, 500, 600, and/or 700 may also be applied in the context of smart voice control. For example, combining multiple inputs and forms of analysis, the techniques herein can recognize if there is something unusual about a voice control request. For example, if a request is to purchase a high-priced item or unlock a door, but the calendar and synchronized devices indicate that the family is out of town, it could send a request to the person's phone before confirming the order or action; it could be that an intruder has recorded someone's voice in the family or has used artificial intelligence software to create a message and has broken in. It can detect other anomalies for security or for devices activating at unusual times, possibly indicating some mechanical failure, electronics failure, or someone in the house using things abnormally (e.g., a child frequently leaving the refrigerator door open for long durations). Combined with other natural language processing techniques beyond sentiment analysis, such as vocal distress, a smart voice device can recognize that something is different and ask, improving the person's experience and improving the seamlessness of the device into the person's life, perhaps playing music, adjusting lighting, or HVAC, or other controls. The level of confidence provided by conviction can also be used to train a smart voice device more quickly as it can ask questions about aspects of its use that it has the least knowledge about. For example: "I noticed usually at night, but also some days, you turn the temperature down in what situations should I turn the temperature down? What other inputs (features) should I consider?"

Using the techniques herein, a smart voice device may also be able to learn things it otherwise may not be able to. For example, if the smart voice device is looking for common patterns in any of the aforementioned actions or purchases and the conviction drops beyond (e.g., below) a certain threshold, it can ask the person if it should take on a particular action or additional autonomy without prompting, such as "It looks like you're normally changing the thermostat to colder on days when you have your exercise class, but not on days when it is cancelled; should I do this from now on and prepare the temperature to your liking?"

In some embodiments, process 100, 500, 600, and/or 700 may determine (e.g., based on a received 110, 510, 610, 710 request) the related conviction measures, such as conviction, contribution, and/or surprisal of one or more data elements (e.g., of the smart voice system) or aspects (e.g., features of the data or parameters of the model) to potentially include in the smart voice system control computer-based reasoning model. In some embodiments, the surprisal and/or conviction for the one or more smart voice system data elements or aspects may be determined 120, 130, 140, 520, 530, 540, 620, 720 and a determination may be made whether to include 150, 550, 650, 750 the one or more smart voice system data elements or aspects in the smart voice system control computer-based reasoning model based on the determined surprisal and/or conviction. While there are more sets of one or more smart voice system data elements or aspects to assess, the process 100, 500, 600, and/or 700 may return to determine whether more smart voice system data elements or aspects sets should be included. Once there are no more smart voice system data elements or aspects to consider, the process 100, 500, 600, and/or 700 can turn to causing control or controlling 199, 599, 699, 799 the smart voice system using the smart voice system control computer-based reasoning model.

Causing control or controlling 199, 599, 699, 799 a smart voice system may be accomplished by process 400. For example, if the data elements are related to smart voice system actions, then the smart voice system control computer-based reasoning model trained on that data will control smart voice systems. Process 400 proceeds by receiving 410 a smart voice computer-based reasoning model. The process proceeds by receiving 420 a context. The smart voice computer-based reasoning model is then used to determine 430 an action to take. The action is then performed by the control system (e.g., caused by the smart voice computer-based reasoning system). If there are more 450 contexts to consider, then the system returns to receive 410 those contexts and otherwise ceases 460. In such embodiments, the smart voice computer-based reasoning model may be used to control a smart voice system. The chosen actions are then performed by a control system.

Control of Federated Devices

The process 100, 500, 600, and/or 700 may also be applied in the context of federated devices in a system. For example, combining multiple inputs and forms of analysis, the techniques herein can recognize if there is something that should trigger action based on the state of the federated devices. For example, if the training data includes actions normally taken and/or statuses of federated devices, then an action to take could be an often-taken action in the certain (or related contexts). For example, in the context of a smart home with interconnected heating, cooling, appliances, lights, locks, etc., the training data could be what a particular user does at certain times of day and/or in particular sequences. For example, if, in a house, the lights in the kitchen are normally turned off after the stove has been off for over an hour and the dishwasher has been started, then when that context again occurs, but the kitchen light has not been turned off, the computer-based reasoning system may cause an action to be taken in the smart home federated systems, such as prompting (e.g., audio) whether the user of the system would like the kitchen lights to be turned off. As another example, training data may indicate that a user sets the house alarm and locks the door upon leaving the house (e.g., as detected via geofence). If the user leaves the geofenced location of the house and has not yet locked the door and/or set the alarm, the computer-based reasoning system may cause performance of an action such as inquiring whether it should lock the door and/or set an alarm. As yet another example, in the security context, the control may be for turning on/off cameras, or enact other security measures, such as sounding alarms, locking doors, or even releasing drones and the like. Training data may include previous logs and sensor data, door or window alarm data, time of day, security footage, etc. and when security measure were (or should have been) taken. For example, a context such as particular window alarm data for a particular basement window coupled with other data may be associated with an action of sounding an alarm, and when a context occurs related to that context, an alarm may be sounded.

In some embodiments, process 100, 500, 600, and/or 700 may determine (e.g., based on a received 110, 510, 610, 710 request) the related conviction measures, such as conviction, contribution, and/or surprisal of one or more data elements or aspects of the federated device control system for potential inclusion in the federated device control computer-based reasoning model. In some embodiments, the surprisal and/or conviction for the one or more federated device control system data elements may be determined 120, 130, 140, 520, 530, 540, 620, 720 and a determination may be made whether to select or include 150, 550, 650, 750 the one or more federated device control system data elements in the federated device control computer-based reasoning model based on the determined surprisal. While there are more sets of one or more federated device control system data elements or aspects to assess, the process 100, 500, 600, and/or 700 may return to determine whether more federated device control system data elements or aspect sets should be included. Once there are no more federated device control system data elements or aspects to consider, the process 100, 500, 600, and/or 700 can turn to causing control or controlling 199, 599, 699, 799 the federated device control system using the federated device control computer-based reasoning model.

Causing control or controlling 199, 599, 699, 799 a federated device control system may be accomplished by process 400. For example, if the data elements are related to federated device system actions, then the federated device control computer-based reasoning model trained on that data will control federated device control system. Process 400 proceeds by receiving 410 a federated device control computer-based reasoning model. The process proceeds by receiving 420 a context. The federated device control computer-based reasoning model is then used to determine 430 an action to take. The action is then performed by the control system (e.g., caused by the federated device control computer-based reasoning system). If there are more 450 contexts to consider, then the system returns to receive 410 those contexts and otherwise ceases 460. In such embodiments, the federated device control computer-based reasoning model may be used to control federated devices. The chosen actions are then performed by a control system.

Control and Automation of Experiments

The process 100, 500, 600, and/or 700 may also be used in the context of control systems for laboratory experiments. For example, many lab experiments today, especially in the biological and life sciences, but also in agriculture, pharmaceuticals, materials science and other fields, yield combinatorial increases, in terms of numbers, of possibilities and results. The fields of design of experiment, as well as many combinatorial search and exploration techniques are currently combined with statistical analysis. However, entropy-based techniques such as those herein can be used to guide a search for knowledge, especially if combined with utility or fitness functions. Automated lab experiments (including pharmaceuticals, biological and life sciences, material science, etc.) may have actuators and may put different chemicals, samples, or parts in different combinations and put them under different circumstances. Using conviction to guide the machines enables them to home in on learning how the system under study responds to different scenarios, and, for example, searching areas of greatest uncertainty (e.g., the areas with low conviction as discussed herein. Conceptually speaking, when the conviction or surprisal is combined with a fitness, utility, or value function, especially in a multiplicative fashion, then the combination may be a powerful information theoretic approach to the classic exploration vs exploitation trade-offs that are made in search processes from artificial intelligence to science to engineering. Additionally, such a system can automate experiments where it can predict the most effective approach, homing in on the best possible, predictable outcomes for a specific knowledge base. Further, like in the other embodiments discussed herein, it could indicate (e.g., raise alarms) to human operators when the results are anomalous, or even tell which features being measured are most useful (so that they can be appropriately measured) or when measurements are not sufficient to characterize the outcomes. This is discussed extensively elsewhere herein. If the system has multiple kinds of sensors that have "costs" (e.g., monetary, time, computation, etc.) or cannot be all activated simultaneously, the feature entropies or convictions could be used to activate or deactivate the sensors to reduce costs or improve the distinguishability of the experimental results.

In the context of agriculture, growers may experiment with various treatments (plant species or varietals, crop types, seed planting densities, seed spacings, fertilizer types and densities, etc.) in order to improve yield and/or reduce cost. In comparing the effects of different practices (treatments), experimenters or growers need to know if the effects observed in the crop or in the field are simply a product of the natural variation that occurs in every ecological system, or whether those changes are truly a result of the new treatments. In order to ameliorate the confusion caused by overlapping crop, treatment, and field effects, different design types can be used (e.g., demonstration strip, replication control or measurement, randomized block, split plot, factorial design, etc.). Regardless, however, of the type of test design type used, determination of what treatment(s) to use is crucial to success. Using the techniques herein to guide treatment selection (and possible design type) enables experimenters and growers to home in on how the system under study responds to different treatments and treatment types, and, for example, searching areas of greatest uncertainty in the "treatment space" (e.g., what are the types of treatments about which little is known?). Conceptually, the combination of conviction or surprisal with a value, utility, or fitness function such as yield, cost, or a function of yield and cost, become a powerful information theoretic approach to the classic exploration vs exploitation trade-offs that are made in search processes from artificial intelligence to science to engineering. Growers can use this information to choose treatments balancing exploitation (e.g., doing things similar to what has produced high yields previously) and exploration (e.g., trying treatments unlike previous ones, with yet-unknown results). Additionally, the techniques can automate experiments on treatments (either in selection of treatments, designs, or robotic or automated planting using the techniques described herein) where it can predict the most effective approach, and automatically perform the planting or other distribution (e.g., of fertilizer, seed, etc.) required of to perform the treatment. Further, like in the other embodiments discussed herein, it could indicate (e.g., raise alarms) to human operators when the results are anomalous, or even tell which features being measured are most useful or when measurements are not useful to characterize the outcomes (e.g., and may possibly be discarded or no longer measured). If the system has types of sensors (e.g., soil moisture, nitrogen levels, sun exposure) that have "costs" (e.g., monetary, time, computation, etc.) or cannot be all collected or activated simultaneously, the feature entropies or convictions could be used to activate or deactivate the sensors to reduce costs while protecting the usefulness of the experimental results.

In some embodiments, process 100, 500, 600, and/or 700 may determine (e.g., based on a received 110, 510, 610, 710 request) the related conviction measures, such as conviction, contribution, and/or surprisal of one or more data elements or aspects of the experiment control system. In some embodiments, the surprisal and/or conviction for the one or more experiment control system data elements or aspects may be determined 120, 130, 140, 520, 530, 540, 620, 720 and a determination may be made whether to select or include 150, 550, 650, 750 the one or more experiment control system data elements or aspects in experiment control computer-based reasoning model based on the determined surprisal and/or conviction. While there are more sets of one or more experiment control system data elements or aspects to assess, the process 100, 500, 600, and/or 700 may return to determine whether more experiment control system data elements or aspects sets should be included. Once there are no more experiment control system data elements or aspects to consider, the process 100, 500, 600, and/or 700 can turn to causing control or controlling 199, 599, 699, 799 the experiment control system using the experiment control computer-based reasoning model.

Causing control or controlling 199, 599, 699, 799 an experiment control system may be accomplished by process 400. For example, if the data elements are related to experimental control system actions, then the experiment control computer-based reasoning model trained on that data will control experiment control system. Process 400 proceeds by receiving 410 an experiment control computer-based reasoning model. The process proceeds by receiving 420 a context. The experiment control computer-based reasoning model is then used to determine 430 an action to take. The action is then performed by the control system (e.g., caused by the experiment control computer-based reasoning system). If there are more 450 contexts to consider, then the system returns to receive 410 those contexts and otherwise ceases 460. In such embodiments, the experiment control computer-based reasoning model may be used to control experiment. The chosen actions are then performed by a control system.

Control of Energy Transfer Systems

The process 100, 500, 600, and/or 700 may also be applied in the context of control systems for energy transfer. For example, a building may have numerous energy sources, including solar, wind, grid-based electrical, batteries, on-site generation (e.g., by diesel or gas), etc. and may have many operations it can perform, including manufacturing, computation, temperature control, etc. The techniques herein may be used to control when certain types of energy are used and when certain energy consuming processes are engaged. For example, on sunny days, roof-mounted solar cells may provide enough low-cost power that grid-based electrical power is discontinued during a particular time period while costly manufacturing processes are engaged. On windy, rainy days, the overhead of running solar panels may overshadow the energy provided, but power purchased from a wind-generation farm may be cheap, and only essential energy consuming manufacturing processes and maintenance processes are performed.

In some embodiments, process 100, 500, 600, and/or 700 may determine (e.g., based on a received 110, 510, 610, 710 request) the related conviction measures, such as conviction, contribution, and/or surprisal of one or more data elements or aspects of the energy transfer system. In some embodiments, the surprisal and/or conviction for the one or more energy transfer system data elements or aspects may be determined 20, 130, 140, 520, 530, 540, 620, 720 and a determination may be made whether to select or include 150, 550, 650, 750 the one or more energy transfer system data elements or aspects in energy control computer-based reasoning model based on the determined surprisal. While there are more sets of one or more energy transfer system data elements or aspects to assess, the process 100, 500, 600, and/or 700 may return to determine whether more energy transfer system data elements or aspects should be included. Once there are no more energy transfer system data elements or aspects to consider, the process 100, 500, 600, and/or 700 can turn to causing control or controlling 199, 599, 699, 799 the energy transfer system using the energy control computer-based reasoning model.

Causing control or controlling 199, 599, 699, 799 an energy transfer system may be accomplished by process 400. For example, if the data elements are related to energy transfer system actions, then the energy control computer-based reasoning model trained on that data will control energy transfer system. Process 400 proceeds by receiving 410 an energy control computer-based reasoning model. The process proceeds by receiving 420 a context. The energy control computer-based reasoning model is then used to determine 430 an action to take. The action is then performed by the control system (e.g., caused by the energy control computer-based reasoning system). If there are more 450 contexts to consider, then the system returns to receive 410 those contexts and otherwise ceases 460. In such embodiments, the energy control computer-based reasoning model may be used to control energy. The chosen actions are then performed by a control system.

Health Care Decision Making and Prediction

The processes 100, 400, 500, 600, 700 may also be used for health care decision making and prediction (such as outcome prediction). For example, some health insurers require pre-approval, pre-certification, and/or pre-authorization for certain types of healthcare procedures, such as administration of drugs, surgery, hospital visits, etc. In such circumstances, a health care professional must contact the insurer to obtain their approval prior to administering care, or else the health insurance company may not cover the procedure. Not all services require pre-approval, but many may, and which require it can differ among insurers. Health insurance companies may make determinations including, but not necessarily limited to, whether a procedure is medically necessary, whether it is duplicative, whether it follows currently-accepted medical practice, whether there are anomalies in the care or its procedures, whether there are anomalies or errors with the health care provider or professional, etc. In some embodiments, a health insurance company may have many "features" of data on which health care pre-approval decisions are determined by human operators. These features may include diagnosis information, type of health insurance, requesting health care professional and facility, frequency and/or last claim of the particular type, etc. The data on previous decisions can be used to train the computer-based reasoning system. The techniques herein may be used to guide the health care decision making process. For example, when the computer-based reasoning model determines, with high conviction or confidence, that a procedure should be pre-approved, it may pre-approve the procedure without further review. In some embodiments, when the computer-based reasoning model has low conviction re whether or not to pre-approve a particular procedure, it may flag it for human review (including, e.g., sending it back to the submitting organization for further information). In some embodiments, some or all of the rejections of procedure pre-approval may be flagged for human review.

Further, in some embodiments, the techniques herein can be used to flag trends. anomalies, and/or errors in detection. For example, as explained in detail elsewhere herein, the techniques can be used to determine, for example, when there are anomalies for a request for pre-approval with respect to the computer-based reasoning model. When the anomaly is detected, (e.g., a procedure or prescription has been requested outside the normal range of occurrences per time period, for an individual that is outside the normal range of patients, etc.), the pre-approval can be flagged for further review. In some cases, these anomalies could be errors (e.g., and the health professional or facility may be contacted to rectify the error), explainable anomalies (e.g., patients that need care outside of the normal bounds), or unexplainably anomalies. Additionally, in some embodiments, the techniques herein can be used to determine and flag trends (e.g., for an individual patient, set of patients, health department or facility, region, etc.). The techniques herein may be useful not only because they can automate and/or flag pre-approval decision, but also because the trained computer-based reasoning model may contain information (e.g., prior decision) from multiple (e.g., 10 s, 100 s, 1000 s, or more) prior decision makers. Consideration of this large amount of information may be untenable for other approaches, such as human review.

The techniques herein may also be used to predict adverse outcomes in numerous health care contexts. The computer-based reasoning model may be trained with data from previous adverse events, and perhaps from patients that did not have adverse events. The trained computer-based reasoning system can then be used to predict when a current or prospective patient or treatment is likely to cause an adverse event. For example, if a patient arrives at a hospital, the patient's information and condition may be assessed by the computer-based reasoning model using the techniques herein in order to predict whether an adverse event is probable (and the conviction of that determination). As a more specific example, if a septuagenarian with a history of low blood pressure is admitted for monitoring a heart murmur, the techniques herein may flag that patient for further review. In some embodiments, the determination of an adverse outcome may be an indication of one or more possible adverse events, such as a complication, having an additional injury, sepsis, increased morbidity, and/or getting additionally sick, etc. Returning to the example of the septuagenarian with a history of low blood pressure, the techniques herein may indicate that, based on previous data, the possibility of a fall in the hospital is unduly high (possibly with high conviction). Such information can allow the hospital to try to ameliorate the situation and attempt to prevent the adverse event before it happens.

In some embodiments, the techniques herein include assisting in diagnosis and/or diagnosing patients based on previous diagnosis data and current patient data. For example, a computer-based reasoning model may be trained with previous patient data and related diagnoses using the techniques herein. The diagnosis computer-based reasoning model may then be used in order to suggest one or more possible diagnoses for the current patient. As a more specific example, a septuagenarian may present with specific attributes, medical history, family history, etc. This information may be used as the input context to the diagnosis computer-based reasoning system, and the diagnosis computer-based reasoning system may determine one or more possible diagnoses for the septuagenarian. In some embodiments, those possible diagnoses may then be assessed by medical professionals. The techniques herein may be used to diagnose any condition, including, but not limited to breast cancer, lung cancer, colon cancer, prostate cancer, bone metastases, coronary artery disease, congenital heart defect, brain pathologies, Alzheimer's disease, and/or diabetic retinopathy.

In some embodiments, the techniques herein may be used to generate synthetic data that mimics, but does not include previous patient data. This synthetic data generation is available for any of the uses of the techniques described herein (manufacturing, image labelling, self-driving vehicles, etc.), and can be particularly important in circumstances where using user data (such as patient health data) in a model may be contrary to policy or regulation. As discussed elsewhere herein, the synthetic data can be generated to directly mimic the characteristics of the patient population, or more surprising data can be generated (e.g., higher surprisal) in order to generate more data in the edge cases, all without a necessity of including actual patient data.

In some embodiments, processes 100, 400, 500, 600, 700 may include determining (e.g., in response to a request) the surprisal and/or conviction of one or more data elements or aspects of the health care system. The surprisal or conviction for the one or more health care system data elements or aspects may be determined and a determination may be made whether to select or include the one or more health care system data elements or aspects in a health care system computer-based reasoning model based on the determined surprisal and/or conviction. While there are more sets of one or more health care system data elements or aspects to assess, the process may return to determine whether more health care system data elements or aspects should be included. Once there are no more health care system data elements or aspects to consider included in the model, the process can turn to controlling the health care computer-based reasoning system using the health care system computer-based reasoning model.

In some embodiments, process 100, 500, 600, and/or 700 may determine (e.g., in response to a received 110, 510, 610, 710 request) the related conviction measures, such as conviction, contribution, and/or surprisal, of each health care system case, feature, or data element use in the health care system computer-based reasoning model. In some embodiments, the surprisal and/or conviction for the one or more health care system cases, features, or data elements may be determined 120, 130, 140, 520, 530, 540, 620, 720. A determination may be made whether to select or include 150, 550, 650, 750 the one or more health care system case, feature, or data element in the image-labeling computer-based reasoning model based on the determined surprisal and/or conviction. While there are more sets of one or more health care system cases, features, or data elements with labels to assess, the process 100, 500, 600, and/or 700 may return to determine whether more health care system cases, features, or data elements should be included or whether aspects should be included, excluded, and/or changed in the model. Once there are no more health care system cases, features, or data elements to consider, the process 100, 500, 600, and/or 700 can turn to causing control or controlling 199, 599, 699, 799 the health care system using the health care computer-based reasoning system.

Process 400 proceeds by receiving 410 a health care system computer-based reasoning model. The process proceeds by receiving 420 a context. The health care system computer-based reasoning model is then used to determine 430 an action to take. The action is then performed by the control system (e.g., caused by the health care system computer-based reasoning system). If there are more 450 contexts to consider, then the system returns to receive 410 those contexts and otherwise ceases 460. In some embodiments, the health care system computer-based reasoning model may be used to assess health care decisions, predict outcomes, etc. In some embodiments, the chosen action(s) are then performed by a control system.

Cybersecurity

The processes 100, 400, 500, 600, 700 may also be used for cybersecurity analysis. For example, a cybersecurity company or other organization may want to perform threat (or anomalous behavior) analysis, and in particular may want explanation data associated with the threat or anomalous behavior analysis (e.g., why was a particular event, user, etc. identified as a threat or not a threat?). The computer-based reasoning model may be trained using known threats/anomalous behavior and features associated with those threats or anomalous behavior. Data that represents neither a threat nor anomalous behavior (e.g., non-malicious access attempts, non-malicious emails, etc.) may also be used to train the computer-based reasoning model. In some embodiments, when a new entity, user, packet, payload, routing attempt, access attempt, log file, etc. is ready for assessment, the features associated with that new entity, user, packet, payload, routing attempt, access attempt, log file, etc. may be used as input in the trained cybersecurity computer-based reasoning system. The cybersecurity computer-based reasoning system may then determine the likelihood that the entity, user, packet, payload, routing attempt, access attempt, pattern in the log file, etc. is or represents a threat or anomalous behavior. Further, explanation data, such as a conviction measures, training data used to make a decision etc., can be used to mitigate the threat or anomalous behavior and/or be provided to a human operator in order to further assess the potential threat or anomalous behavior.

Any type of cybersecurity threat or anomalous behavior can be analyzed and detected, such as denial of service (DoS), distributed DOS (DDoS), brute-force attacks (e.g., password breach attempts), compromised credentials, malware, insider threats, advanced persistent threats, phishing, spear phishing, etc. and/or anomalous traffic volume, bandwidth use, protocol use, behavior of individuals and/or accounts, logfile pattern, access or routing attempt, etc. In some embodiments the cybersecurity threat is mitigated (e.g., access is suspended, etc.) while the threat is escalated to a human operator. As a more specific example, if an email is received by the email server, the email may be provided as input to the trained cybersecurity computer-based reasoning model. The cybersecurity computer-based reasoning model may indicate that the email is a potential threat (e.g., detecting and then indicating that email includes a link to a universal resource locator that is different from the universal resource location displayed in the text of the email). In some embodiments, this email may be automatically deleted, may be quarantined, and/or flagged for review.

In some embodiments, processes 100, 400, 500, 600, 700 may include determining (e.g., in response to a request) the surprisal and/or conviction of one or more data elements or aspects of the cybersecurity system. The surprisal or conviction for the one or more cybersecurity system data elements or aspects may be determined and a determination may be made whether to select or include the one or more cybersecurity system data elements or aspects in a cybersecurity system computer-based reasoning model based on the determined surprisal and/or conviction. While there are more sets of one or more cybersecurity system data elements or aspects to assess, the process may return to determine whether more cybersecurity system data elements or aspects should be included. Once there are no more cybersecurity system data elements or aspects to consider, the process can turn to controlling the cybersecurity computer-based reasoning system using the cybersecurity system computer-based reasoning model.

In some embodiments, process 100, 400, 500, 600, 700 may determine (e.g., in response to a request) synthetic data for use in the cybersecurity system computer-based reasoning model. Based on a model that uses the synthetic data, the process can cause 199, 599, 699, 799 control of a cybersecurity computer-based reasoning system using process 400. For example, if the data elements are related to cybersecurity system actions, then the cybersecurity system computer-based reasoning model trained on that data will control the cybersecurity system (e.g., quarantine, delete, or flag for review, entities, data, network traffic, etc.). Process 400 proceeds by receiving 410 a cybersecurity system computer-based reasoning model. The process proceeds by receiving 420 a context. The cybersecurity system computer-based reasoning model is then used to determine 430 an action to take. The action is then performed by the control system (e.g., caused by the cybersecurity system computer-based reasoning system). If there are more 450 contexts to consider, then the system returns to receive 410 those contexts and otherwise ceases 460. In such embodiments, the cybersecurity system computer-based reasoning model may be used to assess cybersecurity threats, etc. In some embodiments, the chosen action(s) are then performed by a control system.

Example Control Hierarchies

In some embodiments, the technique herein may use a control hierarchy to control systems and/or cause actions to be taken (e.g., as part of causing 199, 599, 699, 799 control). There are numerous example control hierarchies and many types of systems to control, and hierarchy for vehicle control is presented below. In some embodiments, only a portion of this control hierarchy is used. It is also possible to add levels to (or remove levels from) the control hierarchy.

An example control hierarchy for controlling a vehicle could be:
Primitive Layer—Active vehicle abilities (accelerate, decelerate), lateral, elevation, and orientation movements to control basic vehicle navigation
Behavior Layer—Programmed vehicle behaviors which prioritize received actions and directives and prioritize the behaviors in the action.
Unit Layer—Receives orders from command layer, issues moves/directives to the behavior layer.
Command Layers (hierarchical)—Receives orders and gives orders to elements under its command, which may be another command layer or unit layer.

Example Cases, Data Elements, Contexts, and Operational Situations

In some embodiments, the cases or data elements may include context data and action data in context-action pairs. Various embodiments discussed herein may include any of the context data and actions associated with control of systems. For example, context data may include the state of machines and/or sensors in a manufacturing plant and the actions may include control of parts of the manufacturing system (e.g., speed of certain machinery, turning machinery on or off, signaling something for operator review, etc.). In some embodiments, cases may relate to control of a vehicle. For example, context data may include data related to the operation of the vehicle, including the environment in which it is operating, and the actions taken may be of any granularity. Consider an example of data collected while a driver, Alicia, drives around a city. The collected data could be context and action data where the actions taken can include high-level actions (e.g., drive to next intersection, exit the highway, take surface roads, etc.), mid-level actions (e.g., turn left, turn right, change lanes) and/or low-level actions (e.g., accelerate, decelerate, etc.). The contexts can include any information related to the vehicle (e.g. time until impact with closest object(s), speed, course heading, breaking distances, vehicle weight, etc.), the driver (pupillary dilation, heart rate, attentiveness, hand position, foot position, etc.), the environment (speed limit and other local rules of the road, weather, visibility, road surface information, both transient such as moisture level as well as more permanent, such as pavement levelness, existence of potholes, etc.), traffic (congestion, time to a waypoint, time to destination, availability of alternate routes, etc.), and the like. These input data (e.g., context-action pairs for training a context-based reasoning system or input training contexts with outcome actions for training a machine learning system) can be saved and later used to help control a compatible vehicle in a compatible operational situation. The operational situation of the vehicle may include any relevant data related to the operation of the vehicle. In some embodiments, the operational situation may relate to operation of vehicles by particular individuals, in particular geographies, at particular times, and in particular conditions. For example, the operational situation may refer to a particular driver (e.g., Alicia or Carole). Alicia may be considered a cautious car driver, and Carole a faster driver. As noted above, and in particular, when approaching a stop sign, Carole may coast in and then brake at the last moment, while Alicia may slow down earlier and roll in. As another example of an operational situation, Bob may be considered the "best pilot" for a fleet of helicopters, and therefore his context and actions may be used for controlling self-flying helicopters.

In some embodiments, the operational situation may relate to the locale in which the vehicle is operating. The locale may be a geographic area of any size or type, and may be determined by systems that utilize machine learning. For example, an operational situation may be "highway driving" while another is "side street driving". An operational situation may be related to an area, neighborhood, city, region, state, country, etc. For example, one operational situation may relate to driving in Raleigh, N.C. and another may be driving in Pittsburgh, Pa. An operational situation may relate to safe or legal driving speeds. For example, one operational situation may be related to roads with forty-five miles per hour speed limits, and another may relate to turns with a recommended speed of 20 miles per hour. The operational situation may also include aspects of the environment such as road congestion, weather or road conditions, time of day, etc. The operational situation may also include passenger information, such as whether to hurry (e.g., drive faster), whether to drive smoothly, technique for approaching stop signs, red lights, other objects, what relative velocity to take turns, etc. The operational situation may also include cargo information, such as weight, hazardousness, value, fragility of the cargo, temperature sensitivity, handling instructions, etc.

In some embodiments, the context and action may include vehicle maintenance information. The context may include information for timing and/or wear-related information for individual or sets of components. For example, the context may include information on the timing and distance since the last change of each fluid, each belt, each tire (and possibly when each was rotated), the electrical system, interior and exterior materials (such as exterior paint, interior cushions, passenger entertainment systems, etc.), communication systems, sensors (such as speed sensors, tire pressure monitors, fuel gauges, compasses, global positioning systems (GPS), RADARs, LiDARs, cameras, barometers, thermal sensors, accelerometers, strain gauges, noise/sound measurement systems, etc.), the engine(s), structural components of the vehicle (wings, blades, struts, shocks, frame, hull, etc.), and the like. The action taken may include inspection, preventative maintenance, and/or a failure of any of these components. As discussed elsewhere herein, having context and actions related to maintenance may allow the techniques to predict when issues will occur with future vehicles and/or suggest maintenance. For example, the context of an automobile may include the distance traveled since the timing belt was last replaced. The action associated with the context may include inspection, preventative replacement, and/or failure of the timing belt. Further, as described elsewhere herein, the contexts and actions may be collected for multiple operators and/or vehicles. As such, the timing of inspection, preventative maintenance and/or failure for multiple automobiles may be determined and later used for predictions and messaging.

Causing performance of an identified action can include sending a signal to a real car, to a simulator of a car, to a system or device in communication with either, etc. Further, the action to be caused can be simulated/predicted without showing graphics, etc. For example, the techniques might cause performance of actions in the manner that includes, determining what action would be take, and determining whether that result would be anomalous, and performing the techniques herein based on the determination that such state would be anomalous based on that determination, all without actually generating the graphics and other characteristics needed for displaying the results needed in a graphical simulator (e.g., a graphical simulator might be similar to a computer game).

Example Systems for Entropy-Based Techniques for Creation of Well-Balanced Computer Based Reasoning Systems FIG. 2 depicts a block diagram of a system for evolving computer-based reasoning systems. System 200 includes a number of elements connected by a communicative coupling or network 290. Examples of communicative coupling and networks are described elsewhere herein. In some embodiments, the processes 100, 400, 500, 600, and/or 700 of FIG. 1 may run on the system 200 of FIG. 2 and/or the hardware 300 of FIG. 3. For example, the receiving 110 and determining 120-150 of FIG. 1 may be handled at training and analysis system 210. The resultant set(s) of data elements might be stored in communicatively coupled storage 230 or 240. The control system 220 may control 199 one or more physical systems.

Each of training and analysis system 210 and control system 220 may run on a single computing device, multiple computing devices, in a distributed manner across a network, on one or more virtual machines, which themselves run on one or more computing devices. In some embodiments, training and analysis system 210 and control system 220 are distinct sets of processes running on distinct sets of computing devices. In other embodiments, training and analysis system 210 and control system 220 are intertwined or share processes or functions and/or run on the same computing devices. In some embodiments, storage 230 and 240 are communicatively coupled to training and analysis system 210 and control system 220 via a network 290 or other connection. Storage 230 and 240 may also be part of or integrated with training and analysis system 210 and/or control system 220 via a network 290 or other connection.

As discussed herein the various aspects or embodiments of process 100, 400, 500, 600, and/or 700 may run in parallel, in conjunction, together, or one process may be a subprocess of another. Further, any of the processes may run on the systems or hardware discussed herein.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
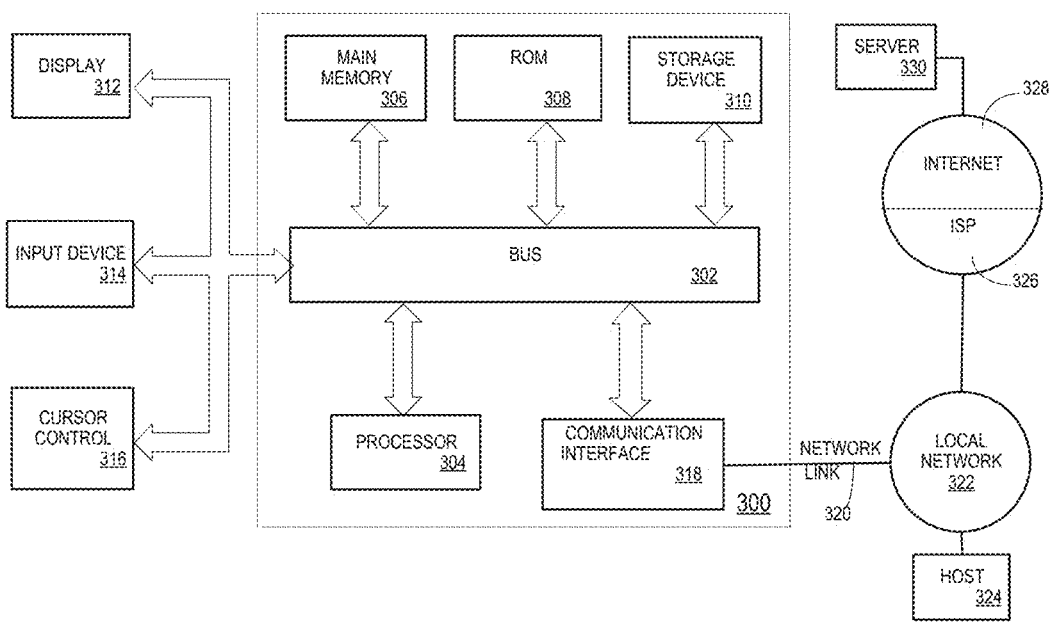
FIG. 3 depicts additional example systems and hardware for creation of well-balanced computer-based reasoning systems.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

training a computer-based reasoning model;

receiving a request to determine whether one or more particular data elements in the computer-based reasoning model are anomalous;

determining for each of the one or more particular data elements, one or more conviction scores, wherein determining one or more conviction scores for the one or more particular data elements comprises determining a familiarity conviction score for the one or more particular data elements and determining a distance contribution score for the one or more particular data elements;

wherein:

the familiarity conviction score is a measure of how much the one or more particular data elements distort a model calculated as a function of one or more measures of distribution similarity, and the distance contribution score is a locally weighted expected value of the distance from one point to its nearest neighbors calculated based on a function of similarity between the one or more particular data elements and neighboring data elements of the one or more particular data elements;

determining whether the one or more conviction scores meet one or more anomalousness conditions;

in response to determining that the one or more conviction scores meet the one or more anomalousness conditions, sending an alert to a second system that the one or more particular data elements in the computer-based reasoning model are anomalous;

wherein determining whether the one or more conviction scores meet the anomalousness conditions comprises determining that the one or more particular data elements meet the anomalousness condition when the familiarity conviction score is beyond a first threshold and the distance contribution score is beyond a second threshold, wherein the method is performed on one or more computing devices.

2. The method of claim 1, further comprising:

including the one or more particular data elements in the computer-based reasoning model when the one or more anomalousness conditions is not met;

causing, with a control system, control of a controllable system with the computer-based reasoning model.

3. The method of claim 1, wherein determining whether the one or more conviction scores meet the anomalousness conditions comprises determining that the one or more particular data elements meet the one or more anomalousness conditions when the familiarity conviction score is below a first threshold and the distance contribution score is below a second threshold.

4. The method of claim 1, further comprising, in response to determining that the one or more conviction scores meet the one or more anomalousness conditions, excluding the one or more particular data elements in the computer-based reasoning model.

5. The method of claim 1, wherein receiving a request to determine whether to include one or more particular data elements comprises receiving a request to reduce the computer-based reasoning model to a particular size;

and the method further comprises:

determining a number of data elements to include in the computer-based reasoning model to reduce the computer-based reasoning model to a particular size;

determining a subset of data elements to include, that includes the number of data elements, to include in the computer-based reasoning model based at least in part on the one or more conviction scores for data elements in the computer-based reasoning model; and including only the subset of data elements to include in the computer-based reasoning model, and excluding data elements from the computer-based reasoning model that are not in the subset of data elements to include.

6. The method of claim 1, further comprising:

initially receiving the one or more particular data elements as part of training for the computer-based reasoning model;

in response to determining that the one or more conviction scores meet the one or more anomalousness conditions, sending an indication to a trainer associated with the training for the computer-based reasoning model that training related to the one or more particular data elements is anomalous.

7. The method of claim 1, further comprising:

receiving a request for an action to take in a current context associated with the one or more particular data elements;

when the one or more anomalousness conditions is not met by the one or more conviction scores associated with the one or more particular data elements:

determining the action to take based on comparing the current context to contexts associated with cases in the computer-based reasoning model; and responding to the request for the action to take with the determined action.

8. The method of claim 1, further comprising:

receiving a request for an action to take in a current context associated with the one or more particular data elements;

when the one or more anomalousness conditions is met by the one or more conviction scores associated with the one or more particular data elements:

removing the one or more particular data elements associated with the one or more convictions scores that met the one or more anomalousness conditions.

9. A system for executing instructions, wherein said instructions are instructions which, when executed by one or more computing devices, cause performance of a process including:

training a computer-based reasoning model;

receiving a request to determine whether one or more particular data elements in the computer-based reasoning model are anomalous;

determining for each of the one or more particular data elements, one or more conviction scores, wherein determining one or more conviction scores for the one or more particular data elements comprises determining a familiarity conviction score for the one or more particular data elements and determining a distance contribution score for the one or more particular data elements;

wherein:

the familiarity conviction score is a measure of how much the one or more particular data elements distort a model calculated as a function of one or more measures of distribution similarity, and the distance contribution score is a locally weighted expected value of the distance from one point to its nearest neighbors calculated based on a function of similarity between the one or more particular data elements and neighboring data elements of the one or more particular data elements;

determining whether the one or more conviction scores meet one or more anomalousness conditions;

in response to determining that the one or more conviction scores meet the one or more anomalousness conditions, sending an alert to a second system that the one or more particular data elements in the computer-based reasoning model are anomalous;

wherein determining whether the one or more conviction scores meet the anomalousness conditions comprises determining that the one or more particular data elements meet the anomalousness condition when the familiarity conviction score is beyond a first threshold and the distance contribution score is beyond a second threshold, wherein the process is performed on one or more computing devices.

10. The system of claim 9, the process further comprising:
including the one or more particular data elements in the computer-based reasoning model when the one or more anomalousness conditions is not met;
causing, with a control system, control of a controllable system with the computer-based reasoning model.

11. The system of claim 9, wherein determining whether the one or more conviction scores meet the anomalousness conditions comprises determining that the one or more particular data elements meet the one or more anomalousness conditions when the familiarity conviction score is below a first threshold and the distance contribution score is below a second threshold.

12. The system of claim 9, the process further comprising, in response to determining that the one or more conviction scores meet the one or more anomalousness conditions, excluding the one or more particular data elements in the computer-based reasoning model.

13. The system of claim 9,
wherein receiving a request to determine whether to include one or more particular data elements comprises receiving a request to reduce the computer-based reasoning model to a particular size;
and the process further comprises:
determining a number of data elements to include in the computer-based reasoning model to reduce the computer-based reasoning model to a particular size;
determining a subset of data elements to include, that includes the number of data elements, to include in the computer-based reasoning model based at least in part on the one or more conviction scores for data elements in the computer-based reasoning model; and
including only the subset of data elements to include in the computer-based reasoning model, and excluding data elements from the computer-based reasoning model that are not in the subset of data elements to include.

14. The system of claim 9, the process further comprising:
initially receiving the one or more particular data elements as part of training for the computer-based reasoning model;
in response to determining that the one or more conviction scores meet the one or more anomalousness conditions, sending an indication to a trainer associated with the training for the computer-based reasoning model that training related to the one or more particular data elements is anomalous.

15. The system of claim 9, the process further comprising:
receiving a request for an action to take in a current context associated with the one or more particular data elements;
when the one or more anomalousness conditions is not met by the one or more conviction scores associated with the one or more particular data elements:
determining the action to take based on comparing the current context to contexts associated with cases in the computer-based reasoning model; and
responding to the request for the action to take with the determined action.

16. The system of claim 9, the process further comprising:
receiving a request for an action to take in a current context associated with the one or more particular data elements;
when the one or more anomalousness conditions is met by the one or more conviction scores associated with the one or more particular data elements:
removing the one or more particular data elements associated with the one or more convictions scores that met the one or more anomalousness conditions.

17. A non-transitory computer readable medium storing instructions which, when executed by one or more computing devices, cause the one or more computing devices to perform a process of:
training a computer-based reasoning model;
receiving a request to determine whether one or more particular data elements in the computer-based reasoning model are anomalous;
determining for each of the one or more particular data elements, one or more conviction scores, wherein determining one or more conviction scores for the one or more particular data elements comprises determining a familiarity conviction score for the one or more particular data elements and determining a distance contribution score for the one or more particular data elements;
wherein:
the familiarity conviction score is a measure of how much the one or more particular data elements distort a model calculated as a function of one or more measures of distribution similarity, and
the distance contribution score is a locally weighted expected value of the distance from one point to its nearest neighbors calculated based on a function of similarity between the one or more particular data elements and neighboring data elements of the one or more particular data elements;
determining whether the one or more conviction scores meet one or more anomalousness conditions;
in response to determining that the one or more conviction scores meet the one or more anomalousness conditions, sending an alert to a second system that the one or more particular data elements in the computer-based reasoning model are anomalous;
wherein determining whether the one or more conviction scores meet the anomalousness conditions comprises determining that the one or more particular data elements meet the anomalousness condition when the familiarity conviction score is beyond a first threshold and the distance contribution score is beyond a second threshold.

18. The non-transitory computer readable medium of claim 17, the process further comprising:
including the one or more particular data elements in the computer-based reasoning model when the one or more anomalousness conditions is not met;
causing, with a control system, control of a controllable system with the computer-based reasoning model.

19. The non-transitory computer readable medium of claim 17, wherein determining whether the one or more conviction scores meet the anomalousness conditions comprises determining that the one or more particular data elements meet the one or more anomalousness conditions when the familiarity conviction score is below a first threshold and the distance contribution score is below a second threshold.

20. The non-transitory computer readable medium of claim 17, the process further comprising, in response to determining that the one or more conviction scores meet the one or more anomalousness conditions, excluding the one or more particular data elements in the computer-based reasoning model.

\* \* \* \* \*